United States Patent
Zack et al.

(10) Patent No.: US 10,008,088 B2
(45) Date of Patent: *Jun. 26, 2018

(54) HUMAN RESPIRATION FEATURE EXTRACTION IN PERSONAL EMERGENCY RESPONSE SYSTEMS AND METHODS

(71) Applicant: ECHOCARE TECHNOLOGIES LTD., Beer Sheva (IL)

(72) Inventors: Rafael Zack, Kiryat Ono (IL); Omer Hadad, Haifa (IL)

(73) Assignee: ECHOCARE TECHNOLOGIES LTD., Beer Sheva (IL)

( * ) Notice: Subject to any disclaimer, the term of this patent is extended or adjusted under 35 U.S.C. 154(b) by 127 days.

This patent is subject to a terminal disclaimer.

(21) Appl. No.: 15/086,074

(22) Filed: Mar. 31, 2016

(65) Prior Publication Data

US 2016/0379462 A1    Dec. 29, 2016

Related U.S. Application Data

(63) Continuation-in-part of application No. 15/049,156, filed on Feb. 22, 2016, now Pat. No. 9,568,594, which
(Continued)

(51) Int. Cl.
*G08B 21/04* (2006.01)
*G01S 13/02* (2006.01)
(Continued)

(52) U.S. Cl.
CPC .......... *G08B 21/0453* (2013.01); *G01S 7/411* (2013.01); *G01S 13/0209* (2013.01);
(Continued)

(58) Field of Classification Search
CPC .... G01S 13/0209; G01S 13/886; G01S 13/89; G01S 7/411; G01S 7/417; G08B 21/043;
(Continued)

(56) References Cited

U.S. PATENT DOCUMENTS 7,567,200 B1 *  7/2009  Osterweil ............. A61B 5/1117
                                                         340/573.1
7,903,020 B2    3/2011  Lin
                        (Continued)

OTHER PUBLICATIONS

International Search Report and Written Opinion dated Oct. 13, 2016 of PCT Application PCT/IL2016/050655, International filed Jun. 21, 2016.

(Continued)

*Primary Examiner* — Sisay Yacob
(74) *Attorney, Agent, or Firm* — Pearl Cohen Zedek Latzer Baratz LLP

(57) ABSTRACT

A non-wearable Personal Emergency Response System (PERS) architecture is provided, implementing RF interferometry using synthetic aperture antenna arrays to derive ultra-wideband echo signals which are analyzed and then processed by a two-stage human state classifier and abnormal states pattern recognition. Systems and methods transmit ultra-wide band radio frequency signals at, and receive echo signals from, the environment, process the received echo signals to yield a range-bin-based slow signal that is spatially characterized over a plurality of spatial range bins, and estimate respiration parameter(s) of the human(s) by analyzing the slow signal. The antennas may be arranged in several linear baselines, implement virtual displacements, and may be set into multiple communicating sub-arrays. A classifier uses respiration and other derived features to classify the state of the human(s). A decision process is carried out based on the instantaneous human state (local decision) followed by abnormal states patterns recognition (global decision).

17 Claims, 52 Drawing Sheets
(7 of 52 Drawing Sheet(s) Filed in Color)

Related U.S. Application Data is a continuation-in-part of application No. 15/008,460, filed on Jan. 28, 2016, now Pat. No. 9,568,595, which is a continuation-in-part of application No. 14/983,632, filed on Dec. 30, 2015, now Pat. No. 9,576,468, which is a continuation-in-part of application No. 14/753,062, filed on Jun. 29, 2015, now Pat. No. 9,520,051.

(51) Int. Cl.
| | |
|---|---|
| *G08B 25/01* | (2006.01) |
| *G01S 7/41* | (2006.01) |
| *G01S 13/88* | (2006.01) |
| *G01S 13/89* | (2006.01) |

(52) U.S. Cl.
CPC ............ *G01S 13/886* (2013.01); *G01S 13/89* (2013.01); *G08B 21/043* (2013.01); *G08B 21/0446* (2013.01); *G08B 21/0469* (2013.01); *G08B 25/016* (2013.01); *G01S 7/417* (2013.01)

(58) Field of Classification Search
CPC ............ G08B 21/0446; G08B 21/0453; G08B 21/0469; G08B 25/016
See application file for complete search history.

(56) References Cited

U.S. PATENT DOCUMENTS

| | | | |
|---|---|---|---|
| 7,916,066 B1 * | 3/2011 | Osterweil | ............ A61B 5/1117 |
| | | | 340/573.1 |
| 8,068,051 B1 * | 11/2011 | Osterweil | ............ A61B 5/1117 |
| | | | 340/573.1 |
| 8,779,965 B2 | 7/2014 | Sentelle | |
| 2006/0170584 A1 | 8/2006 | Romero | |
| 2006/0284757 A1 | 12/2006 | Zemany | |
| 2009/0195435 A1 | 8/2009 | Kapilevich | |
| 2009/0227882 A1 | 9/2009 | Foo | |
| 2011/0025562 A1 | 2/2011 | Hol | |
| 2014/0022110 A1 | 1/2014 | Itohara | |
| 2014/0070958 A1 | 3/2014 | Foo | |
| 2014/0362213 A1 | 12/2014 | Tseng | |
| 2015/0124923 A1 | 5/2015 | Jeon | |
| 2015/0301167 A1 | 10/2015 | Santelle | |

OTHER PUBLICATIONS

Notice of Allowance dated Sep. 8, 2016 for U.S. Appl. No. 14/753,062.
Notice of Allowance dated Oct. 5, 2016 for U.S. Appl. No. 14/983,632.
Notice of Allowance dated Oct. 7, 2016 for U.S. Appl. No. 15/008,460.
Notice of Allowance dated Oct. 12, 2016 for U.S. Appl. No. 15/049,156.

* cited by examiner

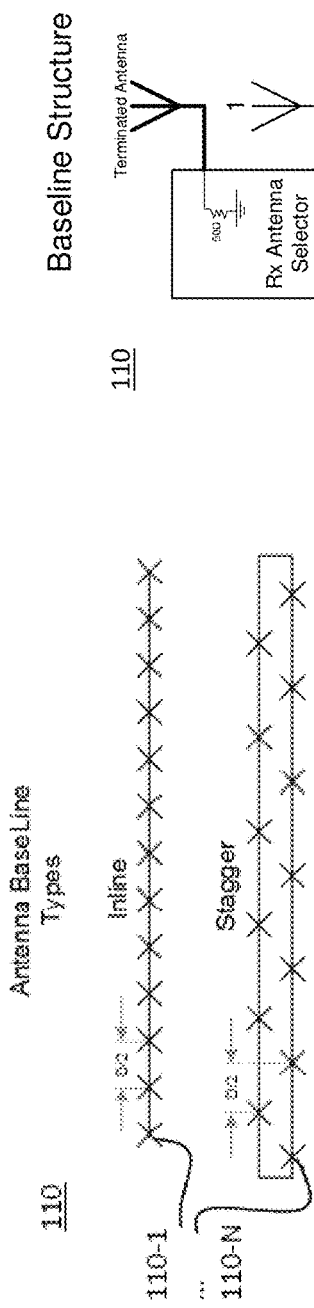
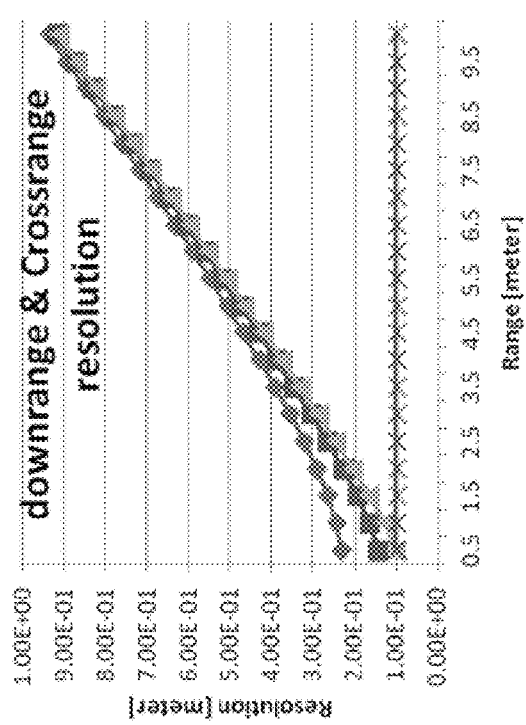
Figure 2A
Figure 2B
Figure 2C

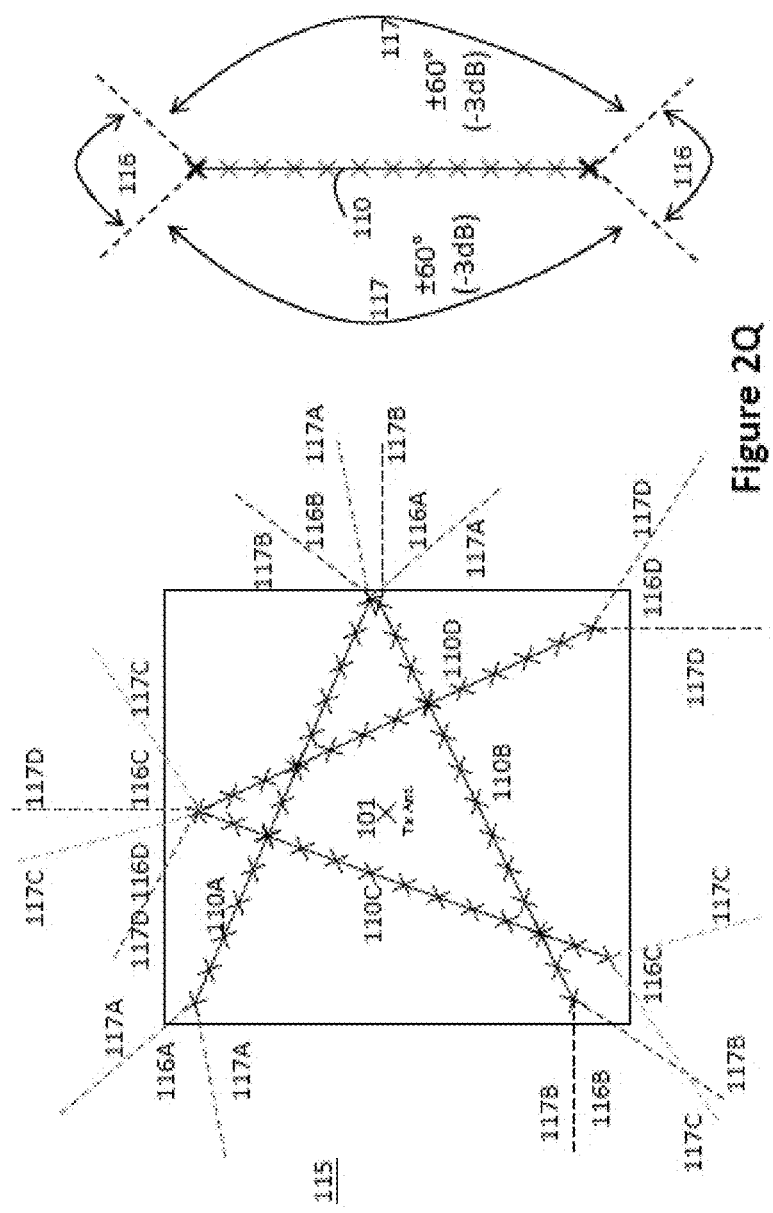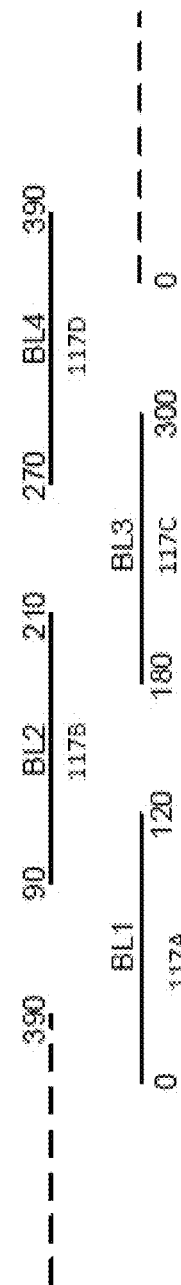
Figure 2Q
Figure 2R

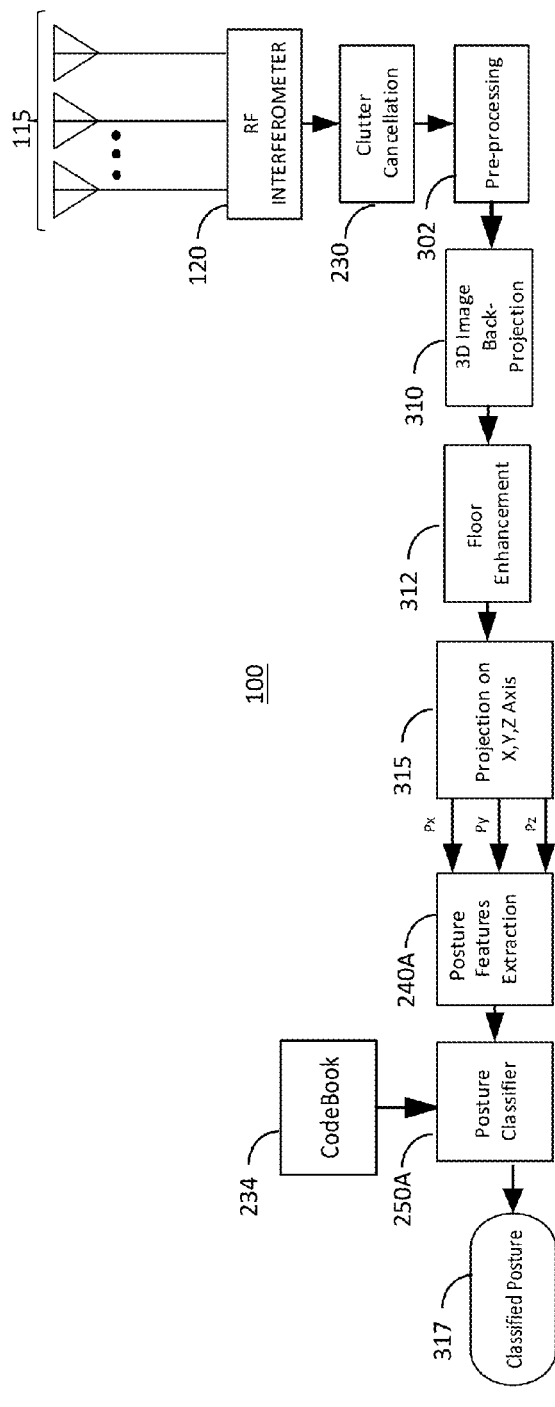
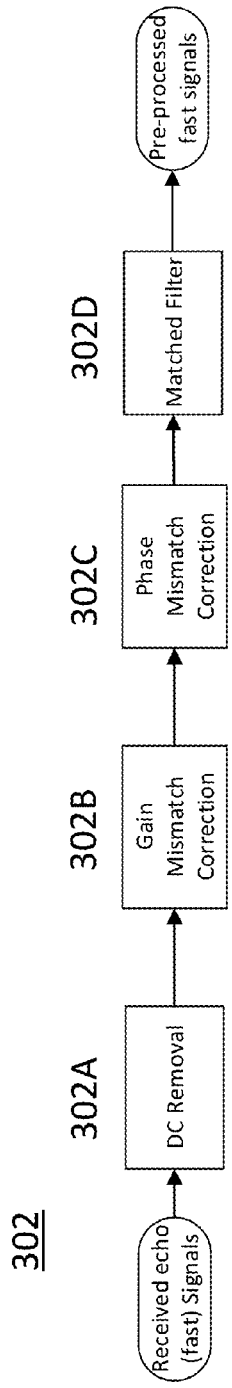
Figure 3A
Figure 3B

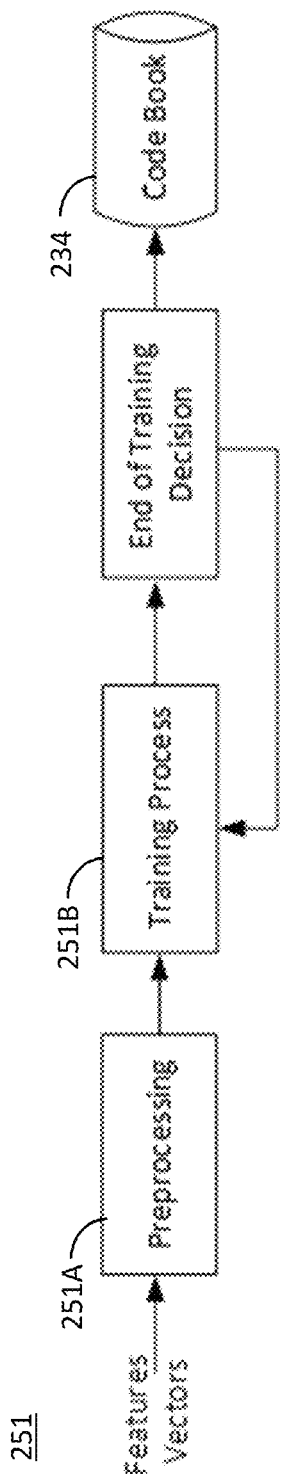
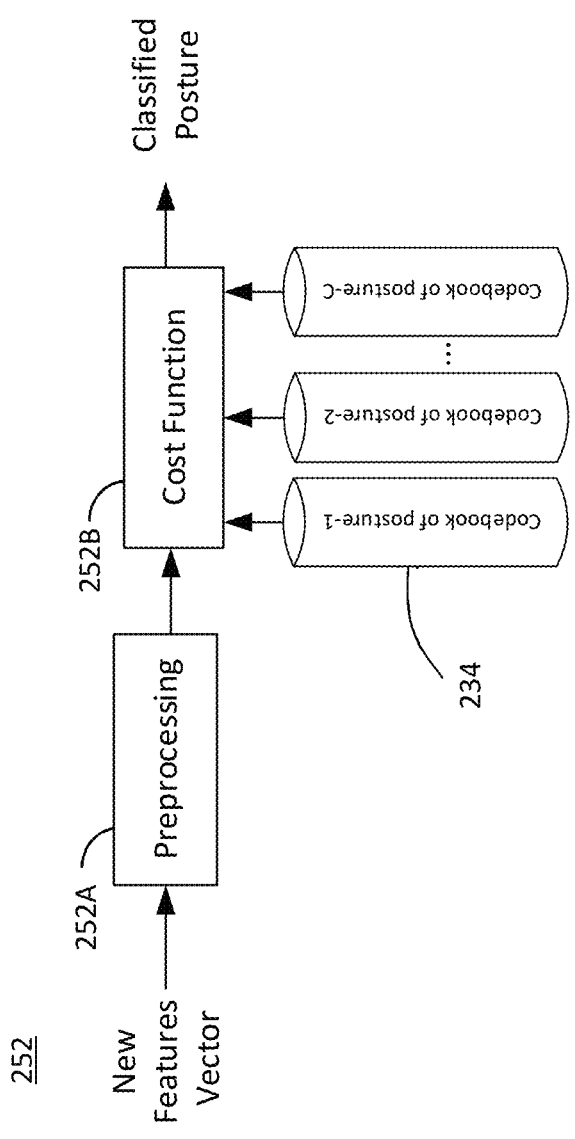
Figure 3I
Figure 3J

424E

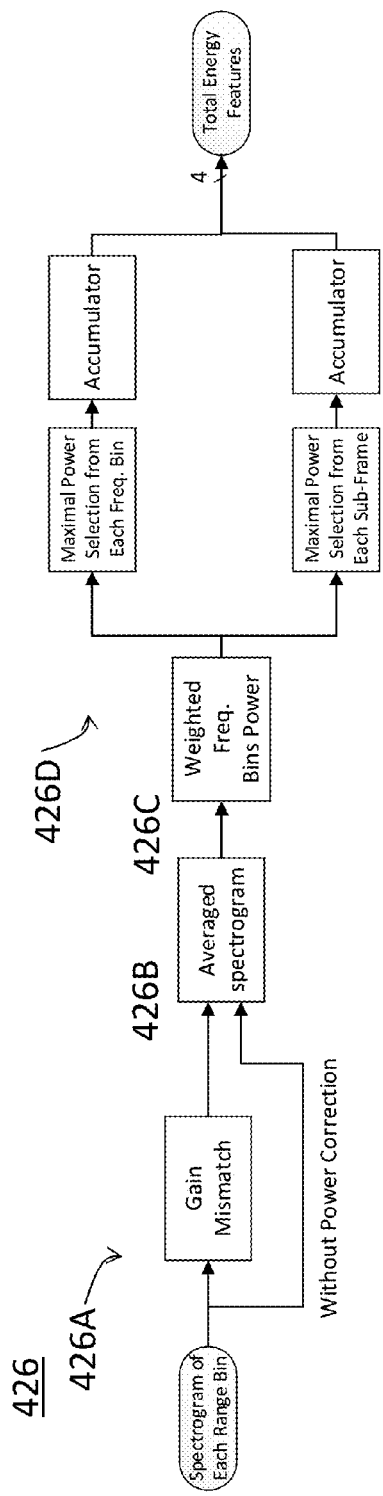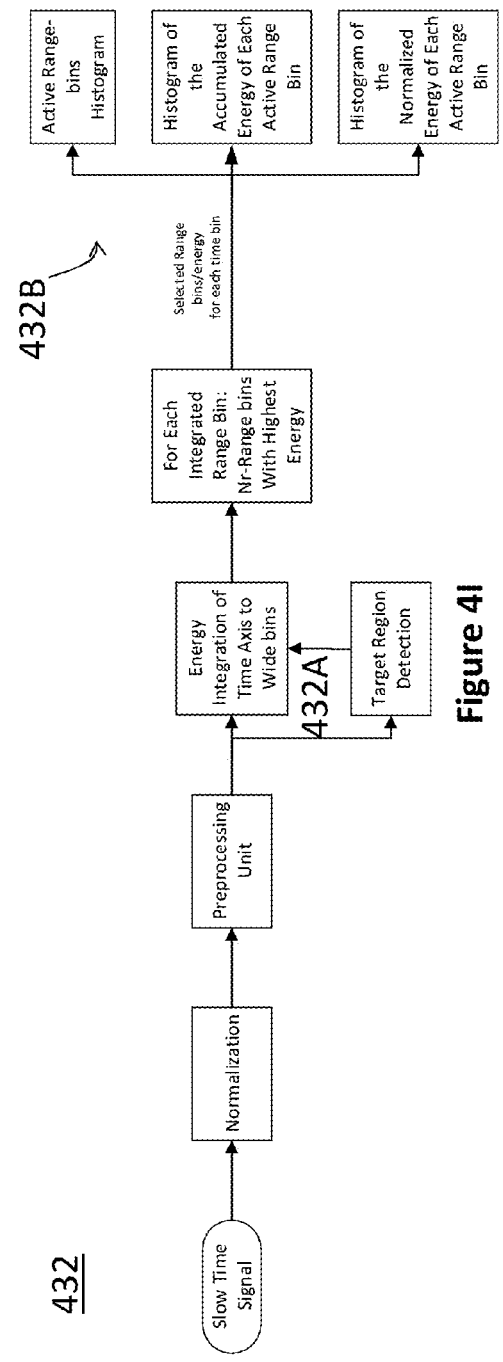
Figure 4H
Figure 4I

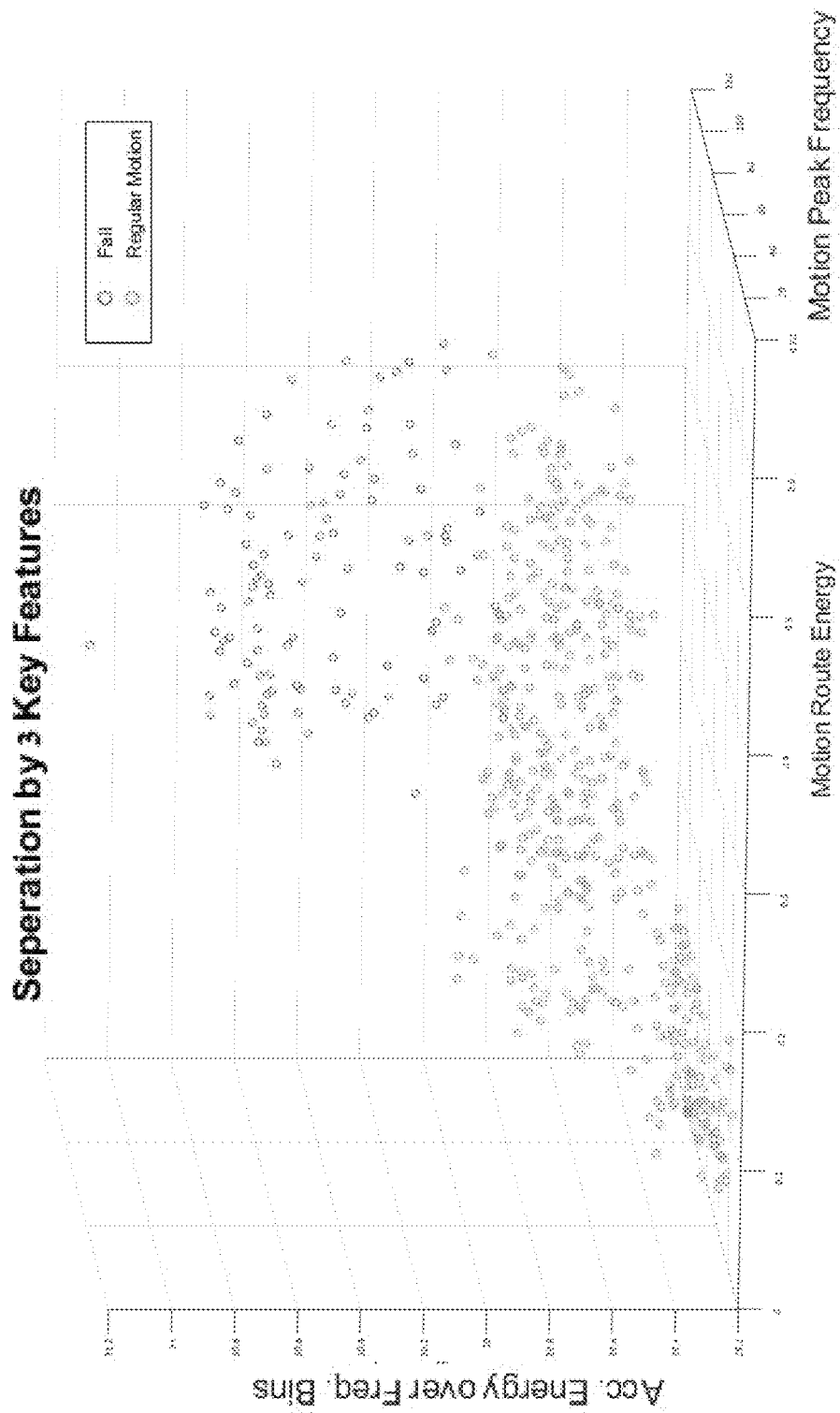
Figure 4N (Cont. 1)

VQ States Definition

134

| State Number | State name | Location | Human Centroid Level from Floor | Posture | Movement | Motions | Breathing [Resp/Min] | Time Limit [Minutes] |
|---|---|---|---|---|---|---|---|---|
| S10 | On floor | NA | <0.5 | Horizontal, Ball | No | | | 5 |
| S11 | Sleeping | Bedroom | >0.5 | Horizontal | No | Minor | Normal | Daylight-180 Night-480 |
| S20 | Sleeping | Livingroom | >0.5 | Horizontal | No | Minor | Normal | Daylight-180 Night-480 |
| S32 | Sitting @ toilet | Restroom | 1 | Zigzag | No | Minor | Normal | 20 |
| S34 | Sitting | NA | 1 | Zigzag | No | Minor | Normal | 180 |
| S40 | Standing | NA | >1.5 | Vertical | No | Yes (Gait) | Normal | 60 |
| S56 | Walking | NA | >1.5 | Vertical | Yes | Yes | Normal | 30 |
| S70 | Failing | NA | <0.5 | NA | No | Yes | Abnormal | NA |
| S71 | Stress | NA | NA | NA | NA | Yes | Very High | 30 |
| S82 | Bath | Bathroom | >0.5/>1.5 | Zigzag/Vertical | No | Yes | Normal | 30 |

States Matrix

| State\Location | 1-bedroom | 2-Bathroom | 3-Restroom | 4-Kitchen | 5-Livingroom | 6-other |
|---|---|---|---|---|---|---|
| 1-On floor | | | | | | |
| 2-Sleeping | X | | | | | |
| 3-Sitting | | | | | | |
| 4-Standing | | | | | | |
| 5-Walking | | | | | | |
| 6-"Falling" (Vertical motion) | | | | | | |
| 7. Stress | | | | | | |

CSA States Patterns

| Situation | State1 | State2 | State3 | State4 | State5 | Pattern Repetitions |
|---|---|---|---|---|---|---|
| Critical Fall 1 | S25 | S45 | S65 | S15 | S75 | 1 |
| Critical Fall 2 | S42 | S62 | S12 | S72 | X | 1 |
| Critical Fall 3 | S51 | S61 | S11 | X | X | 1 |
| Critical Fall 4 | S35 | S45 | S65 | S15 | S75 | 1 |
| High Restroom usage | S31 | S51 | S33 | S51 | S31 | >5 |
| Sedentary1 | S35 | X | X | X | X | >Time Thresh |
| Sedentary2 | S35 | S75 | X | X | X | 1 |

Figure 6C

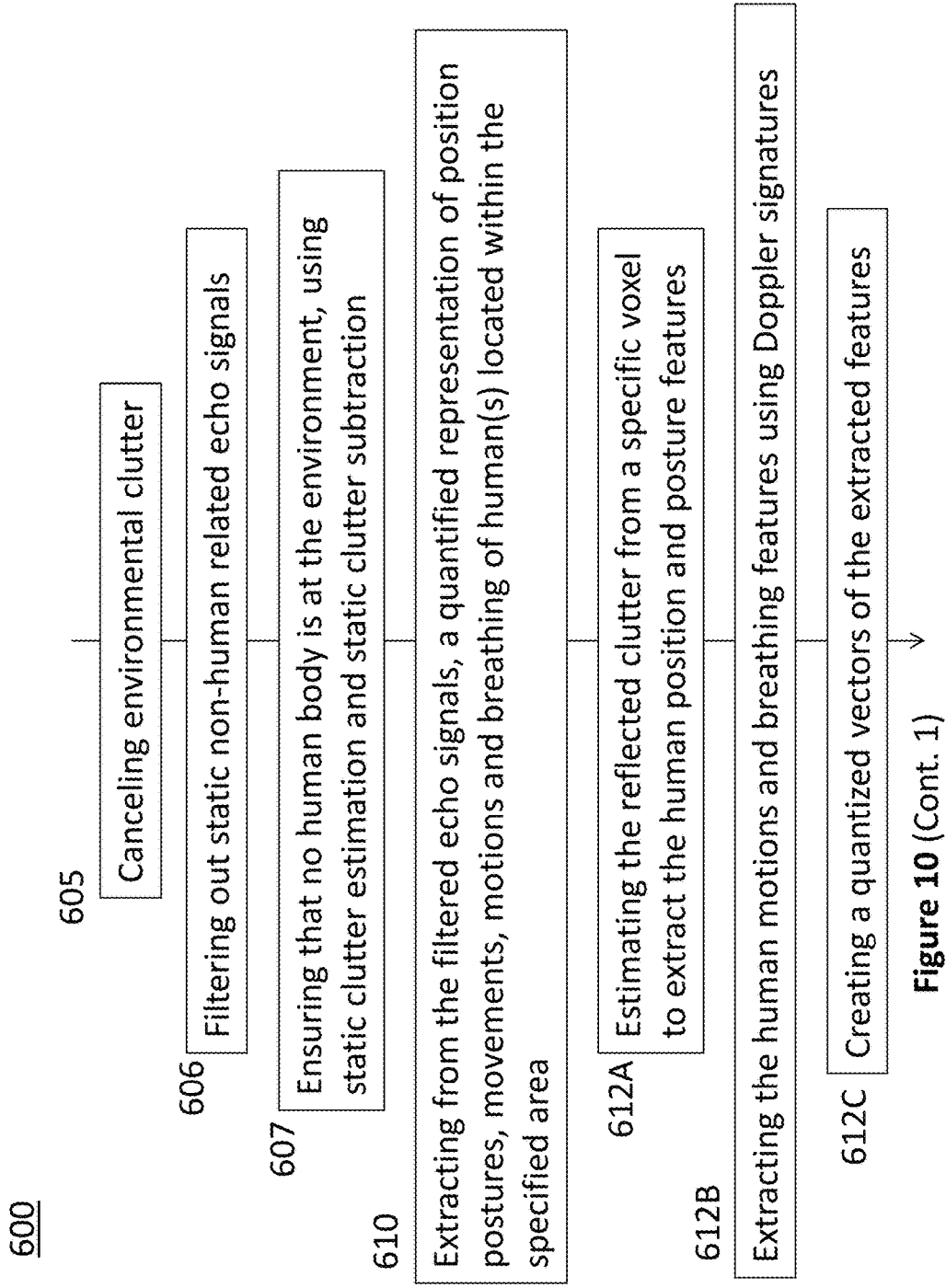
Figure 10 (Cont. 1)

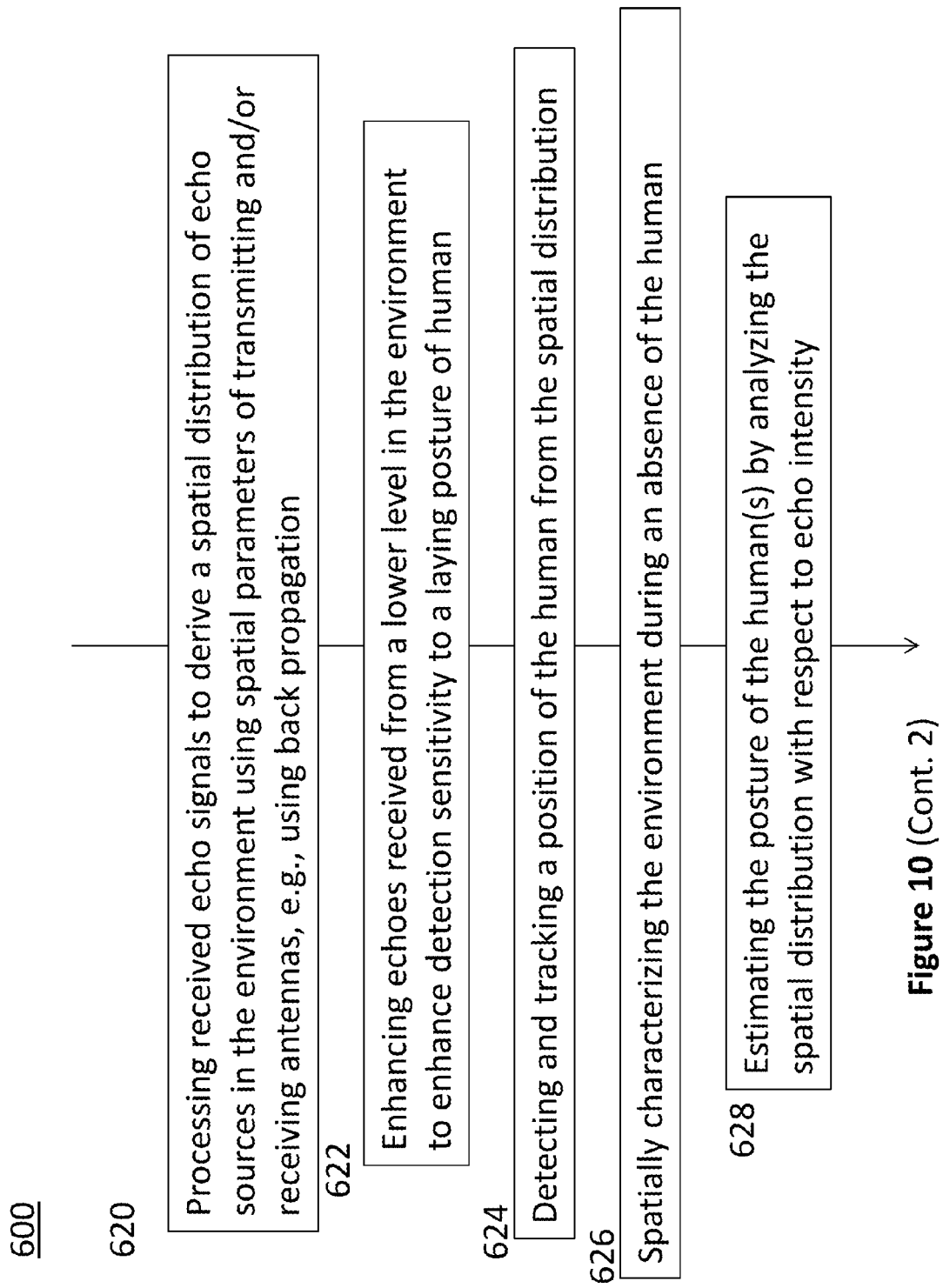
Figure 10 (Cont. 2)

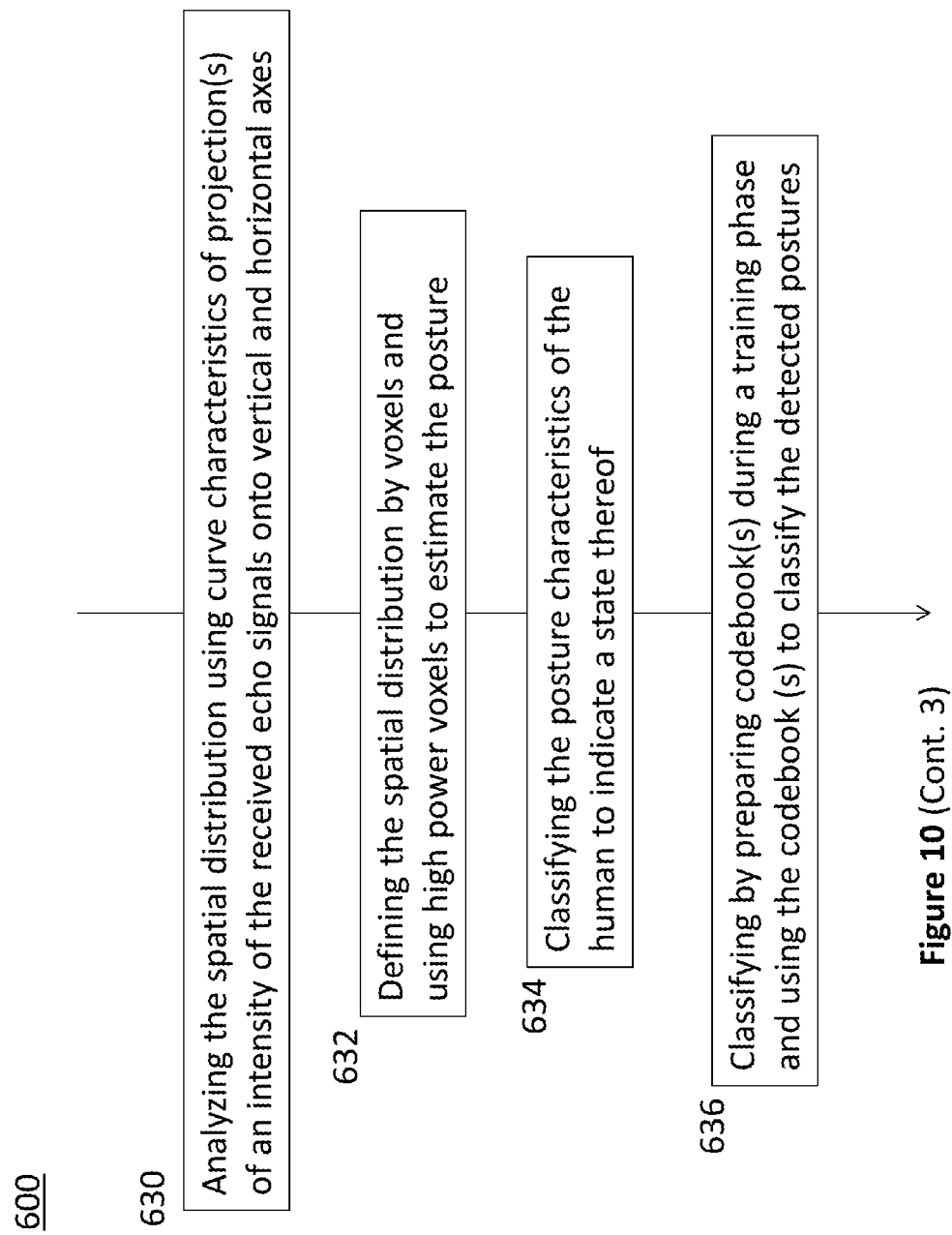

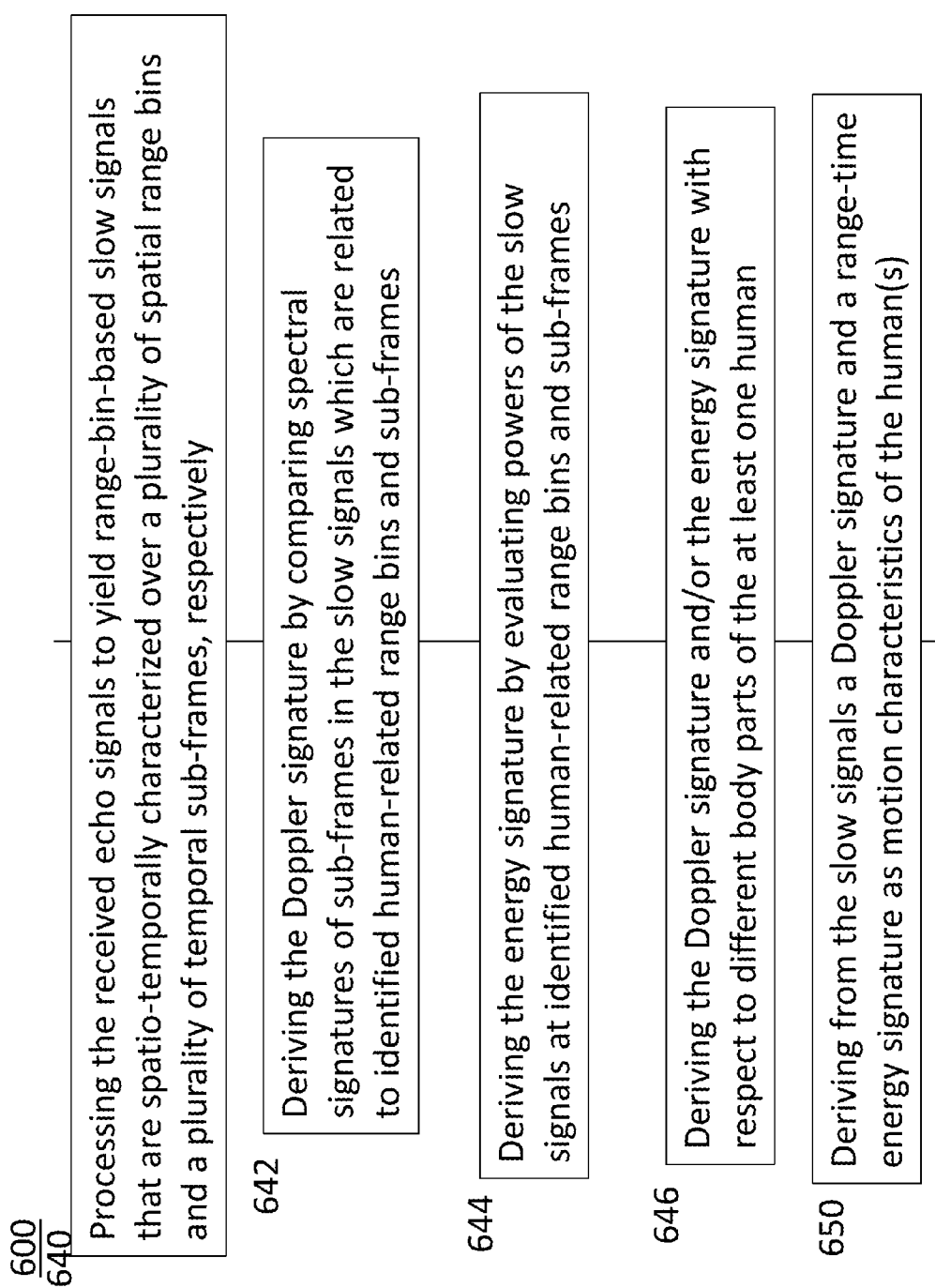
Figure 10 (Cont. 4)

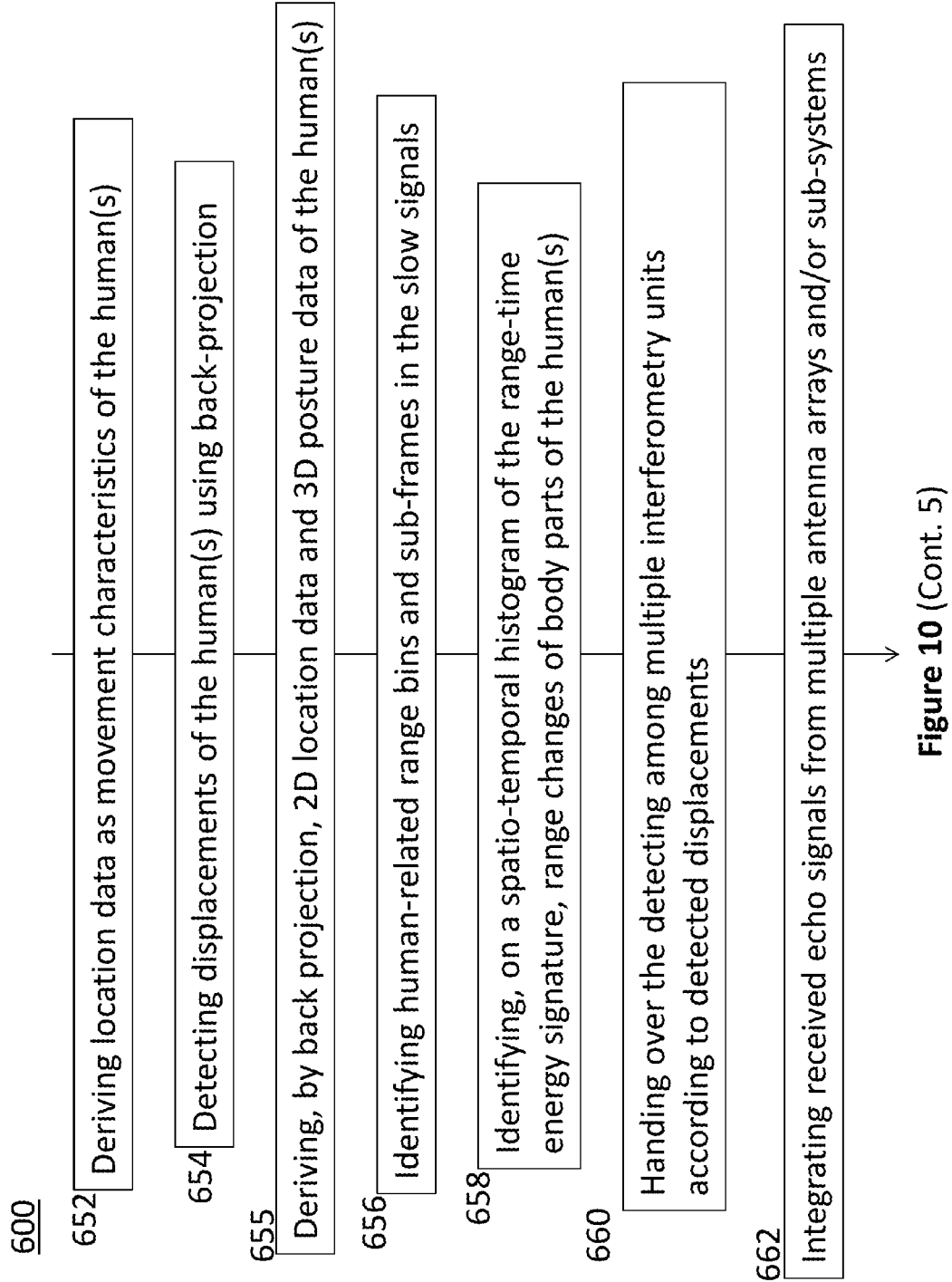

Figure 10 (Cont. 6)

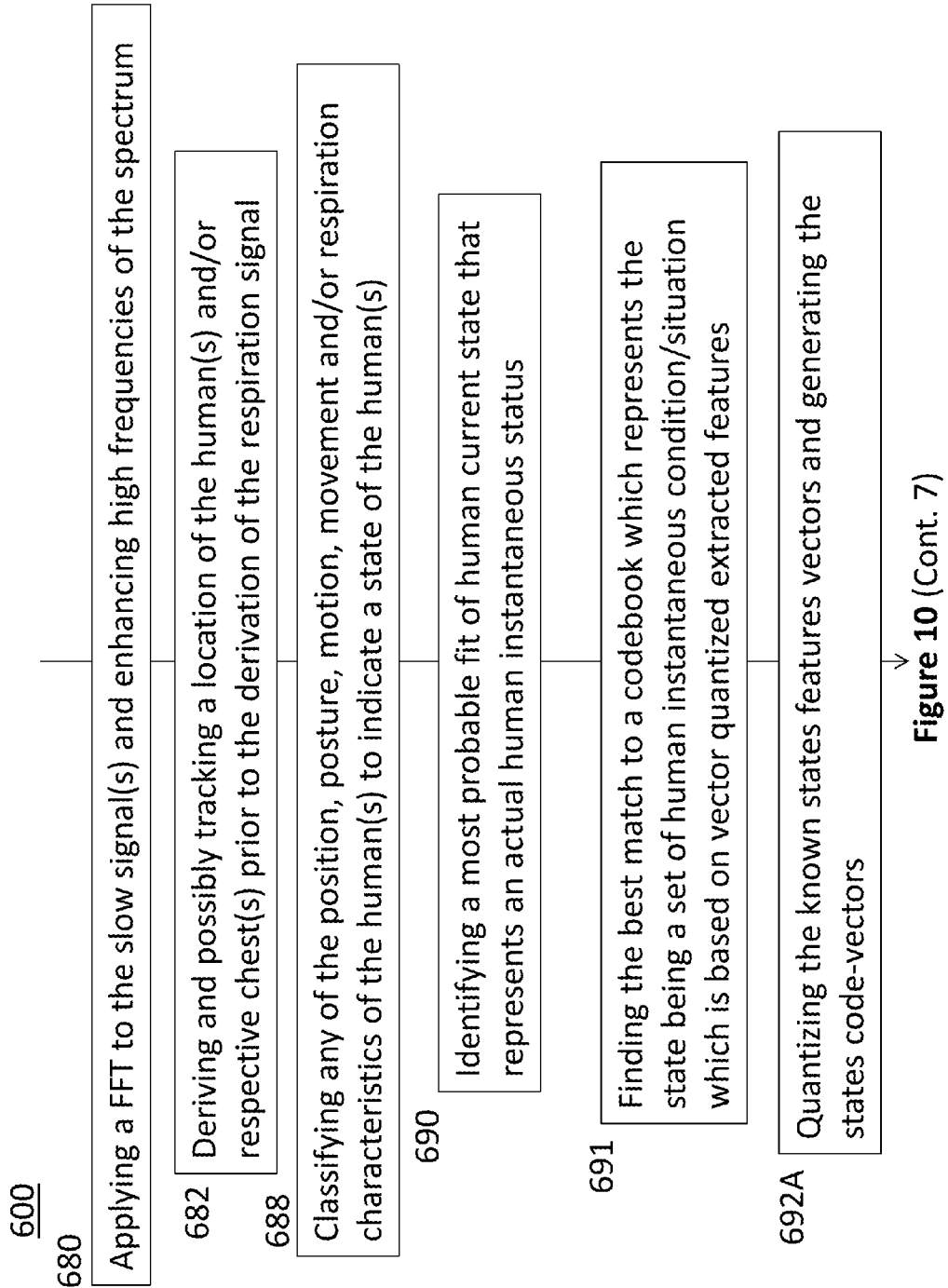

HUMAN RESPIRATION FEATURE EXTRACTION IN PERSONAL EMERGENCY RESPONSE SYSTEMS AND METHODS

CROSS REFERENCE TO RELATED APPLICATIONS

This application is a continuation-in-part of U.S. patent application Ser. No. 15/049,156 filed on Feb. 22, 2016, which in turn is a continuation-in-part of and claimed priority from U.S. patent application Ser. No. 15/008,460 filed on Jan. 28, 2016, which in turn is a continuation-in-part of and claimed priority from U.S. patent application Ser. No. 14/983,632, filed on Dec. 30, 2015, which in turn is a continuation-in-part of and claimed priority from U.S. patent application Ser. No. 14/753,062, filed on Jun. 29, 2015, all of which are incorporated herein by reference in their entireties.

FIELD OF THE INVENTION

The present invention relates to the field of elderly monitoring using ultra-wide band interferometry, and more particularly, to human respiration feature extraction in personal emergency response system (PERS).

BACKGROUND OF THE INVENTION

Elderly people have a high risk of falling, for example, in residential environments. As most of elder people will need immediate help after such a fall, it is crucial that these falls are monitored and addressed in real time. Specifically, one fifth of falling elders are admitted to hospital after staying on the floor for over one hour following a fall. The late admission increases the risk of dehydration, pressure ulcers, hypothermia and pneumonia. Acute falls lead to high psychological effects of fear and negatively impact the quality of daily life.

Most of the existing personal emergency response systems (PERS), which take the form of fall detectors and alarm buttons, are wearable devices. These wearable devices have several disadvantages. First, they cannot recognize the human body positioning and posture.

Second, they suffer from limited acceptance and use due to: elders' perception and image issues, high rate of false alarms and miss-detects, elders neglect re-wearing when getting out of bed or bath, and the fact that long term usage of wearable devices might lead to user skin irritations. Third, the wearable PERS are used mainly after experiencing a fall (very limited addressable market).

Therefore, there is a need for a paradigm shift toward automated and remote monitoring systems.

SUMMARY OF THE INVENTION

Some embodiments of the present invention provide a unique sensing system and a breakthrough for the supervision of the elderly during their stay in the house, in general, and detect falls, in particular. The system may include: a UWB-RF Interferometer, Vector Quantization based Human states classifier, Cognitive situation analysis, communication unit and processing unit.

One aspect of the present invention provides a method comprising: (i) transmitting, via at least one transmitting antenna, ultra-wide band (UWB) radio frequency (RF) signals at an environment including at least one human, and receiving, via at least one receiving antenna, echo signals from the environment, (ii) processing the received echo signals to yield a range-bin-based slow signal that is spatially characterized over a plurality of spatial range bins, (iii) estimating at least one respiration feature of the at least one human by analyzing the slow signal, and classifying the respiration feature(s) to indicate respiration mode(s) of the human(s).

According to some embodiments of the present invention, the system may be installed in the house's ceiling, and covers a typical elder's apartment with a single sensor, using Ultra-Wideband RF technology. It is a machine learning based solution that learns the elder's unique characteristics (e.g., stature, gait and the like) and home primary locations (e.g., bedroom, restroom, bathroom, kitchen, entry, etc.), as well as the home external walls boundaries.

According to some embodiments of the present invention, the system may automatically detect and alert emergency situation that might be encountered by elders while being at home and identify the emergency situations.

According to some embodiments of the present invention, the system may detect falls of elderly people, but may also identify other emergencies situations, such as labored breathing, sleep apnea, as well as other abnormal cases, e.g., sedentary situation, repetitive non-acute falls that are not reported by the person. It is considered as a key element for the elderly connected smart home, and, by connecting the system to the network and cloud, it can also make use of data analytics to identify new patterns of emergencies and abnormal situations.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 2A and 2B are high level schematic illustrations of configurations of a linear baseline (SAAA), according to some embodiments of the invention.

FIG. 2C illustrates a non-limiting example for image resolution data achieved under the parameters defined above, for the various human posture and ranges from the system, according to some embodiments of the invention.

FIGS. 2Q and 2R illustrate the coverage of the system's surroundings in the non-limiting case of four baselines, according to some embodiments of the invention.

FIG. 3A is a high level schematic block diagram of the system which schematically illustrates modules related to the posture extraction, in accordance with embodiments of the present invention.

FIG. 3B is a high level schematic block diagram of the operations performed by a preprocessing unit, in accordance with embodiments of the present invention.

FIG. 3I which is a schematic block diagram illustrating a training module in the posture classifier, according to some embodiments of the invention.

FIG. 3J is a schematic block diagram of a classifying stage in the posture classifier, according to some embodiments of the invention.

FIG. 4H is a high-level schematic flowchart illustration of an exemplary motion energy features extractor, according to some embodiments of the invention.

FIG. 4I is a high-level schematic flowchart illustration of an exemplary range-time preprocessing and segmentation flow as part of derivation of energy signature, according to some embodiments of the invention.

FIGS. 5I and 5J provide an exemplary illustration of pre-accumulation phase shifted time signals, and of a post-accumulation respiration echo signal, respectively, according to some embodiments of the invention.

FIG. 6A is a table illustrating an exemplary states definition in accordance with some embodiments of the present invention.

FIG. 6B is a table illustrating an exemplary states matrix in accordance with some embodiments of the present invention.

FIG. 6C is a table illustrating exemplary abnormal patterns in accordance with some embodiments of the present invention.

Figure 1A:
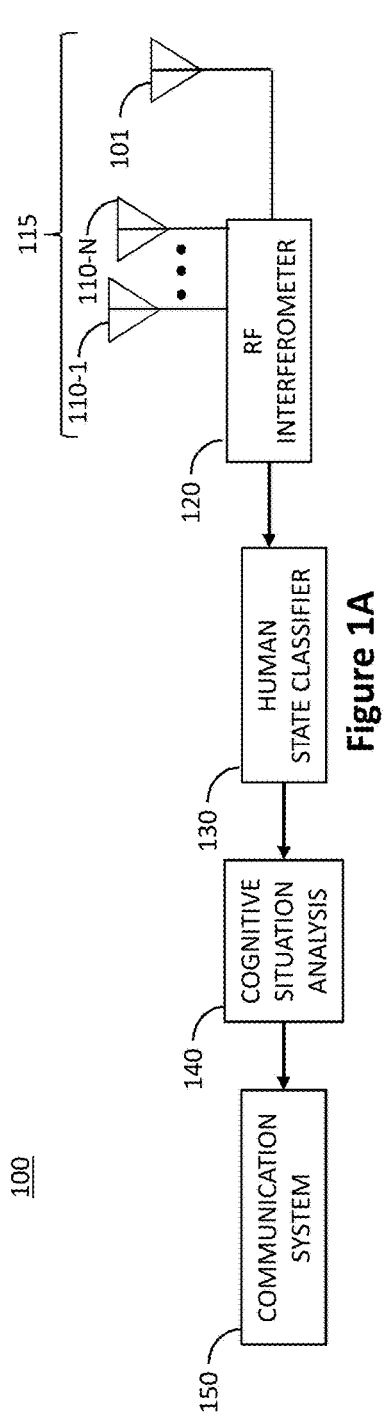
FIGS. 1A-1C are block diagrams illustrating a non-limiting exemplary architecture of a system in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Prior to the detailed description being set forth, it may be helpful to set forth definitions of certain terms that will be used hereinafter.

The term "slow signal" as used in this application refers to the signal derived from received echo (fast) signals and is spatio-temporally characterized over multiple range bins (as spatial units) and multiple sub-frames (as temporal units).

The term "motion" as used in this application refers to the motion of the body and/or of body parts without displacement of the whole body as a bulk, such as gestures, limb motions, posture changes such as sitting down or standing up, gait (separated from the displacement), motion suddenness (e.g., possible fall or collapse) etc.

The term "movement" as used in this application refers to the displacement of a person's body as a whole, irrespective of the motion of body parts such as the limbs. In certain embodiments, the term "movement" may be used to refer only to radial displacements and radial components of displacement with respect to the antenna, whereas tangential displacement may be discarded. In certain embodiments, tangential components of the displacement may be taken into account as movements as well.

The terms "transmitting antenna" and "receiving antenna" as used in this application refer are non-limiting in the sense that the system may be configured to transmit signals via antennas denoted below as receiving antennas and receive echo signals via antennas denoted below as transmitting antennas. It is known in the art that the terms "transmitting antenna" and "receiving antenna" are interchangeable in the sense that the associated electronic circuitry may be configured to reverse their respective functions. System optimization may be carried out to determine which antennas are to be operated as transmitting antennas and which as receiving antennas. For the sake of simplicity alone, most of the following description related to transmitting antennas as single antennas and to receiving antennas as baselines (linear arrangements of antennas). It is explicitly noted that receiving antennas may be single antennas and transmitting antennas may be baselines, while maintaining the applicability and scope of the invention as described below.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

A sensing system is provided for the supervision and fall detection of the elderly during their stay in the house. The system combines an UWB-RF (ultra-wide band radio frequency) interferometer with a vector-quantization-based human states classifier implementing cognitive situation analysis. The UWB-RF interferometer may implement a synthetic aperture and the human states classifier may have two stages and employ abnormal states pattern recognition. The system may be installed in the house's ceiling, and cover the area of a typical elder's apartment (<100 sqm) with a single sensor, using ultra-wideband RF technology.

The system may use machine learning to learn the elder's unique characteristics (e.g., body features, stature, gait etc.) and the home environment, and uses a human state classifier to determine the instantaneous human state based on various extracted features such as human posture, motion, location at the environment as well as human respiration. The system may automatically detect, identify and alert concerning emergency situations (particularly falls) that might be encountered by elders while being at home and identifies the emergency situations. The system detects falls as well as identifies other emergency situations such as labor briefing, sedentary situations and other abnormal cases. The decision process may be done based on the instantaneous human state (local decision) followed by abnormal states patterns recognition (global decision). The system global decision (emergency alert) is communicated to the operator through the communication system and two-ways communication is enabled between the monitored person and the remote operator.

The system may comprise a communication sub-system to communicate with the remote operator and centralized system for multiple users' data analysis. A centralized system (cloud) may receive data from distributed PERS systems to perform further analysis and upgrading the systems with updated database (codebooks).

Advantageously, the system may be used as a key element for the elderly connected smart home and by connecting the system to the network and cloud, it can also make a use of big data analytics to identify new patterns of emergencies and abnormal situations. The system overcomes the disadvantages of existing PERS such as wearable fall detectors and alarm buttons, as well as visual surveillance, by recognizing the human body positioning and posture and provides a significant enhancement in acceptability as it overcomes (i) elders' perception and image issues, (ii) high rate of false alarms and misdetections, (iii) elders' neglect of re-wearing when getting out of bed or bath, and (iv) user skin irritations by long term usage of wearable devices. Moreover, it may be used to prevent the first experience of fall (after which the use of wearable devices is first considered) and does not involve privacy issues that visual surveillance system arise.

Figure 1B:
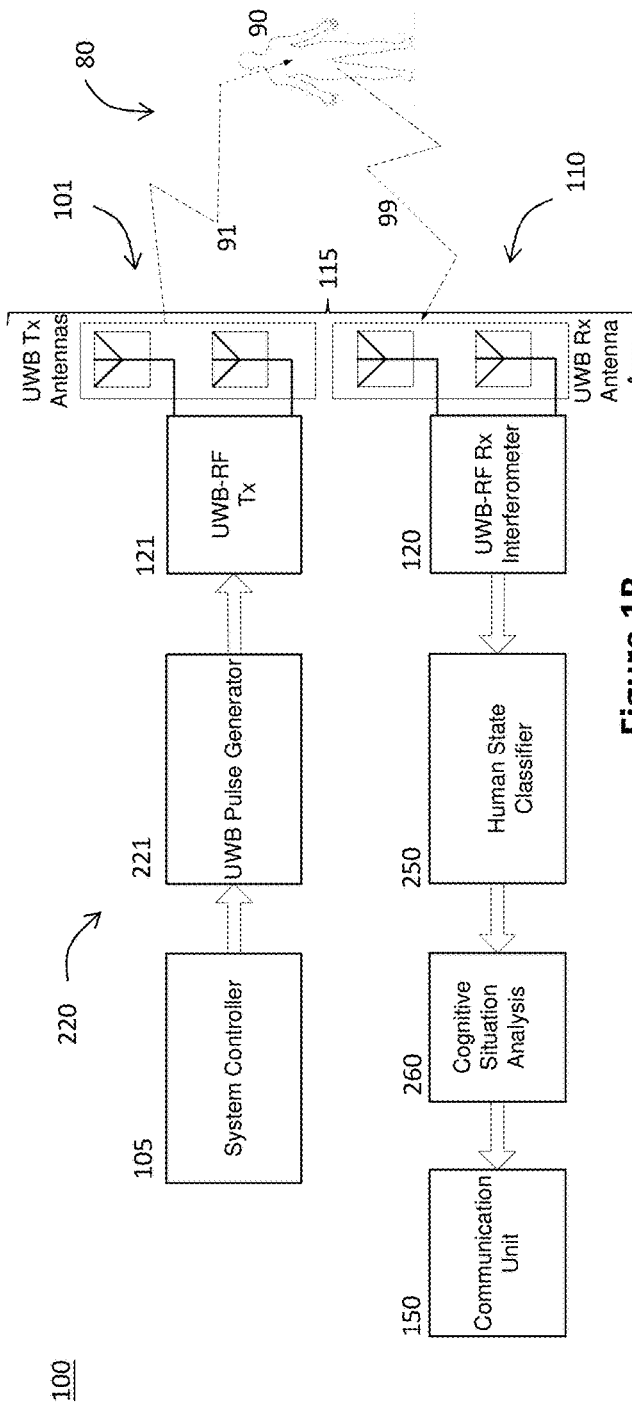
Figure 1C:
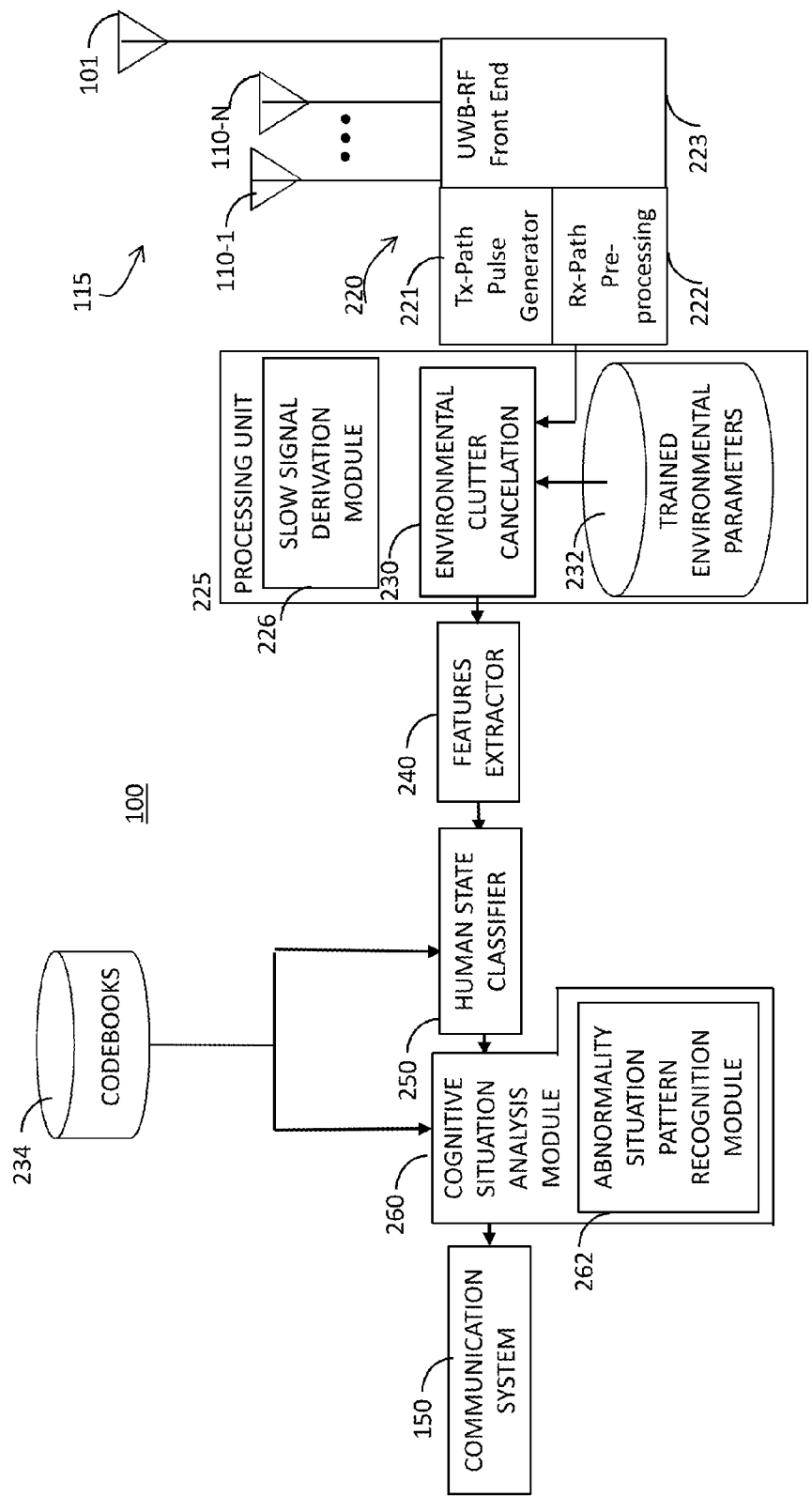

FIGS. 1A-1C are block diagrams illustrating a non-limiting exemplary architecture of a system 100 in accordance with some embodiments of the present invention. As illustrated in FIG. 1A, system 100 may include a radio frequency (RF) interferometer 120 configured to transmit signals via Tx antenna 101 and receive echo signals via array 110-1 to 110-N. Tx antennas 101 and Rx antennas 110 are part of an antenna array 115. It should be noted that transmit antennas and receive antennas may take different forms, and, according to a preferred embodiment, in each antenna array they may be a single transmit antenna and several receive antennas. An environmental clutter cancellation module may or may not be used to filter out static non-human related echo signals. System 100 may include a human state feature extractor 130 configured to extract from the filtered echo signals, a quantified representation of position postures, movements, motions and breathing of at least one human located within the specified area. A human state classifier may be configured to identify a most probable fit of human current state that represents an actual human instantaneous status. System 100 may include an abnormality situation pattern recognition module 140 configured to apply a pattern recognition based decision function to the identified states patterns and to determine whether an abnormal physical event has occurred to the at least one human in the specified area. A communication system 150 for communicating with a remote server and end-user equipment for alerting (not shown here). Communication system 150 may further include two-way communication system between the caregiver and the monitored person for real-time assistance.

As illustrated in FIG. 1B, system 100 comprises a system controller 105, a UWB-RF interferometry unit 220, a human state classifier 250, a cognitive situation analysis module 260 and communication unit 150, the operation of which is explained below (see FIG. 1C). UWB-RF interferometry unit 220 comprises a UWB pulse generator 221, a UWB RF transmission module 121, UWB transmitting antennas 101 that deliver a UWB RF signal 91 to an environment 80, e.g., one including at least one human 90, UWB receiver antennas 110 that receive echo signals 99 from the scene and UWB RF interferometer 120 that processes the received echo signals and provide signals for extraction of multiple features, as explained below. Tx antennas 101 and Rx antennas 110 are part of antenna array 115.

FIG. 1C is another block diagram illustrating the architecture of system 100 in further details in accordance with some embodiments of the present invention as follows. UWB-RF interferometry unit 220 transmits an ultra-wideband signal (e.g., pulse) into the monitored environment and receives back the echo signals from multiple antenna arrays to provide a better spatial resolution by using the Synthetic Antenna Aperture approach. For example, UWB-RF interferometry unit 220 may comprise transmission path pulse generator 221, UWB-RF front end 223 connected to transmitting antenna(s) 101 and receiving antennas 110-1 . . . 110-N, e.g., arranged in arrays, and configured to transmit UWB RF signals generated by generator 221 to the environment and deliver echo pulses received therefrom to a reception path pro-processing module 222, possible implementing clutter cancellation with respect to clutter originating from the environment and not from human(s) in the environment. In order to increase the received signal-to-noise (SNR), the transmitter sends multiple UWB pulses and receiver receives and integrates multiple echo signals (processing gain). The multiple received signals (one signal per each Rx Antenna) are sampled and digitally stored for further signal processing.

Environmental clutter cancellation 230 may be part of a processing unit 225 as illustrated and/or may be part of UWB-RF interferometry unit 220, e.g., clutter cancellation may be at least partially carried out by a Rx path pre-processing unit 222. The echo signals are pre-processed to reduce the environmental clutter (the unwanted reflected echo components that are arrived from the home walls, furniture, etc.). The output signal mostly contains only the echo components that reflected back from the monitored human body. Environmental clutter cancellation 230 is fed with the trained environmental parameters 232. In addition, the clutter cancellation includes a stationary environment detection (i.e., no human body at zone) to retrain the reference environmental clutter for doors or furniture movement cases.

The environmental clutter cancellation is required to remove unwanted echo components that are reflected from the apartment's static items, such as walls, doors, furniture, etc. The clutter cancellation is done by subtracting the unwanted environmental clutter from the received echo signals. The residual clutter represents the reflected echo signals from the monitored human body. According to some embodiments of the present invention, the clutter cancellation also includes stationary environment detection to detect if no person is at the environment, such as when the person is not at home, or is not at the estimated zone. Therefore, a periodic stationary clutter check is carried out, and new reference clutter fingerprint is captured when the environment is identified as stationary. The system according to some embodiments of the present invention re-estimates the environmental clutter to overcome the clutter changes due to doors or furniture movements.

Feature extractor 240 that processes the "cleaned" echo signals to extract the set of features that will be used to classify the instantaneous state of the monitored human person (e.g., posture, location, motion, movement, breathing, see more details below). The set of the extracted features constructs the feature vector that is the input for the classifier.

Human state classifier 250—The features vector is entered to a Vector Quantization based classifier that classifies the instantaneous features vector by statistically finding the closest pre-trained state out of a set of N possible states, i.e., finding the closest code vector (centroid) out of all code vectors in a codebook 234. The classifier output is the most probable states with its relative probability (local decision).

Cognitive Situation Analysis (CSA) module 260—This unit recognizes whether the monitored person is in an emergency or abnormal situation. This unit is based on a pattern recognition engine (e.g., Hidden Markov Model—HMM, based). The instantaneous states with their probabilities are streamed in and the CSA search for states patterns that are tagged as emergency or abnormal patterns, such as a fall. These predefined patterns are stored in a patterns codebook 234. In case that CSA recognizes such a pattern, it will send an alarm notification to the healthcare center or family care giver through the communication unit (e.g., Wi-Fi or cellular). Two-way voice/video communication unit 150—this unit may be activated by the remote caregiver to communicate with the monitored person when necessary. UWB-RF interferometry unit 220 may include the following blocks: (i) Two-Dimensional UWB antenna array 110-1- 110-N to generate the synthetic aperture through all directions, followed by antenna selector. (ii) UWB pulse generator and Tx RF chain to transmit the pulse to the monitored environment UWB Rx chain to receive the echo signals from the antenna array followed by analog to digital converter (ADC). The sampled signals (from each antenna) are stored in the memory, such as SRAM or DRAM.

In order to increase the received SNR, the RF interferometer may repeat the pulse transmission and echo signal reception per each antenna (of the antenna array) and coherently integrate the digital signal to improve the SNR.

Antenna Array and Interferometer

In order to successfully classify the human posture (based on the received echo signals) from any home location, an optimized 2-Dimensional (2D) switched antenna array with a very wide field of view (FOV) was designed to generate the 3-dimensional (3D) back-projection image with a small, or even with a minimal number of antennas. In order to cover the complete home environment, it may be split into several home cells, each with an installed system that detects and tracks the monitored person through the home environment. Coverage and infrastructure consideration may be used to determine the exact system configuration at different home environment. When the monitored person moves from one home cell to another, a pre-defined set of criteria may be used to determine whether to hand-over the human tracking from one cell to another. The width of the antenna array FOV may be configured to reduce the number of home cells while maintain the system's efficiency and reliability.

Figure 2D:
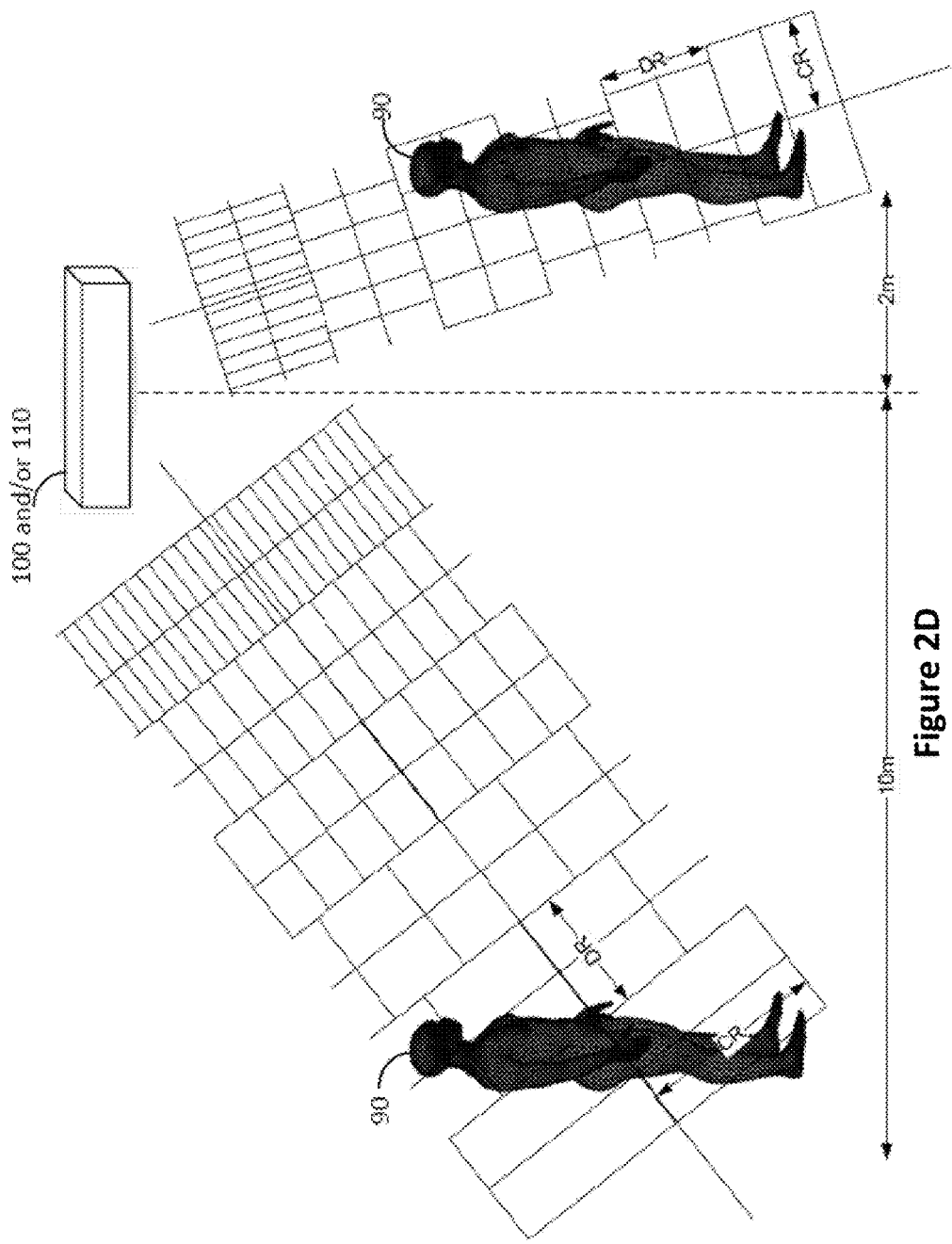
FIG. 2D schematically illustrates the dependency of image resolution on the orientation of the object, according to some embodiments of the invention.

FIGS. 2A and 2B are high level schematic illustrations of configurations of a linear baseline (SAAA) 110, according to some embodiments of the invention. FIG. 2A schematically illustrates an inline configuration with individual elements separated by D/2 and a staggered configuration with two lines of alternating elements separated by D/2 (on each line elements are separated by D). FIG. 2B schematically illustrates some more details of linear baseline 110. FIG. 2C illustrates a non-limiting example for image resolution data achieved under the parameters defined above, for the various human posture and ranges from system 100, according to some embodiments of the invention. FIG. 2D schematically illustrates the dependency of image resolution on the orientation of the object, according to some embodiments of the invention.

The human posture may be determined by analyzing and classifying the 3-dimensional human image as reconstructed by the back-projection function based on the received echo signals (see above). The image resolution is determined by the interferometer's Down Range (the image resolution in the interferometer's radial direction—$\Delta R_{dr}$) and Cross Range (the image resolution in the interferometer's angular direction—$\Delta R_{cr}$), with $\Delta R_{dr}$ determined by the transmitted pulse width and $\Delta R_{cr}$ determined by the Antenna Aperture and the range from the interferometer. In order to increase the antenna aperture, a Synthetic Aperture Antenna Array (SAAA) approach may be used by a switched antenna array. Every SAAA is termed herein a Baseline.

The resolutions for SAAA (Baseline) 110 is given by $\Delta R_{dr}=c/2$ B.W. and $\Delta R_{cr}=\lambda R/S.A.$ with c being the speed of light, B.W. being the pulse bandwidth, $\lambda$ being the wave length, R being the range from the system's antenna 110, and S.A. being the synthetic aperture. $\Delta R_{dr}$ and $\Delta R_{cr}$ are selected to ensure that classifier 250 can recognize the human posture. As a non-limiting example, the following parameter ranges may be used: B.W. between 1 and 3 GHz (in a non-limiting example, B.W.=1.5 GHz), $\lambda$ between 0.03 m and 0.1 m (in a non-limiting example, $\lambda$=0.06 m), f between 3 and 9 GHz (in a non-limiting example, f=5 GHz), S.A. between 0.1 m and 0.7 m (in a non-limiting example, S.A.=0.33 m), $N_{antennas}$ between 3 and 21 antennas per baseline (in a non-limiting example, N=12), Antenna spacing between 0.03 m and 0.1 m (in a non-limiting example, 0.03 m) with respect to scene parameters: Ceiling height=2.5 m, sitting person height=1 m, standing person height=1.5 m. Terminated antennas are shown as elements that regulate the operation of the last receiver antennas 110-1 and 110-N in the row.

FIG. 2C presents image downrange and cross-range resolutions with respect to the floor (assuming system 100 is mounted on the ceiling) to a sitting person, a standing person and laying person on floor. The linear baseline may be considered as a switched antenna array in a constant spacing between each antenna element 110-1 . . . 110-N. Specific antenna elements may be selected through a control channel 102 to perform the synthetic aperture.

FIG. 2D schematically illustrates the dependency of image resolution on the orientation of the object, according to some embodiments of the invention. The resolution is illustrated schematically by the size of the rectangles in the figure. As seen in FIG. 2C, the DownRange (DR) resolution is constant (depends on the bandwidth) while the Cross-Range (CR) resolution depends on the antenna aperture and on the distance of the human from antenna array 110 of system 100.

Figures 2E, 2F:
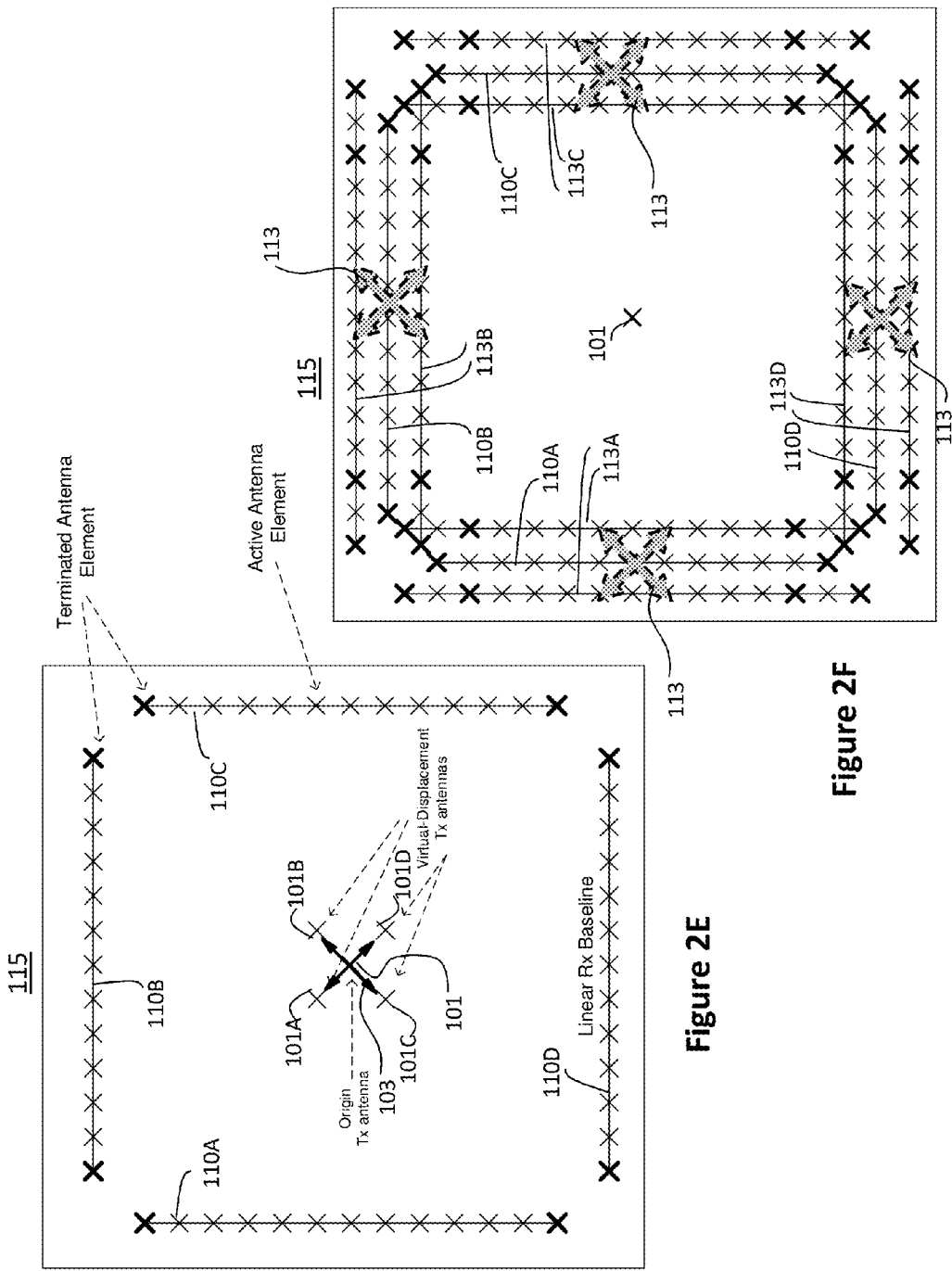
FIGS. 2E-2G are high level schematic diagrams illustrating conceptual 2D Synthetic Aperture Antennas arrays with virtual displacements, according to some embodiments of the invention.
Figure 2G:
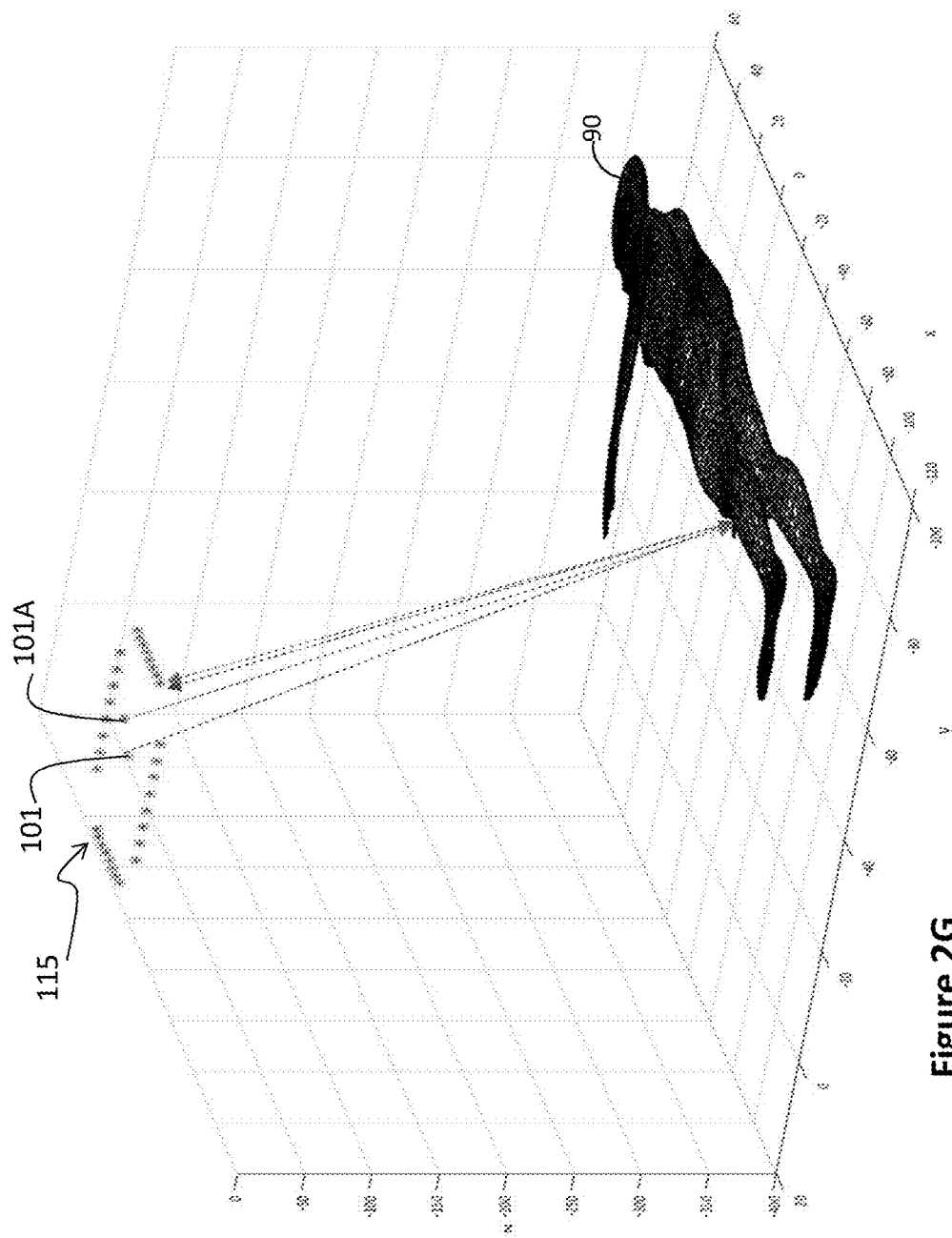

FIGS. 2E-2G are high level schematic diagrams illustrating conceptual 2D Synthetic Aperture Antennas arrays 115 with virtual displacements, according to some embodiments of the invention. In FIG. 2E, antenna array system 115 may include several linear arrays of antennas 110A, 110B, 110C and 110D, as a non-limiting example Each row (linear antenna 110A-D) may have a plurality of receive antennas 110-1 . . . 110-N as explained above; and/or additional transmitting and/or receiving antennas may be part of array 115. As a non-limiting example, one or more Tx antennas 101, 101A-D are illustrated at the central region of array 115. The solid line arrowed X marked 103 in FIG. 2E illustrates the relative shifts of Tx antennas 101A-D with respect to Tx antenna 101.

In FIG. 2F, 2D array structure 115 is shown with four baselines (linear arrays) 110A-D located along sides of a square. Tx antenna(s) 101 may be at the central region of 2D array structure 115. FIG. 2F illustrates schematically the effect of using virtual-displacement Tx Antennas 101A-D as virtual movements of Rx baselines 110A-D in a same displacement vector (step and direction) as the moves from the respective virtual-displacement Tx Antenna 101A-D to the original central Tx Antenna 101. The virtual displacements marked are denoted by broken line arrowed X's marked 113. Virtual displacement of Tx antenna 101 to 101A-D, e.g., by toggling between original central Tx antenna 101 and any of virtual-displacement Tx Antennas 101A-D introduces additional set of echo signals (Scatter) with different Radar Cross Section (RCS) from the target person with different signals' phases as a result of new roundtrip path from transmitting antenna, target, and receiving baselines (antennas arrays). The additional diverse scatter (four additional echo signals sets) improves the reconstructed image in both additional processing gain (target reflection intensity) as well as additional information due to the Tx antenna diversity.

It is emphasized that the indication of the transmitting antenna(s) as antenna elements 101 (and/or 101A-D) and the indication of the receiving baseline(s) as antenna elements 110 (e.g., 110A-D) may be reversed, i.e., antenna elements 101 (and/or 101A-D) may be used as receiving antennas and antenna elements 110 (e.g., 110A-D) may be used as transmitting antennas. System 100 may be configured with receiving antennas 101 and transmitting antennas 110.

In FIG. 2G, 2D array structure 115 is shown with four linear arrays 110A-D located along sides of a square and Tx antenna 101 at the center of the square. Baseline arrays 110A-D may be virtually displaced (marked schematically by the gray arrowed X's) to yield additional virtual baselines 113A-D to improve the back-projection image (see above) by increasing the number of echo signals 99 with additional diversity. Virtual displacements of baseline arrays 110A-110D (FIG. 2G) may be combined with virtual displacements of Tx antenna 101 (FIG. 2F) as well as with non-square positions (FIG. 2E) in any practical configuration to optimize the antenna array configuration with respect to performance, size and cost.

UWB RF interferometer 120 may be to use multiple antennas to implement virtual displacement of the baselines—either multiple antennas 101 are receiving antennas and the virtual displaced baselines 110 are transmitting baselines, or multiple antennas 101 are transmitting antennas and the virtual displaced baselines 110 are receiving baselines.

Figure 2I:
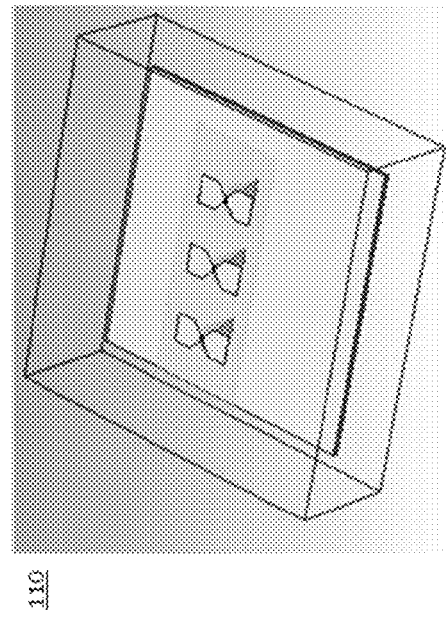
FIGS. 2H-2J are high level schematic illustrations of linear antennas arrays, according to some embodiments of the invention.
Figure 2H:
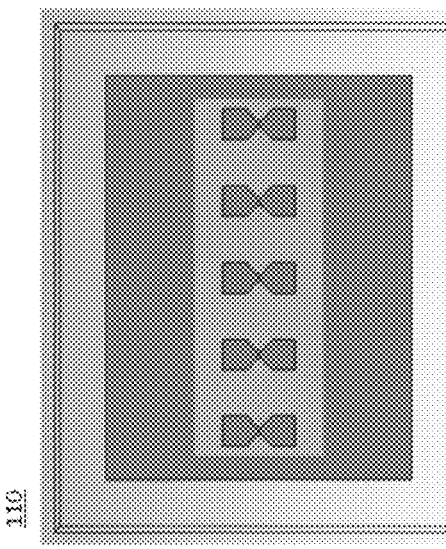
Figure 2J:
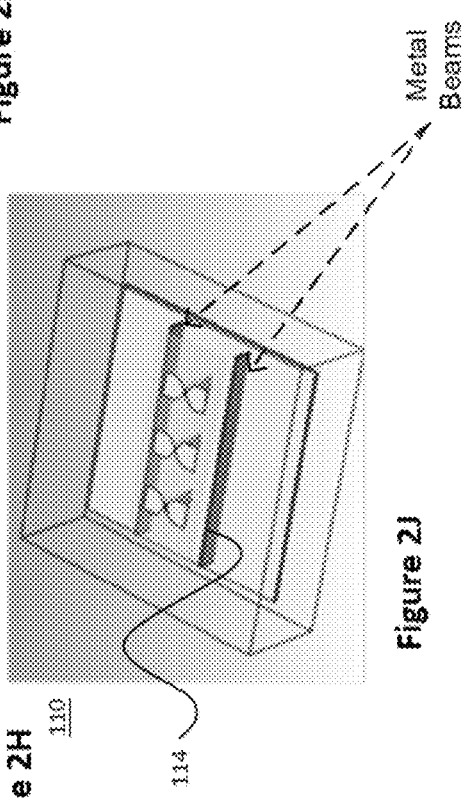
Figure 2K:
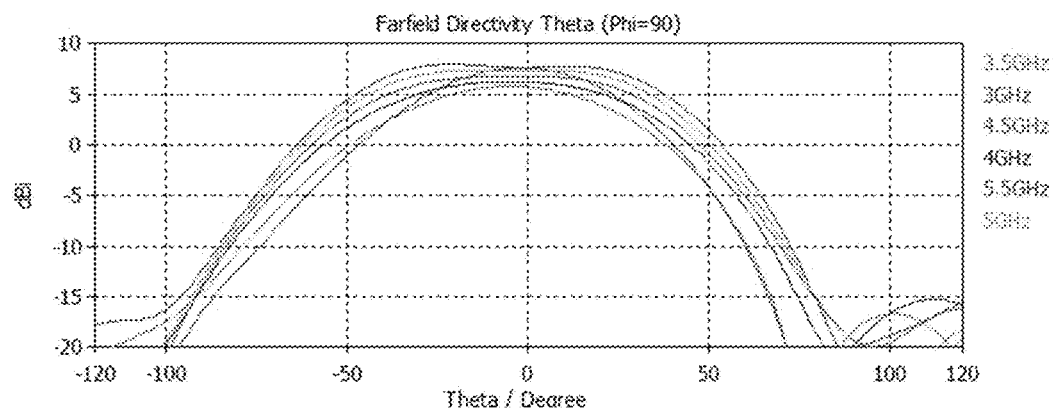
FIGS. 2K and 2L are simulation results that present the field of view of the array designs, according to some embodiments of the invention.
Figure 2L:
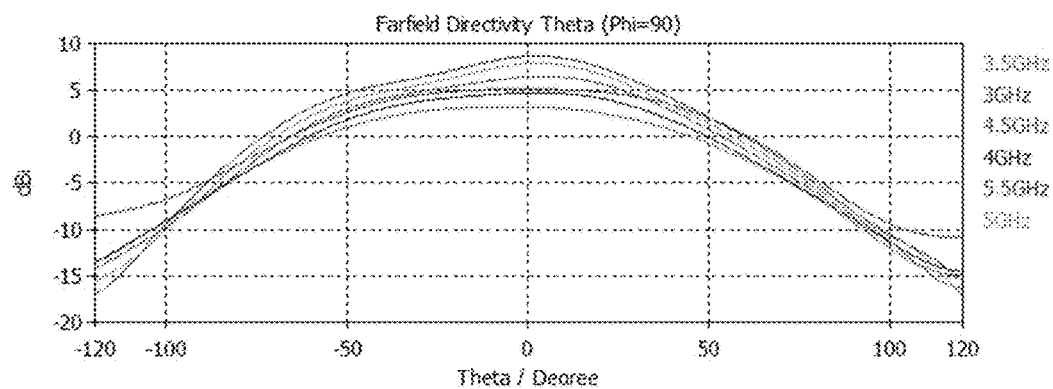
Figure 2M:
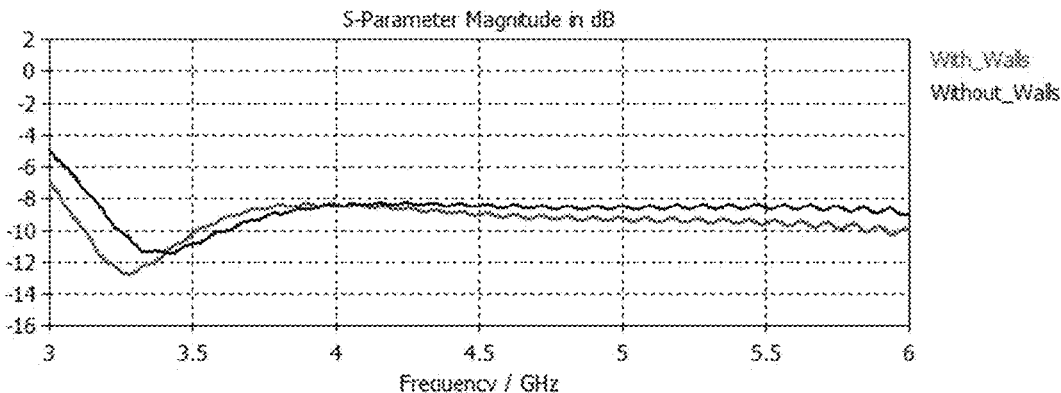
FIG. 2M shows simulation results that present the VSWR (Voltage Standing Wave Ratio) with and without metal beams, or walls, according to some embodiments of the invention.

FIGS. 2H-2J are high level schematic illustrations of linear antennas arrays 115, according to some embodiments of the invention. FIGS. 2K and 2L are simulation results that present the FOV of the array designs, according to some embodiments of the invention. The simulations are electromagnetic simulations at the E-Plane. As shown above, the major requirement from the linear antenna array for home environment is having a large field of view, which becomes a real challenge for a UWB antenna array. An innovated approach of widening the antenna array field of view is presented herein. Exemplary implementations of UWB antenna element 110 illustrated in FIGS. 2H-2J provide Field Of View (FoV) performances that are described in FIG. 2K (for the configuration of FIGS. 2H, 2I) and FIG. 2L (for the configuration of FIG. 2J) for a range of UWB frequencies. FIG. 2J schematically illustrates the addition of (e.g., two) metal beams 114 added along array 110 that widen the FOV, as illustrated in the simulation results in FIG. 2L (compare the wider FOV with respect to FIG. 2K). FIG. 2M shows simulation results that present the VSWR (Voltage Standing Wave Ratio) with and without metal beams 114 (=walls), according to some embodiments of the invention. FIG. 2M illustrates that metal walls 114 improve the antenna's VSWR at the relevant operation UWB band (4-6 GHz) with respect to an antenna lacking walls 114.

In certain embodiments, a BALUN (Balance/Unbalance unit) may be located vertically below the antennas strip (e.g., one or more of baselines 110).

Figure 2O:
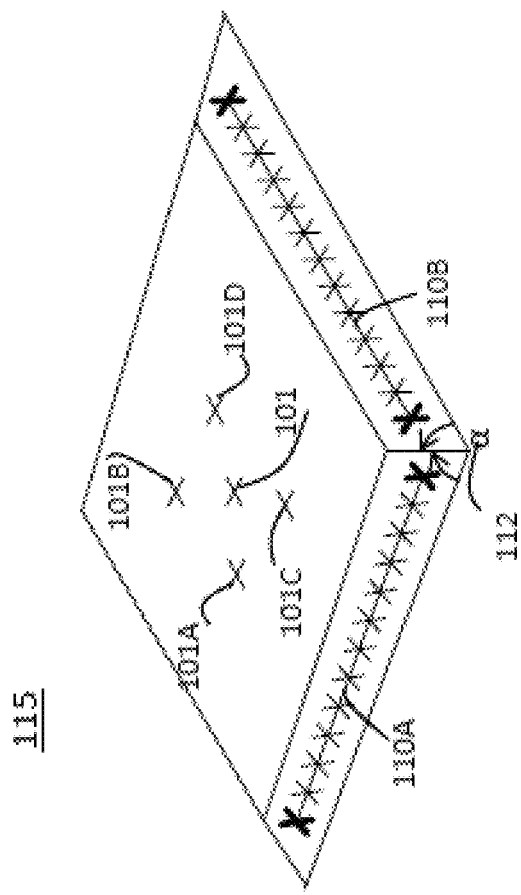
FIGS. 2N and 2O schematically illustrate an antenna array with tilted baselines, according to some embodiments of the invention.
Figure 2N:
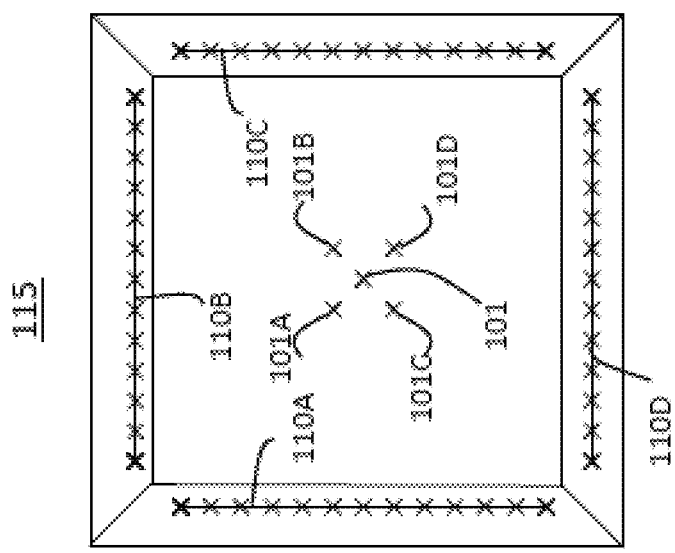

FIGS. 2N and 2O schematically illustrate antenna array 115 with tilted baselines 110A-D, according to some embodiments of the invention. Baselines 110A-D may be tilted from their common plane, e.g., by a tilt angle α 112 ranging e.g., between 10-60°, so that, when antenna array 115 is installed on a ceiling, baselines 110A-D do not face directly downwards but somewhat sideways, by tilt angle α 112. The provided tilt provides a larger field of view of antenna array 115 and hence system 100. An optimization may be carried out involving as parameters e.g., the antenna array unit vertical dimension (enabling the tilt), the field of view of the baselines and the array, and the degree of overlap between different baselines.

Figure 2P:
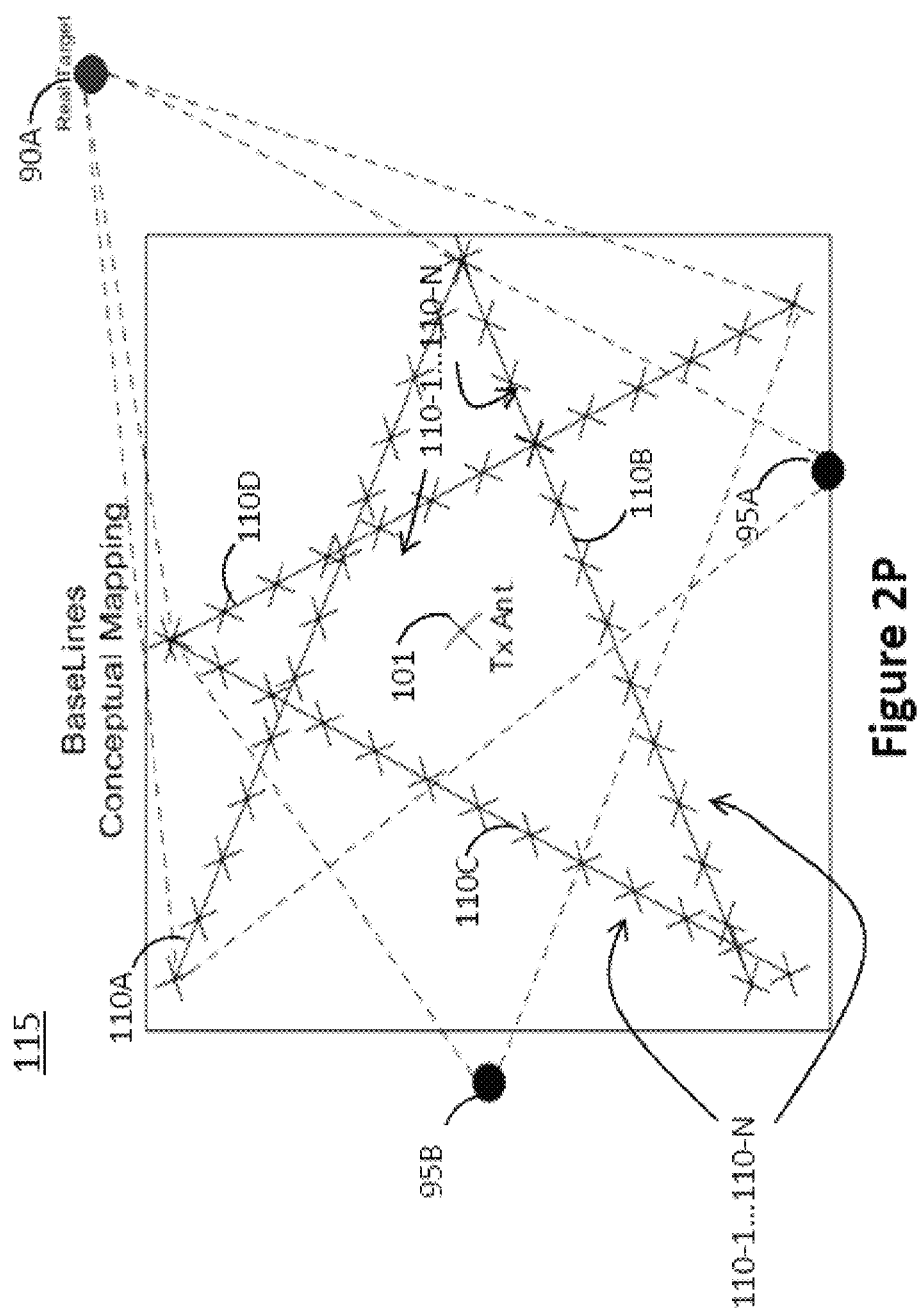
FIG. 2P is high level schematic illustrations of conceptual 2D Synthetic Aperture Antennas arrays providing unambiguous positioning, according to some embodiments of the invention.

FIG. 2P is a high level schematic illustrations of conceptual 2D Synthetic Aperture Antennas arrays 115 providing unambiguous positioning, according to some embodiments of the invention. These embodiments of non-limiting exemplary configurations enable to validate a location of a real target 90A by eliminating the possible images 95A and 95B after checking reflections 99 received at corresponding sub-arrays of antennas 110A and 110D, respectively. It is well understood that these configurations are non-limiting examples and other antennas configurations may be used effectively. Any combinations of embodiments of antenna arrays 115 illustrated herein are also considered part of the present invention. Two-dimensional array 115 guarantees that echo signals 99 are received from any direction around array 115 (assuming that each baseline 110A-D has a field of you of at least 120 degrees), and as shown in the illustration, solves the direction ambiguity of each individual baseline.

FIGS. 2Q and 2R illustrate the coverage of the system's surroundings in the non-limiting case of four baselines 110A-D, according to some embodiments of the invention. In FIG. 2Q, the coverage 117A-D of each baseline 110A-D is illustrated alongside uncovered angular ranges 116A-D. For the sake of clarity, single baseline 110 with coverage angular ranges 117 and uncovered angular ranges 116 is also illustrated. In this schematic non-limiting illustration, coverage angular ranges 117 are considered as being within the primary beam of the baseline (−3 dB), between +60° and −60°. It is noted that wider or narrower definitions may be alternatively used with respect to the baseline and system performance and requirements.

FIG. 2R exemplify possible angular ranges 117A-D in degrees (relating to 360° as the full circle coverage around array 115, i.e., 390°=30°) which cover the whole range around array 115 with overlaps in baseline ranges covered by two baselines. The FoV is defined as the −3 dB points and may be designed to cover 120° (±60°). Baselines 110 may be arranged to cover 360° with respect to array 115 with a certain overlap between baselines 110. Complementarily, baselines 110 may be arranged to solve the human target direction ambiguity by sufficient coverage and overlap requirements. Similar consideration may be taken with respect to either or both primary and secondary beams.

Figure 2S:
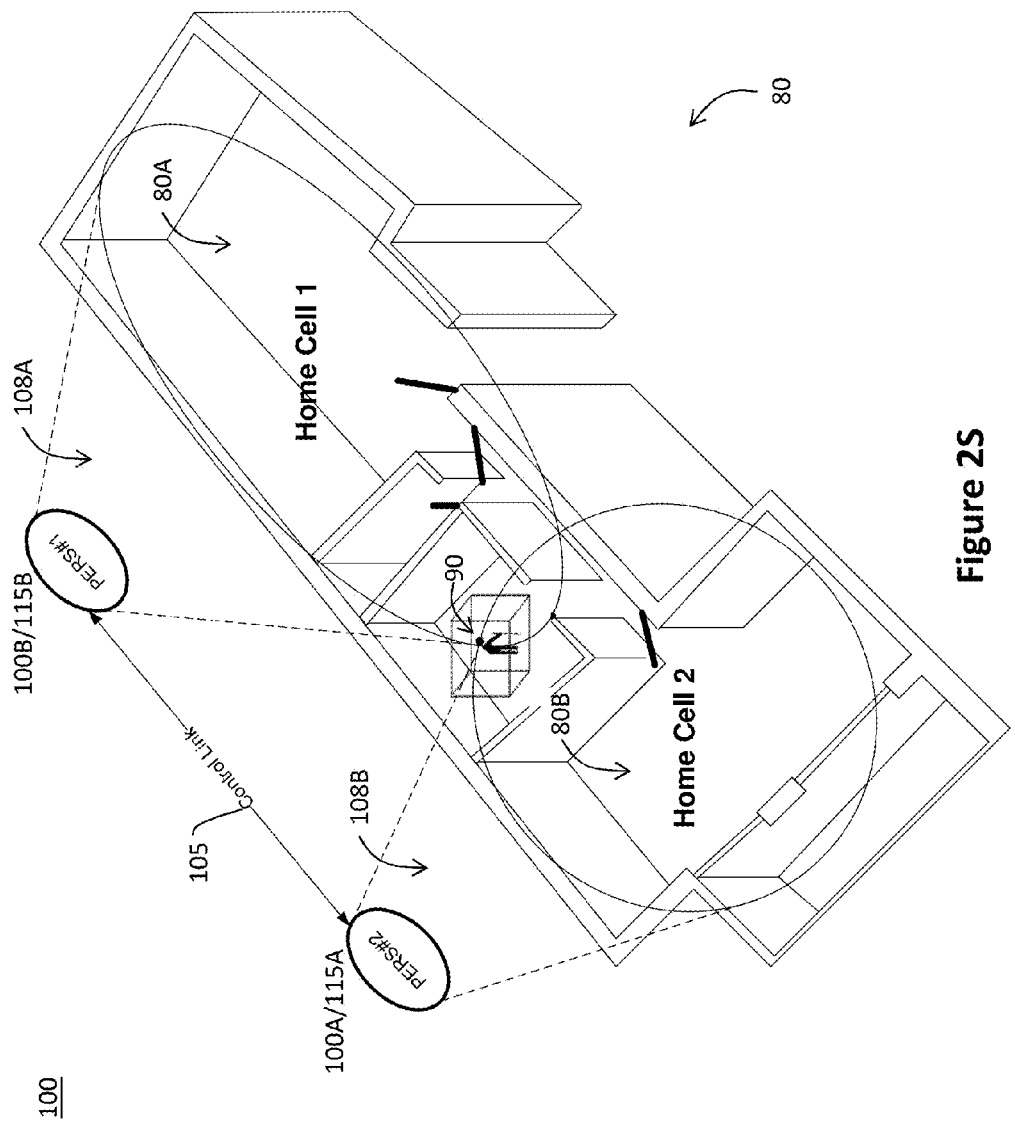
FIG. 2S is a high level schematic illustration of the system with two home cells as a non-limiting example, according to some embodiments of the invention.

FIG. 2S is a high level schematic illustration of system 100 with two home cells 108A and 108B as a non-limiting example, according to some embodiments of the invention. In some houses/apartments environments 80, PERS system 100 may comprise more than one sub-systems 100A, 100B and/or more than one antenna arrays 115A, 115B to cover whole environment 80 effectively and to monitor target person 90 everywhere in environment 80. For example, home environment 80 may be split into several home cells 80A, 80B, with respective sub-systems 100A, 100B and/or antenna arrays 115A, 115B that create respective sub-cells 108A, 108B. Sub-systems 100A, 100B, etc. may each comprise, e.g., a UWB RF interferometry unit, a human state feature extractor and a human state classifier. Control unit 105 of system 100 regulates (e.g., according to a pre-defined set of criteria) hand-overs between sub-systems 100A, 100B and/or between antenna arrays 115A, 115B as monitored person 90 moves between home cells 108A, 108B, while maintaining continuous detection and tracking. Examples for handing over criteria comprise: (i) $BPI_i > BPI_j$ with BPI being the back-projection (accumulated) intensity from the monitored person as received at $PERS_i$ 100A and $PERS_j$ 100B; and/or (ii) $PDR_i < PDR_j$ with PDR being the person down range distance from PERSi 100A and PERSj 100B as is estimated by each PERS unit. Abnormality situation pattern recognition module 140 of system 100 may be further configured to integrate input from all sub-systems 100A, 100B etc.

The multiple PERS sub-systems may hand-over person tracking among themselves by any of the following exemplary ways: (i) Hard hand-off: Once the handing over criteria are fulfilled by the releasing PERS unit, the person's tracking is moved from the releasing PERS unit which stops the tracking to the receiving PERS unit that starts tracking (break before make); (ii) Soft Hand-off: Once the handing over criteria are fulfilled by the releasing PERS unit, the person's tracking is moved from the releasing PERS unit that keeps tracking the person and sends the information to the receiving PERS unit that starts tracking the person. The realizing PERS unit stops tracking when the receiving PERS acknowledges that it successfully tracks the person (make before break); and (iii) Co-tracking: Each PERS sub-system that sufficiently identifies the person performs the tracking as long as the received scatter signal doesn't decrease below a predefine threshold from the maximum received signal among all the active PERS units. In this mode, the system decision is based on majority based voting between all the PERS units.

Multiple Features Extraction

Multiple features may be extracted y processing unit 225 from received echo signals by interferometer 120. For example, processing unit 225 may be configured to process the received echo signals to derive a spatial distribution of echo sources in the environment using spatial parameters of transmitting and/or receiving antennas 101, 110 respectively, with features extractor 240 being configured to estimate a posture of at least one human 10 by analyzing the spatial distribution with respect to echo intensity, as explained in detail below. For example, processing unit 225 may be configured to cancel environmental clutter by filtering out static non-human related echo signals, process the received echo signals by a back-projection algorithm, and analyze the spatial distribution using curve characteristics of at least two projections of an intensity of the received echo signals onto a vertical axis and at least one horizontal axis, as explained below.

The "cleaned" echo signal vectors may be used as the raw data for the features extraction unit. This unit extracts the features that mostly describe the instantaneous state of the monitored person. The following are examples for the set of the extracted features and the method it's extracted: Position—the position is extracted as the position (in case of 2D—angle/range, in case of 3D—x, y, z coordinates) metrics output of each array baseline. The actual person position at home will be determined as a "finger print" method, i.e., the most proximity to the pre-trained home position matrices (centroids) codebook. Posture—the person posture (sitting, standing, and laying) will be extracted by creating the person "image" by using, e.g., a back-projection algorithm. Both position and posture are extracted, for example, by operating, e.g., the Back-projection algorithm on received echo signals—as acquired from the multiple antennas array in SAR operational mode.

Human Posture

One aspect of the present invention provides a unique human posture sensing and classification system and a breakthrough for the supervision of the elderly instantaneous status during their stay in the house, in general, and extracting features of the human position and posture in particular. The innovated system may be part of the Personal Emergency Response system (PERS) installed in the house's ceiling, and covers a typical elder's apartment (<100 sqm) with a single sensor. The innovated system helps detecting and alerting an emergency situation that might be encountered by elders while being at home. The innovated system may also enable the long term monitoring of elderly activities and other behavioral tendencies during the staying at home.

The following is an outline of the procedure used to find the human position and posture, comprising the following steps: Dividing the surveillance space into voxels (small cubes) in cross range, down range and height; Estimating the reflected EM signal from a specific voxel by the back projection algorithm; Estimating the human position by averaging the coordinates of the human reflecting voxels for each baseline (Synthetic Aperture Antenna Array); Triangulating all baselines' position to generate the human position in the environment; Estimating the human posture by mapping the human related high-power voxels into the formfactor vector; and Tracking the human movements in the environment (bedroom, restroom, etc.).

FIG. 3A is a high level schematic block diagram of system 100 which schematically illustrates modules related to the posture extraction, in accordance with embodiments of the present invention. As explained in detail above, system 100 comprises UWB-RF interferometer 120 associated with antenna array 115 and delivering the received echo signals to home environment clutter cancellation 230. The echo signals are then delivered to a pre-processor 302, a human posture image back-projection reconstruction module 310, possibly with floor enhancement 312 and projection on the x, y, z axes 315 and finally to posture features extractor 240A (as part of feature extractor 240) and consequently to posture classifier 250A (as part of classifier 250) which derived a classified posture 317, possibly using codebook 234.

Environmental clutter cancellation 230 may be configured to remove the unwanted echo components that are reflected from the apartment's static items as walls, door, furniture etc. The clutter cancellation may be carried out by subtracting the unwanted environmental clutter from the received echo signals. The residual clutter (scatter) represents the reflected echo signals from the monitored human body. System 100 may be configured to estimate (e.g., implementing a learning algorithm) the environmental clutter (to be cancelled) when there is no person at the environment, e.g., the person is not at home, or is not at the estimated zone, and use the estimated clutter for clutter cancellation 230. Environmental clutter cancellation module 230 may comprise a stationary environment detector that decided when the unit may re-estimate the environmental clutter, possibly with an addition manual control to perform the initial estimation during the system setup.

FIG. 3B is a high level schematic block diagram of the operations performed by preprocessing unit 302, in accordance with embodiments of the present invention. Preprocessing unit 302 may be configured to perform the following blocks for each of the received echo (fast) signals: DC removal 302A by continuously estimating the DC signal (time varying DC). The estimated DC signal is subtracted from the original signal. Gain mismatch correction 302B may be performed to compensate for the path loss differences among each of the interferometer's antennas received fast signals. Phase mismatch correction 302C may be performed to compensate for the time delay among the fast signals. An out of band (O.O.B.) noise reduction filter 302D (matched filter) may be configured to filter out the out of pulse bandwidth noise and interferences.

Monitored the person's posture (e.g., sitting, standing, and laying) may be extracted (240A) by creating the person's low resolution "image", corresponding to a spatial distribution of echo sources, by using back-projection algorithm 310. For example, position and posture may be extracted by operating back-projection algorithm 310 on received echo signals as acquired from the multiple antennas array in Synthetic Aperture Antenna Array (SAAA) operational mode, illustrated in FIG. 2E.

For example, 3D back-projection may be formulated as indicated in Equations 1, by defining the locations of a J-transmitting antenna elements as the transmitting array (e.g., either of antennas 101 or antennas 110) and a K-receiving antenna elements as the receiving array (e.g., the other one of antennas 101 or antennas 110), expressing the received fast signals denoted J·K and deriving the absolute image value I($V_m$) using the confocal microwave imaging algorithm, applied to any selected voxel $V_m$ in the region of interest.

Equations 1

J – transmitting antenna elements (transmitting array) located at –

$$\{x_{tj}, y_{tj}, z_{tj}\}_{j=1}^{J}$$

K – receiving antenna elements (receiving array) located at –

$$\{x_{rk}, y_{rk}, z_{rk}\}_{k=1}^{K}$$

J·K received fast signals are – $\{\{s_{j,k}(t)\}_{j=1}^{J}\}_{k=1}^{K}$ where $0 \leq t \leq T$.

Voxel $V_m = (x_m, y_m, z_m)$ $$I(V_m) = \left| \sum_{j=1}^{J} \sum_{k=1}^{K} s_{j,k}(t_{j,k}(V_m))e^{j\varphi_{j,k}(V_m)} \right|$$

The summation is over all the received fast signals $s_{j,k}$ ($t_{j,k}(V_m)$), and it contains the reflections equivalent to the round-trip, which is the total distance $t_{j,k}(V_m)$ from each of the transmitting antennas to the specific voxel $V_m$ and the distance from this specific voxel $V_m$ to each of the receiving antennas, as calculated in Equations 2 in terms of the coordinates of the transmitting and receiving arrays. The phase $\varphi_{j,k}(V_m)$ is also calculated as presented in Equations 2. c denotes the speed of light and $f_c$ denotes the central frequency.

$$t_{j,k}(V_m) = \frac{l_{j,m}(V_m) + l_{m,k}(V_m)}{c}$$

$$l_{j,m}(V_m) = \sqrt{(x_{tj} - x_m)^2 + (y_{tj} - y_m)^2 + (z_{tj} - z_m)^2}$$

$$l_{m,k}(V_m) = \sqrt{(x_m - x_{rk})^2 + (y_m - y_{rk})^2 + (z_m - z_{rk})^2}$$

$$\varphi_{j,k}(V_m) = \frac{2\pi f_c}{c}(l_{j,m}(V_m) + l_{m,k}(V_m))$$

Equation 2

The image, expressing the spatial distribution of the echo sources, may be reconstructed from the absolute image values I($V_m$) by computing them for all the voxels in the region of interest Ω, i.e., I($V_m$)=I($x_m$, $y_m$, $z_m$), $x_m \in \Omega_x$, $y_m \in \Omega_y$, $z_m \in \Omega_z$. This derived image is denoted in the following the "Coherent Image", as it is a coherent accumulation of the fast signals' intensity contributions from the Rx antennas. A "Partially Coherent Image", which is a more sophisticatedly-derived spatial distribution of the echo sources, may be derived from several "2D Coherent Images" which are each reconstructed from a subset of fast signals, and are then multiplied by each other, as illustrated in Equations 3. Equations 3 relate as a non-limiting example to a single transmitting antenna (J=1) and 32 receiving antennas (K=32) in four subsets (Baselines—$BL_i$). (e.g., corresponding to central transmitting antenna 101 and receiving baseline 110).

"Partially Coherent Image":$I(V_m) = \Pi_{i=1}^{4} I_i(V_m)$

"Coherent Images" (from subsets $1 \leq i \leq 4$):$I_i($$V_m)=|\Sigma_{j=1}^{1}\Sigma_{k=1}^{8} s_{j,k}(t_{j,k}(V_m))e^{j\varphi_{j,k}(V_m)}|$ subset 1: $BL_1=\{s_{1,1}(t),s_{1,2}(t), \ldots ,s_{1,8}(t)\}$ subset 2:$BL_2=\{s_{1,9}(t),s_{1,10}(t), \ldots ,s_{1,16}(t)\}$ subset 3:$BL_3=\{s_{1,17}(t),s_{1,18}(t), \ldots ,s_{1,24}(t)\}$ subset 4:$BL_4=\{s_{1,25}(t),s_{1,26}(t), \ldots ,s_{1,32}(t)\}$ Equations 3

Figure 3C:
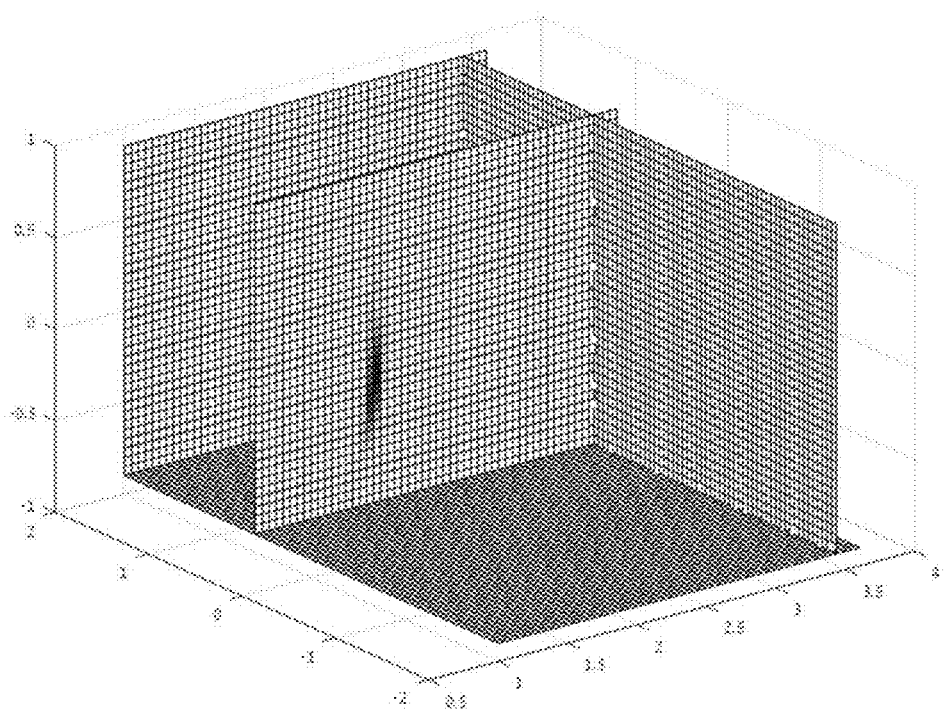
FIGS. 3C and 3D are illustrative examples for partially coherent images, according to some embodiments of the invention.
Figure 3D:
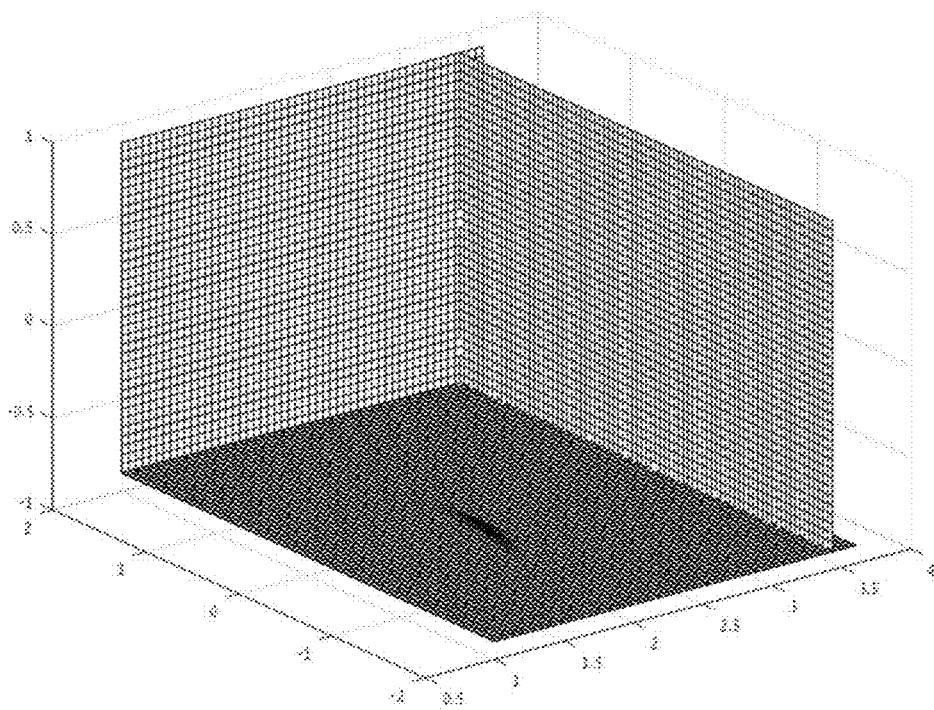

FIGS. 3C and 3D are illustrative examples for partially coherent images, according to some embodiments of the invention. FIGS. 3C and 3D are partially coherent images of a standing person and a laying person, respectively. As seen in FIGS. 3C and 3D, the echo sources are detected as a spatial distribution with a spatial resolution depending on the sizes of the voxels. The echo sources may be characterized, e.g., in terms of human postures, according to the calculated and processed spatial distribution. High power voxels may be defined by a specified power threshold, and used, possibly enhanced, to derive the posture features.

Floor enhancement module 312 is configured to compute a floor enhancement 3D image, denoted I(X, Y, Z), from the Back-Projection 3D image generated by module 310. In the floor enhancement image the intensity is increased in the region of interest, e.g., the lower part of the 3D image that corresponds to the floor. In the process, the 3D image is divided into e.g., three levels: the lower cube level (floor region), the intermediate (transition) region, and the upper level. For example, floor enhancement may be implemented multiplying the voxel intensity of floor region voxels by a factor greater than one, not altering the upper level voxels, and multiplying the intermediate (transition) region voxels by a smoothing function, such as the function exemplified, in a non-limiting manner, in Equation 4, with MaxWeight being the multiplication factor for floor region voxels and z being the height above the floor.

$$FloorEnhancmentFuntion(z) = \begin{cases} MaxWeight, & z < 50[cm] \\ \frac{MaxWeight - 1}{100 - 50} z, & 50[cm] \le z \le 100[cm] \\ 1, & z > 100[cm] \end{cases}$$

Equation 4

Module 315 is configured to perform 3D image projection on the x, y, z axes, e.g., of the floor enhancement 3D image, by compressing the 3D image into three 1D signals for convenient processing. For this purpose, the projection of I(X, Y, Z) on axes x, y and z, denoted $P_x$, $P_y$ and $P_z$, may be computed according to Equations 5. It is noted that one or more projection axis may be used, e.g., a vertical axis and one or more horizontal axes.

$$P_x \stackrel{\Delta}{=} P(X = x) = \sum_y \sum_z I(X = x, Y = y, Z = z) \forall\, x \in \Omega_x$$

$$P_y \stackrel{\Delta}{=} P(Y = y) = \sum_x \sum_z I(X = x, Y = y, Z = z) \forall\, y \in \Omega_y$$

$$P_z \stackrel{\Delta}{=} P(Z = z) = \sum_x \sum_y I(X = x, Y = y, Z = z) \forall\, z \in \Omega_z$$

Equation 5

Figure 3E:
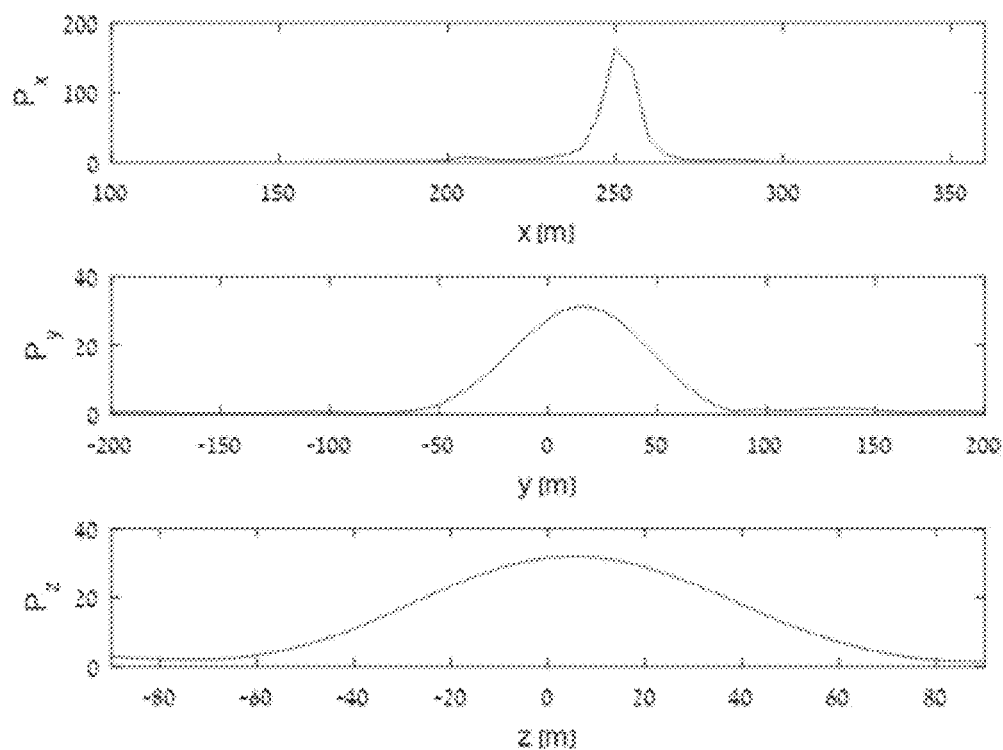
FIGS. 3E and 3F are illustrative examples for computed projections on the x, y and z axes of 3D images of a person standing and laying, respectively, in front of the sensor according to some embodiments of the invention.
Figure 3F:
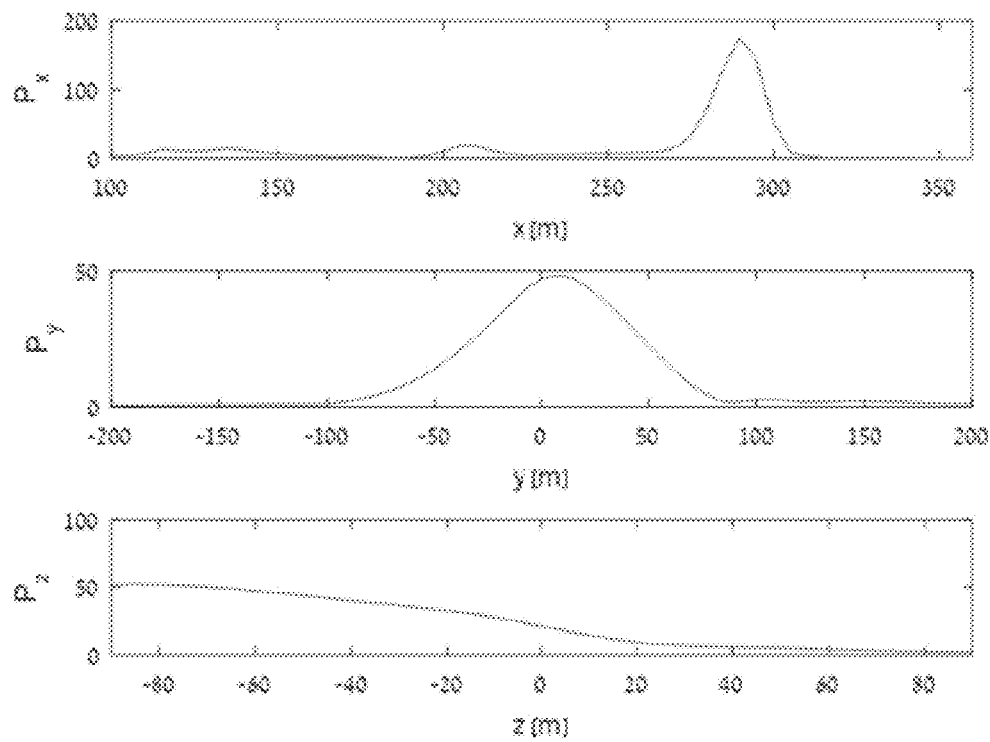

FIGS. 3E and 3F are illustrative examples for computed projections on the x, y and z axes of 3D images of a person standing and laying, respectively, in front of the sensor according to some embodiments of the invention. It is noted, e.g., that the z projection for the standing person image (FIG. 3E) is typically different than the z projection for the laying person image (FIG. 3F).

Figure 3G:
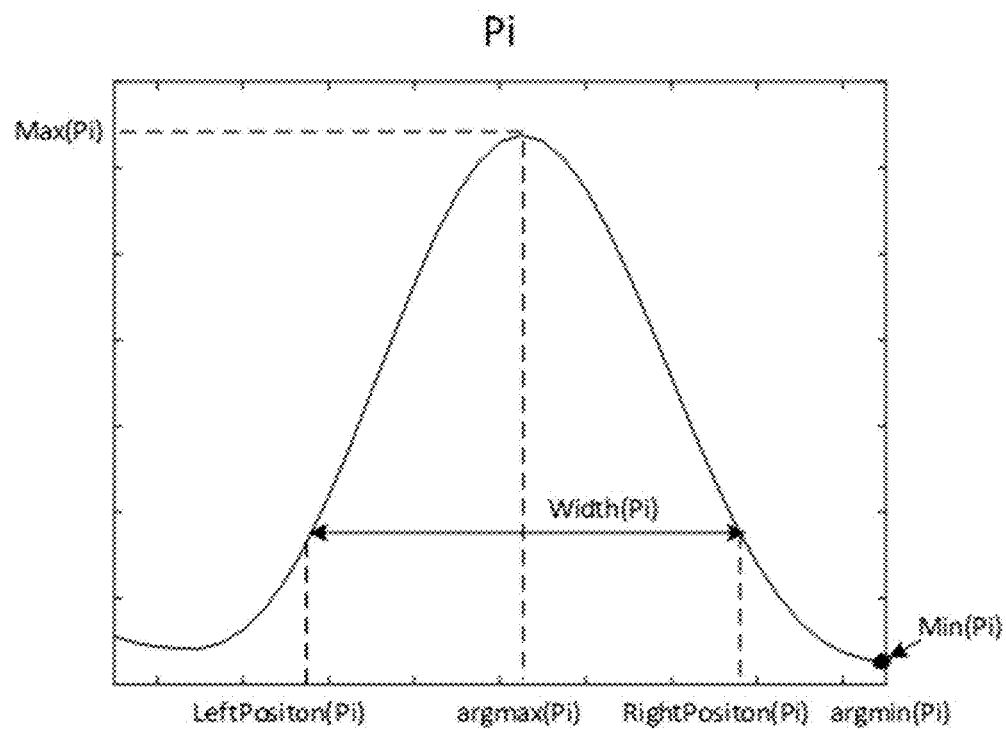
FIG. 3G illustrates schematically seven features on a schematic curve representing an arbitrary projection.

Various features may be computed for the three projections, P (i=x, y or z), such as: Standard Deviation(Pi), Kurtosis(Pi), Skewness(Pi), Max(Pi), Argmax(Pi), Min(Pi), Argmin(Pi), RightPosition(Pi), LeftPosition(Pi), Width(Pi), and so forth. The first three features are statistical characteristics of the curves, namely their second, third and fourth standardized moments (centered moments) defined in Equations 6, with $p_i$ denoting the projections, $x_i$ denoting the respective axis points ($p_i=P_d(x_i)$ with d∈{X, Y, Z} and $x_i \in \Omega_x$) and $\bar{p}$ denoting the average of $p_i$ with $N_d$ denoting the total samples per axis, i.e. $N_x$, $N_y$ or $N_z$. FIG. 3G illustrates schematically seven features on a schematic curve representing an arbitrary projection. The features relating to the right and left of the curve may be defined as being at an intensity below a specified threshold with respect to the maximum, e.g., the threshold being between 5%-15% of the maximal intensity. The shorthand "arg" refers to the respective argument (axis value) and the width is defined between the right and left positions.

$$\bar{p} = \frac{1}{N_d} \sum_{i=1}^{N_d} p_i$$

Equation 6

$$Std(P_d) = \sqrt{\frac{1}{N_d} \sum_{i=1}^{N_d} (p_i^2 - \bar{p})}$$

$$Skewness(P_d) = \frac{\frac{1}{N_d} \sum_{i=1}^{N_d} (p_i - \bar{p})^3}{Std(P_d)^3}$$

$$Kurtosis(P_d) = \frac{\frac{1}{N_d} \sum_{i=1}^{N_d} (p_i - \bar{p})^4}{Std(P_d)^4}$$

Figure 3H:
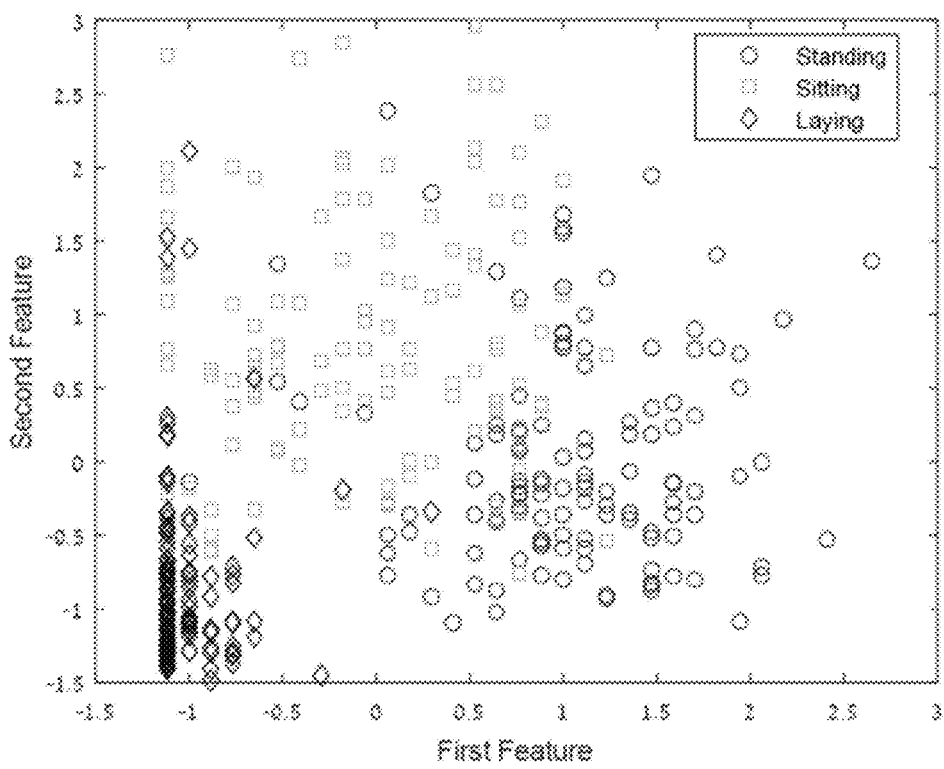
FIG. 3H is an illustration of an exemplary spanning of the features' space by two of the features described above, according to some embodiments of the invention.

FIG. 3H is an illustration of an exemplary spanning of the features' space by two of the features described above, according to some embodiments of the invention. The features are seen to correlate with respect to different posture of the person, such as standing, sitting and laying.

Returning to FIG. 3A, posture classifier 250A receives the extracted features vector from posture features extractor 240A, the posture features vector comprising the selected set of the features that were extracted from the projections Px, Py and Pz. Classifier 250A is configured to determine whether the person is in a standing, sitting or laying posture, for example according to the following example.

A set of all the possible postures is defined as $\tilde{C}$={posture$_1$, posture$_2$, . . . , posture$_c$} with c denoting the total number of postures, for example, $\tilde{C}$ may be a set of postures: {standing, sitting, laying}. $X_{posture_i}$ is defined as the set of template features vectors attributed to posture, and is used to train the classifier and creating the codebook, as illustrated in FIG. 3I which is a schematic block diagram of a training module 251 in posture classifier 250A, according to some embodiments of the invention. The training phase of classifier 250A may comprise preprocessing 251A, configured to scale each feature, e.g., to have the variance in each of the features as a known constant and then, using a training process 251B, creating codebook 234 (used later for the actual classification) of code-vectors, which projects the complete set of the various features vectors into a smaller subset. Training process 251B may be implemented by various methodologies, of which two are exemplified in the following in a non-limiting manner. One example is a 'Supervised Vector Quantization (VQ)', in which codebooks 234 are created according to the number of postures, e.g., for C=3 postures, K centroids (centroids are the centers of distributions according to a given measure, for example n-dimensional means) may be defined per posture, resulting in 3·K centroids denoted as $\{\{\mu_{k,c}\}_{k=1}^{K}\}_{c=1}^{3}$. Another example is a One Codebook VQ, in which one codebook is created for all the postures' feature vectors, without posture distinction. For example, K centroids may be defined for all the postures as $\{\mu_k\}_{k=1}^{K}$. Moreover, for each centroid the internal distribution for each posture, denoted as the conditional probability of a posture given the centroid—P(posture$_i$|centroid$_j$), may be determined. The prior matrix, expressed in Equation 7, is defined as having rows that correspond to the centroids and columns that correspond to the probability of each posture given this centroid. The classifying phase (250A) depends on the selected training methodology and resulting codebook(s) 234, as exemplified below.

$$PriorMatrix = \begin{bmatrix} P(posture_1 | centroid_1) & \cdots & P(posture_C | centroid_1) \\ \vdots & \ddots & \vdots \\ P(posture_1 | centroid_K) & \cdots & P(posture_C | centroid_K) \end{bmatrix} \quad \text{Equation 7}$$

FIG. 3J is a schematic block diagram of a classifying stage 252 in posture classifier 250A, according to some embodiments of the invention. In classifying phase 252, new feature vectors are entered into a preprocessing unit 252A and posture classifier 250A computes the best posture fit out of all postures represented in codebook(s) 234, e.g., by using a pre-defined cost function 252B. For example, cost function 252B of the 'Supervised VQ' methodology may be defined as the minimum distance across all the centroids. The classified posture is the posture attributed to the minimum distance centroid. In the second example, cost function 252B of the One Codebook VQ methodology may be defined as in Equation 8, relating to the definitions of Equation 7, with x being the tested feature vector, $P(x|centroid_j)$ calculated using the normal distribution $N(x|\mu_j,\Sigma_j)$ and $P(centriod_j)$ estimated using the total vectors attributed to each of the centroids, $$\hat{i} = \operatorname{argmax}_i P(posture_i|x) = \operatorname{argmax}_i [\Sigma_j P(posture_i, centroid_j|x)] = \operatorname{argmax}_i [\Sigma_j P(posture_i|centroid_j,x) P(centroid_j|x)] \cong \operatorname{argmax}_i [\Sigma_j P(posture_i|centroid_j) P(centroid_j|x)] = \operatorname{argmax}_i [\Sigma_j P(posture_i|centroid_j) P(x|centroid_j) P(centriod_j)] \quad \text{Equation 8}$$

Alternatively or complementarily, Support Vector Machine (SVM) classification may be implemented as posture classifier 250A, in which the features vectors are represented as linear lines that are formulated as a set of cost functions. An unknown test vector is evaluated by these cost functions and the classification is determined according its results.

Human Motion

Human motion—The monitored human body may create vibrations and other motions (such as gestures and gait). Therefore, it introduces frequency modulation on the returned echo signal. The modulation due to these motions is referred to as micro-Doppler (m-D) phenomena. The human body's motion feature may be extracted by estimating the micro-Doppler frequency shift vector at the target distance from the system (down range). The following description and FIGS. 4A-4N elaborate on the aspect of human motion features extraction.

It is noted that the term "motion" refers to the motion of the body and/or of body parts without displacement of the whole body as a bulk, such as gestures, limb motions, posture changes such as sitting down or standing up, gait (separated from the displacement), motion suddenness (e.g., possible fall or collapse), etc. The term "movement" refers to the displacement of a person's body as a whole, irrespective of the motion of body parts such as the limbs (in case of movement detection by backpropagation algorithms, the movement may comprise only the radial components of displacement).

Non-wearable monitoring system 100 may comprise ultra-wide band (UWB) radio frequency (RF) interferometer 120 configured to transmit UWB RF signals at, and to receive echo signals from, an environment including at least one human, processing unit 225 configured to processing derive, e.g., at a slow signal derivation module 226, a range-bin-based slow signal from the received echo signals, the slow signal being spatio-temporally characterized over a plurality of spatial range bins and a plurality of temporal sub-frames, respectively, and feature extractor 240 configured to derive from the slow signal a Doppler signature and a range-time energy signature as motion characteristics of the at least one human.

The Doppler signature may be derived by comparing spectral signatures of sub-frames in the slow signals, which are related to identify human-related range bins and sub-frames. The energy signature may derived by evaluating powers of the slow signal at identified human-related range bins and sub-frames. The Doppler signature and/or the energy signature may be derived with respect to different body parts of the at least one human.

Feature extractor 240 may be further configured to derive location data to yield movement characteristics of the at least one human. The location data may be derived by detecting displacements of the at least one human using back-projection and/or by identifying human-related range bins and sub-frames in the slow signal. The derivation of the location data may be carried out using a spatio-temporal histogram of the range-time energy signature, by identifying on the histogram range changes of at least body parts of the at least one human.

System 100 may further comprise human state classifier 250 configured to classify the motion and movement characteristics of the at least one human to indicate a state of the at least one human, and abnormality situation pattern recognition module 262, e.g., as part of cognitive situation analysis module 260 configured to generate an alert once the indicated state is related to at least one specified emergency. The classification may carried out by identification of a most probable fit of one of a plurality of predefined states to the motion and movement characteristics and wherein the alert generation is based on pattern recognition with respect to previously indicated states.

Figure 4A:
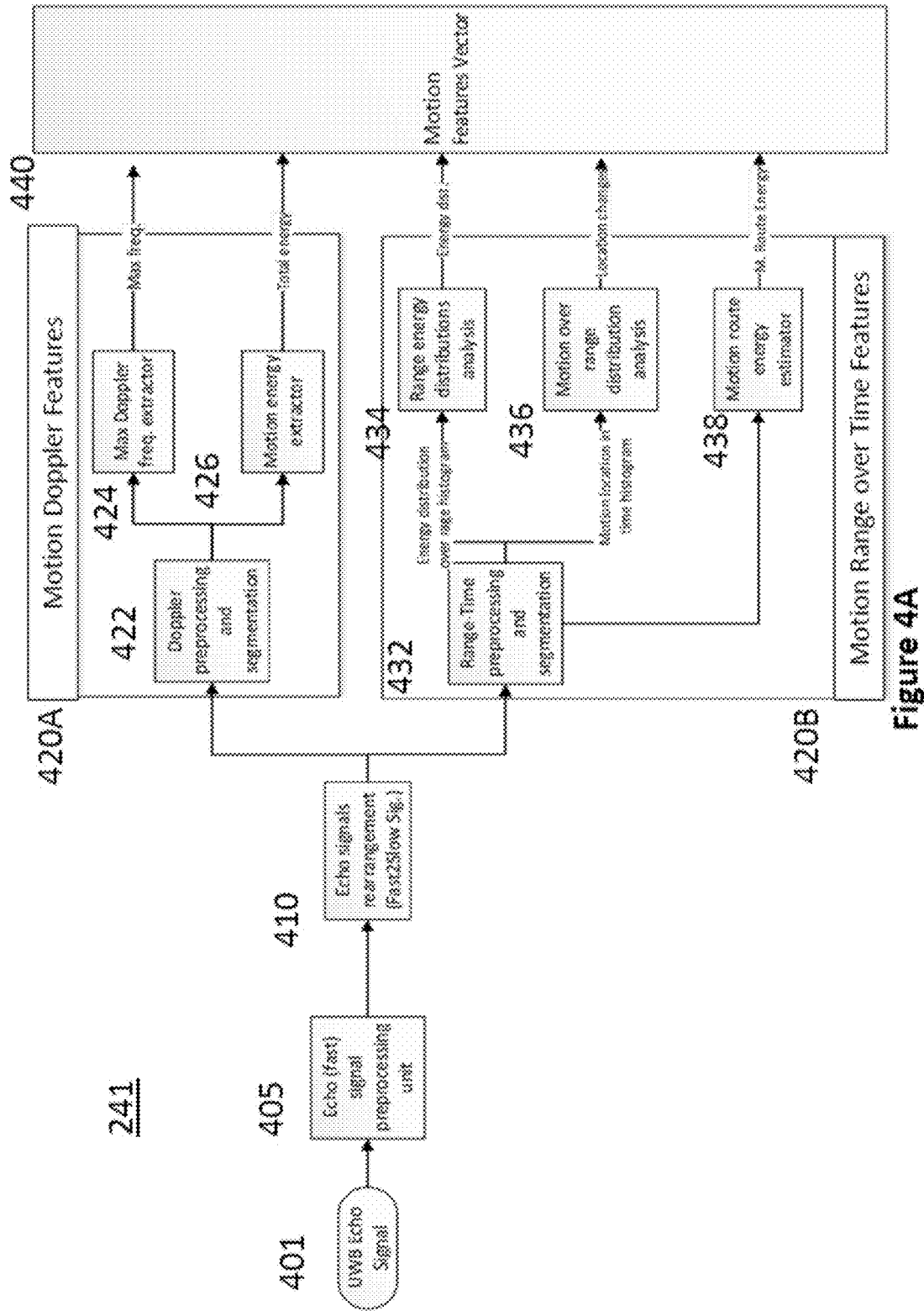
FIG. 4A is a high-level schematic flowchart illustration of exemplary motion feature extraction in feature extractor, according to some embodiments of the invention.

FIG. 4A is a high-level schematic flowchart illustration of exemplary human motion features extraction 241 in feature extractor 240, according to some embodiments of the invention. The Human Motion Features Extractor system receives a UWB echo signal 401 and processes it according to the following blocks. Detailed descriptions of modules in FIG. 4A are presented in consecutive figures.

Echo (fast) signal preprocessing unit 405 receives the echo signals from antennas 110-1 to 110-N. Each pulse transmission is represented by a vector that is referred to in the following as the 'fast time signal'. The transmission-reception cycle is performed repeatedly for a frame of, e.g., $T_{frame}=2$ to 5 seconds at a rate of, e.g., $F_{slow}=100$ Hz to 300 Hz as non-limiting values. The output of unit 405 is a matrix of the received echo signals, where each row is a fast time signal of a different transmission.

Figure 4B:
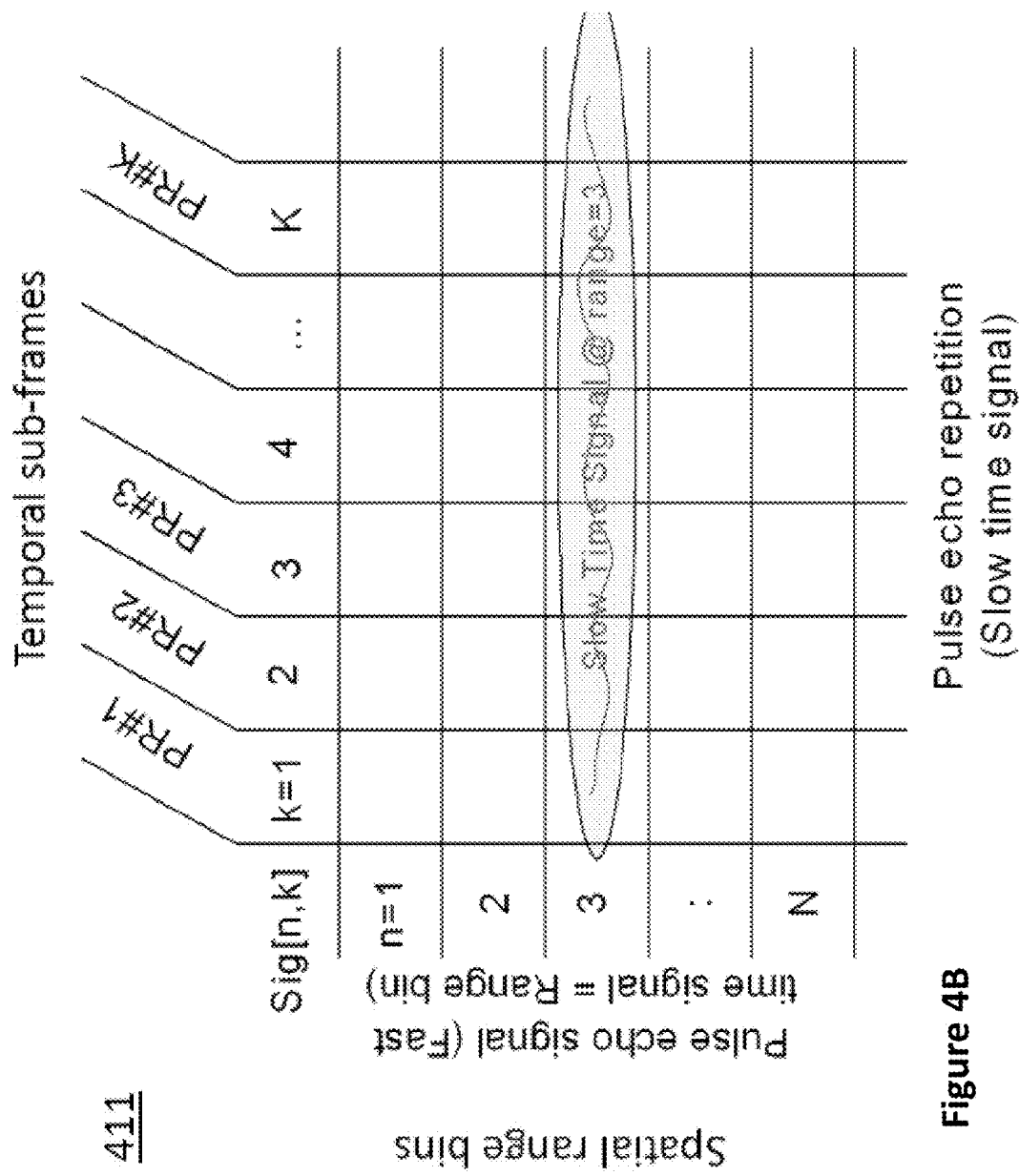
FIG. 4B is a high-level schematic illustration of fast and slow signal mapping, according to some embodiments of the invention.

Range bin based slow signal constructor (Fast2Slow) 410 rearranges the downrange echo (fast) signals vectors (the matrix rows) to represent the cross-range (slow) signals 411 (the matrix columns), as illustrated in FIG. 4B below. The slow signal vector represents a single downrange distance (bin) with a sampling rate, e.g., $F_{slow}=100$ Hz to 300 Hz as a non-limiting value. These vectors are referred as the 'slow time signals'.

Human body (target) detection is carried out by detecting its representation by a range bins window of e.g., $RW_{target}=50$ to 200 range bins (assuming, in a non-limiting manner, that each range bin is approximately 1 cm), in a non-limiting example. The target location may be determined by the range bins window with the highest motion power among all of the $RW_{target}$ bins windows. The slow signal may be preprocessed for each range bin separately and may include DC removal, which is done by the subtraction of the estimated average DC signal from the original signal as well as other optional signal adjustments for example gain and phase mismatch correction between all the range bins slow signals and out-of-band noise reduction filtering.

Feature extraction 241 may be separated into two components—motion Doppler characteristics derivation 420A (motion Doppler features) and motion change over range bins and time characteristics derivation 420B (motion energy features). Motion features extraction 241 yields a motion features vector 440 which is then used for further processing and classification in classifiers 130 and/or 250. The following demonstrates in a non-limiting manner possible embodiments of derivations 420A, 420B.

Motion characteristics detection 420 may comprise deriving from the slow signal a Doppler signature, e.g., by block 420A, and a range-time energy signature, e.g., by block 420B, as motion characteristics of the at least one human.

Motion characteristics detection 420 may comprise, concerning derivation of Doppler signature 420A, Doppler preprocessing and segmentation 422 in which the slow signal frame is divided into $M_{subframes}$ sub-frames using Equation 13 (see below). The spectrogram may be generated by fast Fourier transform (FFT) for each slow time signal sub-frame within the human target range. A maximal Doppler frequency extractor 424 may use the maximum Doppler frequency to identify the instantaneous moment and range that a rapid motion (such as falling) has occurred. This feature is extracted by scanning all the slow time signal sub-frames per each range bin and accumulating the related power spectrum with the highest motion (Doppler) frequency that is selected out of each range bin. The maximal Doppler feature is extracted from the accumulated range bins power spectrums. A Motion Energy Extractor 426 may estimate the motion energy features in the frequency domain. There are a few features that are extracted to better represent the overall motion energy.

Motion characteristics detection 420 may comprise, concerning derivation of energy signature 420B, Range over Time preprocessing and segmentation 432 in which the signal is preprocessed and segmentation of the data into histograms is performed. For example, at a first stage, a Dynamic Time Wrapping (DTW) process may be implemented to estimate the human motion path along the range bins window and at a second stage, e.g., three histograms, which contain information about the distribution of the motion activity and energy signature over range, are generated to represent: (i) Cumulated energy of all the range bins selected; (ii) The numbers of appearances of each range bin in the top 5 range bins; and (iii) The number of average energy for each range bin that appeared in the top 5 ranges bins list. For each histogram, a set of features may be extracted to represent the histogram form factor, for example: (i) Motion energy distribution analysis 434 which comprises the extraction of features that represent the distribution of the energy over the range bins, carried out e.g., by using the energy distribution histogram analysis over range bins; (ii) Motion over range distribution analysis 436 to represent the distribution of the active range bins during the motion period and helps determine if the motion is stationary in space or distributed among several range bins; and (iii) Motion route energy estimator 438 which extracts the motion route energy by accumulating the power over the motion path (the selected range bins power as a result of the DTW at the pre-processing end).

FIG. 4B is a high-level schematic illustration of fast and slow signal mapping 410, 411, according to some embodiments of the invention. The received preprocessed fast signals are mapped in a two dimensional matrix X (Equation 9). Each echo sample is an element on the matrix [n][k]; n=1 ... $N_{Ranges}$; k=1 ... $K_{Samples}$, where n is the downrange 1 bin indicator of spatial range bin, and k is the cross-range (slow) time indicator of temporal bins. The number of total range bins is determined by the scanning window, while each range bin represents $C/F_{fast}$ meters ($F_{fast}$ is the echo signal sampling rate). The matrix is separated into its rows. Each row $x_n$ is the echo signal from the same range from the interferometer (radar), sampled in $F_{slow}$=250 Hz. Those vectors are referred as the slow time signals.

$$X(x[n][k]) = \begin{bmatrix} x[1][1] & \cdots & x[1][K] \\ \vdots & \ddots & \vdots \\ x[N][1] & \cdots & x[N][K] \end{bmatrix} \quad \text{Equation 9}$$

Figure 4C:
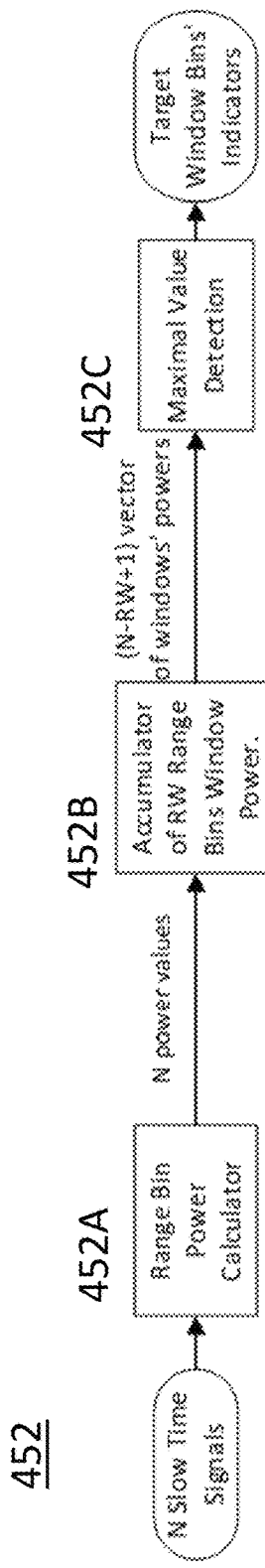
FIG. 4C is a high-level schematic flowchart illustration of exemplary human body target detection, according to some embodiments of the invention.

FIG. 4C is a high-level schematic flowchart illustration of exemplary human body target detection 452, according to some embodiments of the invention. Human Body Target Detection unit 452 narrows the focus of the analysis to the relevant range bins with human presence. Unit 452 may operate with various inputs, according to the required features to be extracted. The process of the target detection given the slow time signals of all the N range bins is performed by the following blocks, as an exemplary embodiment. A range bin power calculator 452A calculates the power of each slow time vector by Equation 10, where k and n are the time and range bin indicators respectively, to yield N power values.

$$p[n]=\Sigma_{k=1}^{K} x_n^2[k] \text{ for } n=1 \ldots N_{ranges} \quad \text{Equation 10}$$

Following, the power sequence over a sliding window of $RW_{target}$ range bins is calculated along the ($N_{Ranges}-RW_{target}+1$) windows (Eq. 2.2) and accumulated by accumulator 452B, according to Equation 11.

$$s[n]=\Sigma_{j=0}^{M-1} p[j+n] \text{ for } n=1 \ldots (N_{Ranges}-RW_{target}+1) \quad \text{Equation 11}$$

Finally, the human target location region is detected 452C and indicated at the most powerful windowed power as expressed in Equation 12.

$$W\text{indicator}=\text{argmax}_n(s[n]) \quad \text{Equation 12}$$

Figure 4D:
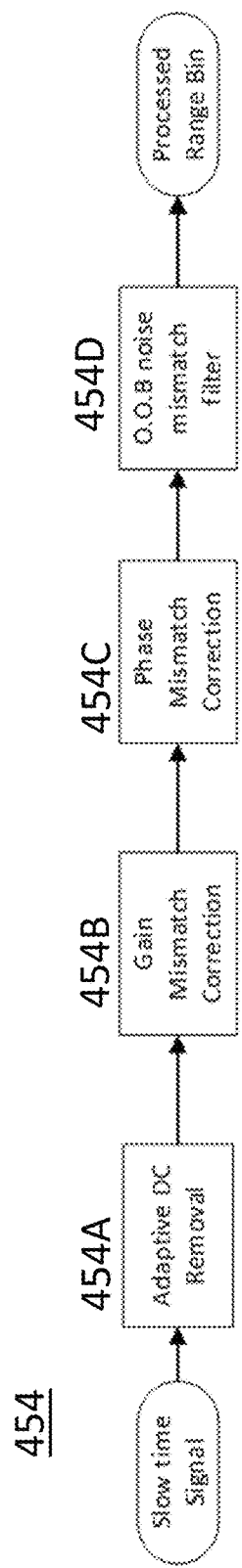
FIG. 4D is a high-level schematic flowchart illustration of an exemplary slow signal preprocessing unit, according to some embodiments of the invention.

FIG. 4D is a high-level schematic flowchart illustration of an exemplary slow signal preprocessing unit 454, according to some embodiments of the invention. It is noted that FIG. 4D is similar to FIG. 3B presented above, and is repeated here to maintain the flow of explanation in the present context. The signal processing itself may be similar or differ in details with respect to posture features extraction. The slow time signal preprocessing may be carried out in a generic unit having its input determined by the extracted features (e.g., of features vector 440) and optionally operating on each slow time signal separately. Preprocessing unit 454 may perform the following blocks: (i) Adaptive DC removal 454A by continuously calculating the estimated DC signal (time varying DC) for each time bin by Equation 13, using the current slow signal vector x[k], $$s[k]=(1-a)s[k-1]+ax[k], k=1 \ldots K_{Samples} \quad \text{Equation 13}$$

where a, is the learning coefficient. The estimated DC signal is subtracted from the original signal, namely y[k]=x[k]−s[k]. Gain mismatch correction 454B may optionally be performed to the selected range bins' slow signals to compensate the path losses differences among the selected range bins. The additional path loss of $R_i$ versus $R_{min}$ may be calculated as $$\Delta P.L.[dB] = 20\log\left(\frac{R_i}{R_{min}}\right),$$

where $R_i$ is the range bin i distance out of the selected set of range bins and $R_{min}$ is the first (closest) range bin. A slow signal phase mismatch correction 454C among the selected range bins may be carried out to compensate for the motion offset over the time/range bin. That is, the same motion profile may be preserved between neighbor range bins with a delayed version. The slow signal phase mismatch correction may estimate the phase error between $SlowSig_{Ri}$ and $SlowSig_{Rref}$, where $SlowSig_{Ri}$ is the slow signal of range bin $R_i$, and $SlowSig_{Rref}$ is the slow signal that is considered the reference range bin out of the selected range bins. Optionally, an out of band (O.O.B.) noise reduction filter 454D may be enabled to filter out the irrelevant slow signal components or interferences that might influence the performance of the various energy based features extraction.

Figure 4E:
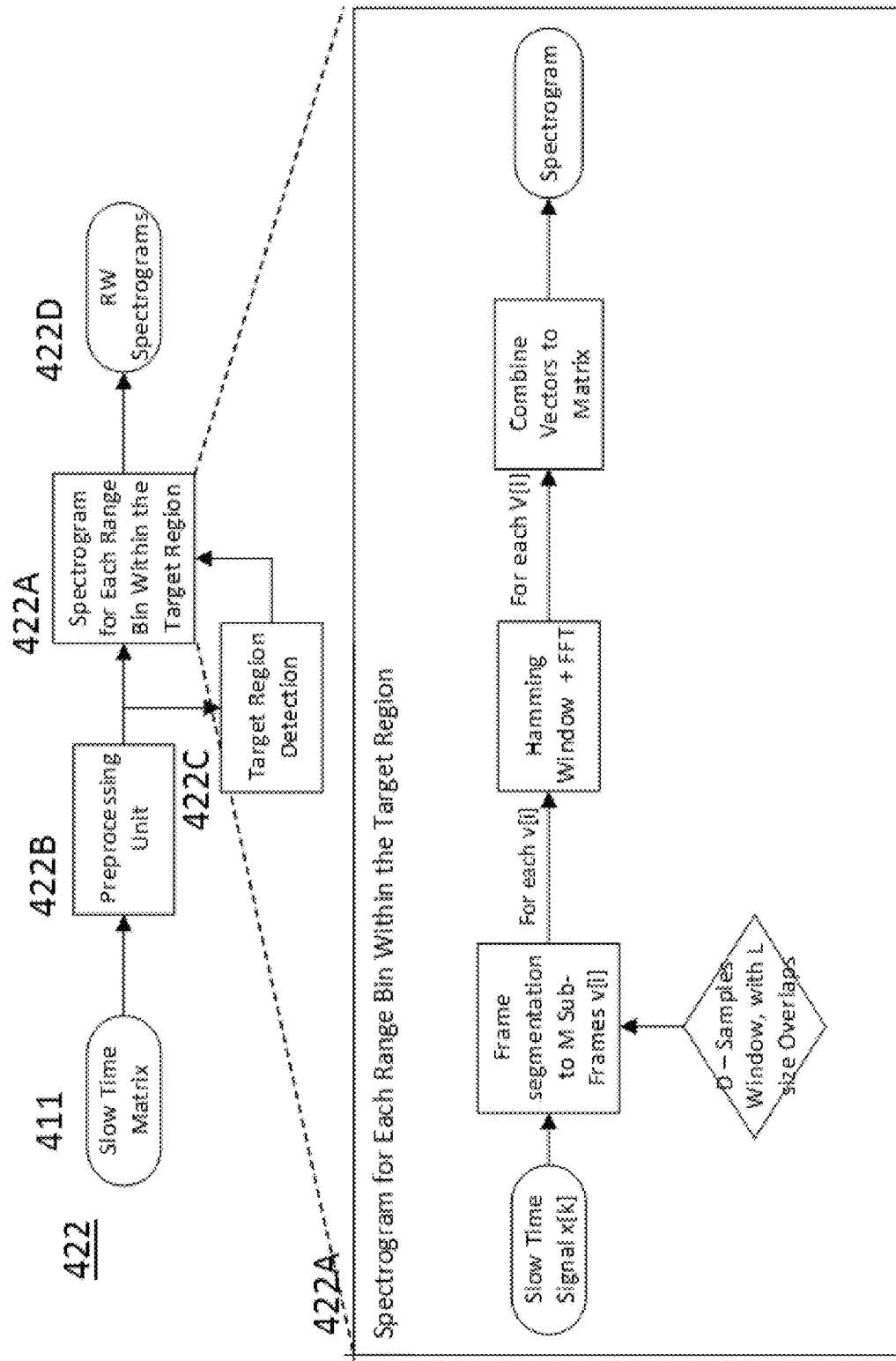
FIG. 4E is a high-level schematic flowchart illustration of exemplary Doppler preprocessing and segmentation, according to some embodiments of the invention.

FIG. 4E is a high-level schematic flowchart illustration of exemplary Doppler preprocessing and segmentation 422, according to some embodiments of the invention. A spectrogram 422A for each range bin may be generated and used for extraction of signal's spectral features, for every short time period, termed herein sub-frame (e.g., a plurality of specific fast signal times, i.e., a range of k values). The sub-frame period should be short enough to consider the motion as stationary). In order for a spectrogram to be created from a slow time signal vector of a specific range bin in the target region, slow time signal 411 of each range bin is first preprocessed by a preprocessing unit 422B, and then a human motion target detection unit 422C is being used to find the target range bin. Spectrogram 422A of each range bin is generated by segmenting the original signal x[k] to $M_{subframes}$ sub-vectors. For a given window size and number of overlaps, a new vectors group is constructed according to Equation 14.

$$\{v_m[i]\}=\{x[L_{step}m+i]\}; \ i=1 \ldots D; \ m=1 \ldots M_{subframe} \quad \text{Equation 14}$$

Each vector may have, as a non-limiting example, $D_{WinSize}$ may be between 50 and 200 samples (equivalent a subframe length of between 0.15 and 2 seconds) with overlaps of $(D_{WinSize}-L_{step})$ samples from the previous vector in the sequence ($L_{step}$=is the samples step size between sub-frames). Then, a power spectrum $V_m$ may be computed for each sub-frame by Equation 15, where h is a hamming window with length D.

$$\{V_m\}=FFT\{v_m \cdot h\}; \ m=1 \ldots M_{subframes} \quad \text{Equation 15}$$

This process is repeated for every range bin within the target region. $RW_{target}$ spectrograms 422D are gathered for further processing.

Figure 4F:
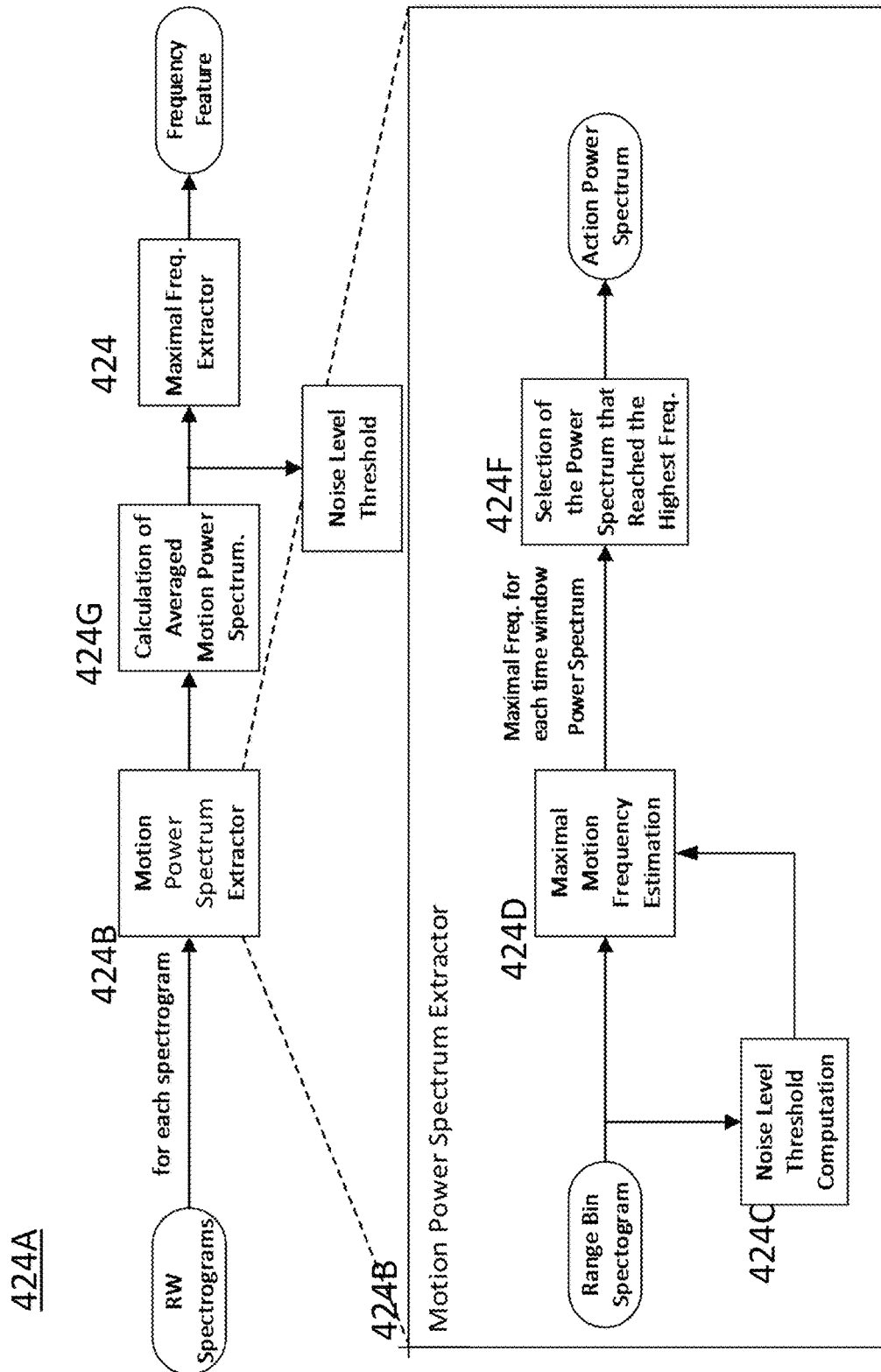
FIG. 4F is a high-level schematic flowchart illustration of an exemplary maximal Doppler frequency extraction, according to some embodiments of the invention.

FIG. 4F is a high-level schematic flowchart illustration of an exemplary maximal Doppler frequency extraction 424A, according to some embodiments of the invention. Maximal Doppler frequency extractor 424 is configured to find the highest velocity of the motion, which is represented by the motion's Doppler frequency along the motion's down-range route. The timing of the human peak motion activity is not common for all range bins, due to the fact that the motions can cross range bins versus the time. Therefore, the maximal Doppler frequency feature is extracted by scanning all the slow time signal sub-frames per each range bin and accumulating the related power spectrum with the highest motion (Doppler) frequency that is selected out of each range bin. The max Doppler feature may be extracted from the accumulated range bins power spectrums. In order to extract the action power spectrum by extractor 424B from each range bin spectrogram, the following process is performed: Noise level threshold estimation computation 424C calculates the noise level threshold for the spectrogram energy by considering the spectrogram values below noise level are considered as not related to human motion. A threshold $T_1$ (measured in dB) may be determined by Equation 16, using the mean of the upper four frequency bins of the spectrogram, while Q, P are respectively the numbers of frequency and time bins of the spectrogram matrix S.

$$T_1 = \frac{1}{4}\sum_{q=(Q-4)}^{q=Q} \frac{1}{P}\sum_{p=1}^{p=P} s[p,q], s \in S \quad \text{Equation 16}$$

The maximal motion frequency bin is defined and estimated in 424D, as the first frequency bin to its power below the motion threshold when scanning the spectrum from $F_{min}$ to $F_{max}$ which is the motion (active) region for the p power spectrum as defined by Equation 17.

$$f_p = \text{argmin}_q(s[q,p] < (T_1+1)) \text{ for } p=1 \ldots P \quad \text{Equation 17}$$

where $f_p$ is the maximal frequency at the p power spectrum that its power is $<T_1+1$ dB. An example for that region from a full spectrogram can be seen in spectrogram 424E of FIG. 4G.

Figure 4G:
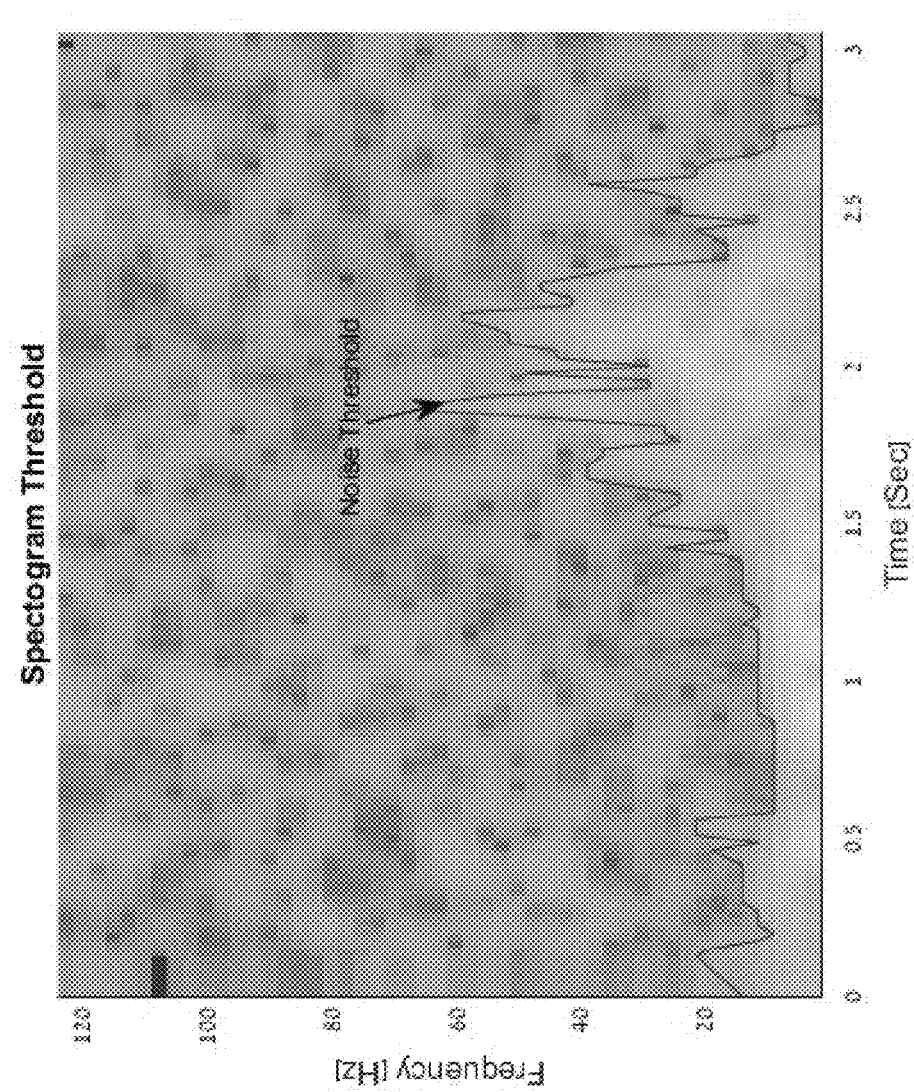
FIG. 4G is an exemplary illustration of a spectrogram of motion over a single range bin in the active area, according to some embodiments of the invention.

FIG. 4G is an exemplary illustration of a spectrogram 424E of motion over a single range bin in the active area, according to some embodiments of the invention. Action power spectrum extractor 424B further carries out a selection 424F of the power spectrum with the highest frequency—the selected power spectrum at time bin p is the one that has the highest value of $f_p$ (referred as action power spectrum of range q). This power spectrum is extracted for farther analysis. The averaged action power spectrum $P_{av}$ is created (424G) using action power spectrums 424E from all range bins. Then, a new noise threshold $T_2$ is calculated from Equation 18, by using the average value of the upper four frequency bins of the averaged (accumulated) power spectrums, in a non-limiting example.

$$T_2 = \frac{1}{4}\sum_{q=(Q-4)}^{q=Q} P_{av}[q] \quad \text{Equation 18}$$

The maximal frequency feature is calculated by Equation 19:

$$f_{max} = \text{argmin}_q(P_{av}[q] < (T_2+1)) \quad \text{Equation 19}$$

FIG. 4H is a high-level schematic flowchart illustration of an exemplary motion energy features extractor 426, according to some embodiments of the invention. The motion energy features may be estimated in the frequency domain. There are a few features that are extracted to better represent the overall motion energy. The motion energy might be affected by several conditions which are not related to the motion itself. For example, the relative distance from the interferometer as well as the motion duration. Unit 426 may create several spectrograms for all the target range bins to extract the various features that represent the energy signature.

The motion energy features may be extracted by the following exemplary process. Two spectrogram versions may be created for each target range bin. The first spectrogram may be created after a range gain mismatch correction (to compensate the path loss variations over the range bins). The other spectrogram may be created without the gain mismatch correction (426A). The gain mismatch may be implemented at preprocessing unit 422B. Therefore, two spectrogram sets are created for the complete range bins $\{S_{1n}\}$ and $\{S_{2n}\}$. For each set of spectrograms, an average spectrogram 426B $S_{1av}$, $S_{2av}$ may be created by Equation 20.

$$S_{i,av}[q][m] = \frac{1}{RW}\sum_{n=1}^{RW} S_n[q][m];$$ Equation 20 for $i = 1, 2, m = 1 \ldots M_{subframes}$, $q = 1 \ldots Q_{freqbins}$

In order to emphasize the motion power in higher frequencies, each averaged spectrogram frequency bin $\vec{S}_{av}^{\,q}$ may be processed with a corresponding weight, into a new weight-averaged spectrogram 426C by Equation 21.

$$\vec{SW}_{av}^{\,q} = \vec{S}_{av}^{\,q} * \sqrt{\frac{f[q]}{f_{max}}};$$ Equation 21 for $q = 1 \ldots Q_{freqbins}$ where f[q] is the frequency value of the q frequency bin, and $f_{max}$ is the maximal frequency bin value. Two vectors of the power peaks may be created (426D) for each the two spectrograms, with and without power correction. A first vector $\vec{p}_1$ contains the maximal power of each sub-frame vector $\vec{s}_{av}^{\,m}$ (Equation 22A), and the second vector $\vec{p}_2$ contains the maximal values of each frequency bin vector $\vec{s}_{av}^{\,q}$ (Equation 22B).

$p_1[m] = \max(\vec{s}_{av}^{\,m});$ for $m=1 \ldots M_{subframes}$ Equation 22A $p_2[q] = \max(\vec{s}_{av}^{\,q});$ for $q=1 \ldots Q_{freqbins}$ Equation 22B Each of the four (2×2) vectors—with the different procedures for gain processing and for maximal power values extraction, are accumulated into four energy features.

FIG. 4I is a high-level schematic flowchart illustration of an exemplary range-time preprocessing and segmentation flow 432 as part of derivation of energy signature 420B, according to some embodiments of the invention. The motion features over range-time helps profiling the energy signature of each motion, not only by characterizing its power and velocity, but by also characterizing its distribution over space along the motion time. Module 432 may be configured to create three histograms that express the distribution of motion energy and activity over the range bins during motion period. The energy related histograms may be created by the following algorithms After normalization of the slow time matrix X (defined in Equation 9) using the highest absolute value amplitude as $$X = \frac{X}{\|X\|_\infty}$$

(the notation X is maintained for simplicity), the target region is located by a target region detector unit 432A. The two axis of the slow time matrix X correspond to the time of the sample (time bin) and the range of the sample (range bin). Each range bin vector, with $K_{Samples}=T_{frame} \cdot F_{slow}$ length as an example, may then segmented into 10 subframes as a non-limiting example and mapped in as new matrix $X_n$ defined in Equation 23, with $K_{Samples}=800$ as a non-limiting example, with each row of the new matrix having $K_{Samples}/10$ samples with an overlap.

$$X_n = \begin{bmatrix} x_n[1] & \ldots & x_n[80] \\ \vdots & \ddots & \vdots \\ x_n[720] & \ldots & x_n[800] \end{bmatrix}$$ Equation 23

With $E_n$ being the temporal energy vector of each range bin as calculated in Equation 24, j being the sub-frame number.

$$E_n[j] = \sum_{i=1}^{i=\frac{K}{10}} \|Xn[j,i]\|^2 \text{ for } n = 1 \ldots RW_{target}$$ Equation 24

A Matrix E defined by Equation 25 is constructed by gathering all the temporal energy vectors from each range bin.

$$E = \begin{bmatrix} E_1 \\ \vdots \\ E_N \end{bmatrix}$$ Equation 25

The columns of E are the energies of all the ranges along the new wider time bins, and the rows are the energy of a specific bin along time. From each column with indicator k, the five highest elements values may be extracted into $w_k(r)$, $r=1 \ldots 5$; together with their row indexes $g_k(r)$, as a non-limiting example. The three histograms 432B are created from elements $w_k$ (r) as defined by Equations 18A-C. An accumulated range histogram with elements calculated by Equation 26A:

$h_{acc}(n) = \Sigma_{k=1}^{k=K} w_k(r) * I_{(g_k(r)=n)}$ for $n=1 \ldots RW_{target}$ Equation 26A The indicator function $I_{(\omega \in \Omega)}$ is equal to 1 if the condition in the brackets is true.

An activity in range over time histogram, with elements calculated by Equation 26B:

$h_{app}(n) = \Sigma_{k=1}^{k=K} I_{(g_k(r)=n)}$ for $n=1 \ldots RW_{target}$ Equation 26B A normalized energy histogram, with elements calculated by Equation 26C:

$$h_{norm}(n) = \begin{cases} \frac{h_{acc}(n)}{h_{app}(n)}, & h_{app}(n) > 0 \\ 0, & h_{app}(n) = 0 \end{cases}$$ Equation 26 for $n = 1 \ldots RW_{target}$

Figure 4J:
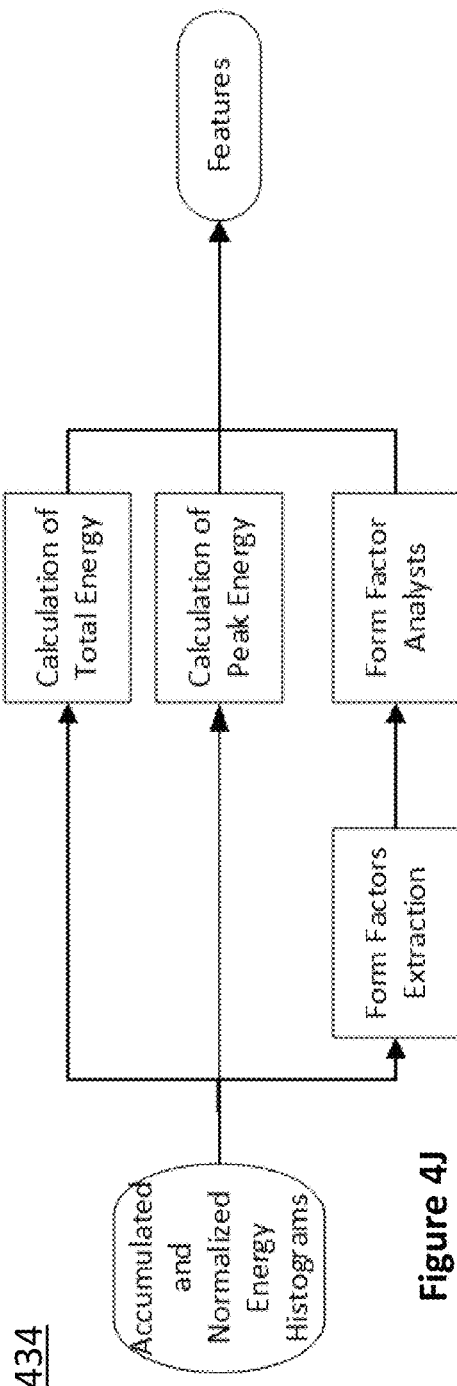
FIG. 4J is a high-level schematic flowchart illustration of an exemplary over-range energy distribution analysis as part of derivation of energy signature, according to some embodiments of the invention.

FIG. 4J is a high-level schematic flowchart illustration of an exemplary range energy distribution analysis 434 as part of derivation of energy signature 420B, according to some embodiments of the invention. Range energy distribution analysis module 434 extracts features from the accumulated and normalized energy histograms, which relate to the amount and distribution of motion energy over the range bins. Range energy distribution analysis 434 includes the extraction of the total and maximal (peak) energy over the range bins out of the histogram. In addition, the histogram form factor, defined as the percentage accumulated distribution points, is extracted (for example I20—identifies the range bin point that covers 20% of the accumulated motion energy, I40—identifies the range bin point that covers 40% of the accumulated motion energy, etc.).

Figure 4K:
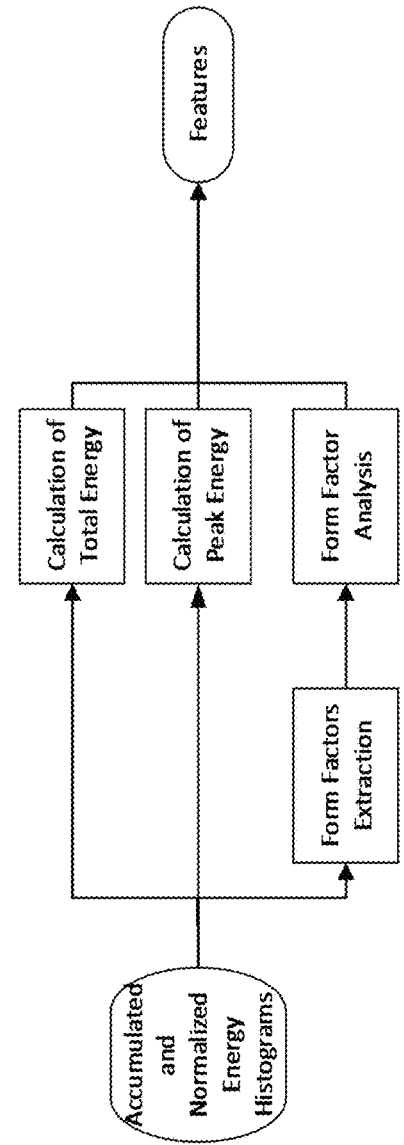
FIG. 4K is a high-level schematic flowchart illustration of an exemplary over-range activity distribution analysis, according to some embodiments of the invention.

FIG. 4K is a high-level schematic flowchart illustration of an exemplary motion over range distribution analysis 436, according to some embodiments of the invention. Motion over range distribution analysis unit 436 extracts features that relate to the distribution of active range bins over time, which is related to the motion's and varying over the down range. Unit 436 extracts the number of times that most of active region has been selected, the total number of active range bins and the mean number of repeated selection of the range bin as an active region.

Figure 4L:
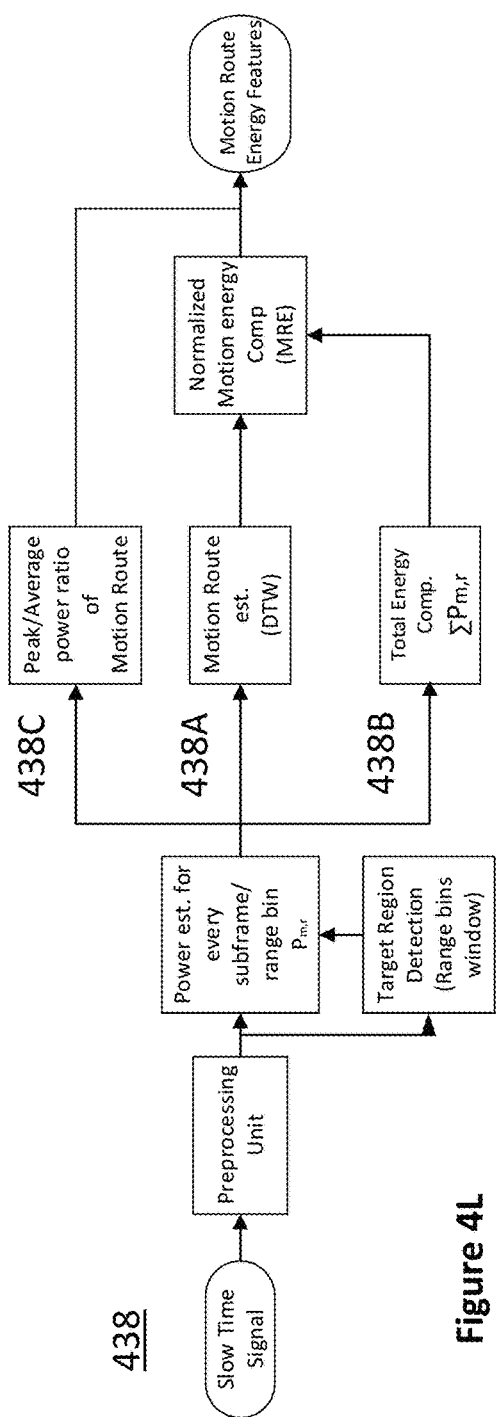
FIG. 4L is a high-level schematic flowchart illustration of an exemplary motion route energy estimation, according to some embodiments of the invention.
Figure 4M:
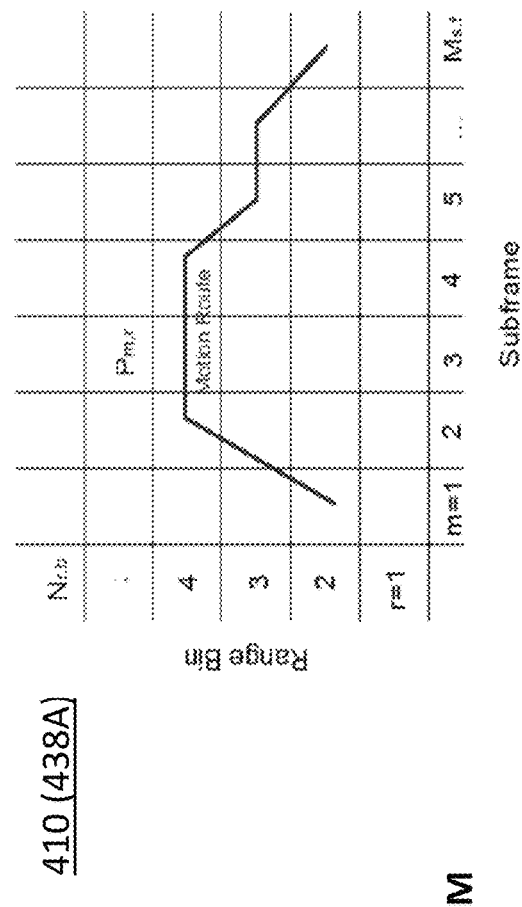
FIG. 4M, being a schematic matrix illustration of DTW-based motion route estimation, according to some embodiments of the invention.

FIG. 4L is a high-level schematic flowchart illustration of an exemplary motion route energy estimation 438, according to some embodiments of the invention. The motion route energy is defined as the accumulated power along the motion route in the range bins window during the motion period (time) relatively to the overall energy. This feature may be extracted in two major stages: (i) Estimating the motion route by using a dynamic Time Warping (DTW) approach 438A, (ii) accumulating the estimated power along the selected range bin route, and normalizing by the overall power 438B and calculating the motion route peak to average power ratio 438C. The DTW may be performed by selecting the highest range bin power for every sub-frame, as illustrated in FIG. 4M, being a schematic matrix illustration of DTW-based motion route estimation 438A, according to some embodiments. The relative Motion Route Energy (MRE) may be calculated as expressed in Equation 27:

$$MRE = \frac{\sum_{m=1}^{Msubframes} MP_{[m]}}{\sum_{m=1}^{Msubframes} \sum_{r=1}^{R} P_{[m,r]}}$$

Equation 27

Where:
$P_{[m,r]} = \sum_{n=1}^{N} |x_{m,r[n]}|^2$ is the power of subframe m, and Range bin r;
$x_{m,r[n]}$—is the Slow signal at subframe m and range bin r; and
$MP[m] = \max\{P_{[m,r]}\}$, $r \in$ Window Range bins, is the Max Power at subframe m.

The motion route Peak to Average Power Ratio (PAR), measured by the ratio between maximal and average power of the motion route, may be calculated as in Equation 28:

$$PAR = \frac{\max_m (MP[m])}{\frac{1}{Msubframes} \sum_{m=1}^{Msubframes} MP[m]}$$

Equation 28

Figure 4N:
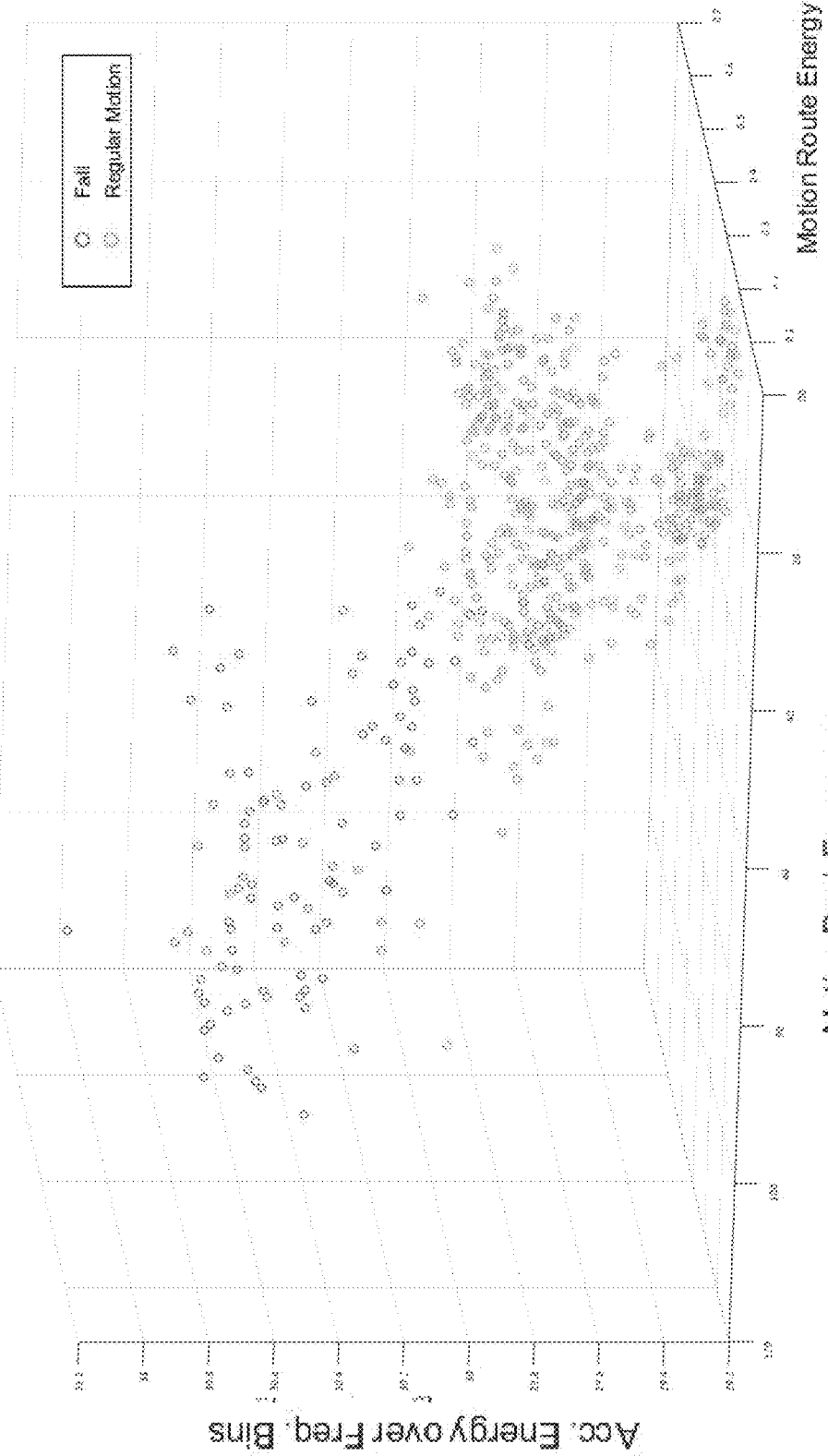
FIG. 4N is a schematic illustration of the possibility to separate different types of motions based on the derived parameters, according to some embodiments of the invention.

FIG. 4N is a schematic illustration of the possibility to separate different types of motions based on the derived parameters, according to some embodiments of the invention.

The two illustrations in FIG. 4N are of the same 3D graphics and are taken from different angles to illustrate the separation of the two types of motion in the 3D parameter space. FIG. 4N clearly illustrates the ability of the analysis described above to separate motions that are categorized, in the non-limiting illustrated case, as fall motions and as regular motions. The results may be used independently to detect falls, or be provided to the classifier for verification and augmentation with additional data and analysis results. Classification of the human state, as described in detail below, may relate to the derived motion characteristics as well as optionally to posture characteristics, respiration characteristics and position characteristics that may be derived from the received echo signals by implementing the disclosed methods, approaches and/or additional analysis of the received echo signals.

Human Respiration

Human breathing—During the breathing (respiration) the chest wall moves by inhalation and exhalation. The average respiratory rate of a healthy adult is usually 12-20 breaths/min at rest (~0.3 Hz) and 35-45 breaths/min (~0.75 Hz) during labored breathing. The respiration features may be extracted from the slow-time signal (that is derived from the received echo signals at the target's distance (down range) from the system) using spatial time parameters thereof and the power spectrum as explained below. Specifically, in the following, the target may be selected as the chest of the one or more humans in the environment.

Figure 5A:
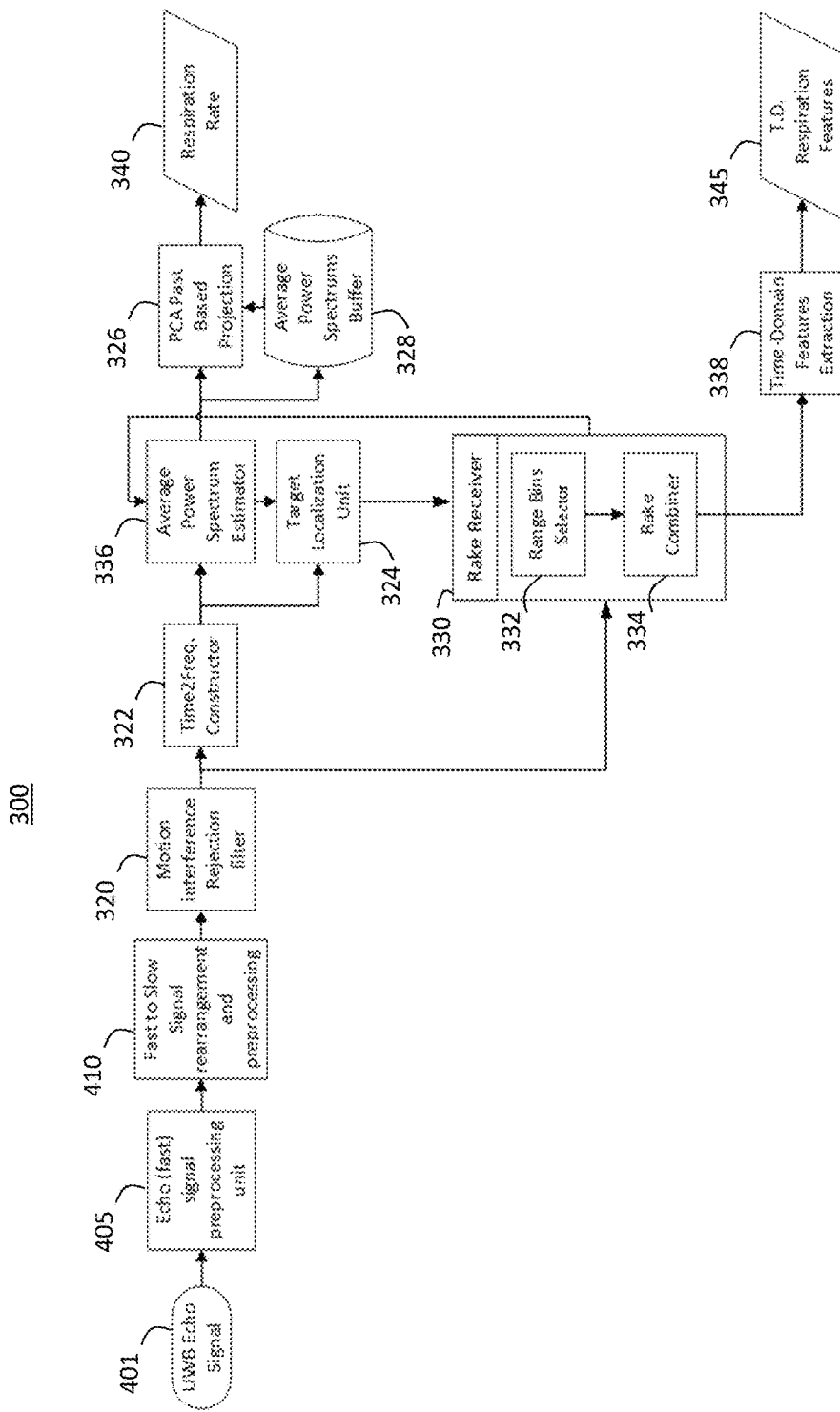
FIG. 5A is a high level schematic illustration of a human respiration features extraction system within the PERS system, according to some embodiments of the invention.

FIG. 5A is a high level schematic illustration of a human respiration features extraction system 300 within system 100, according to some embodiments of the invention. Human respiration features extraction system 300 is configured to extract respiration features from the received echo signals, and may comprise the following modules and operations. First, the echo signal may be rearranged by an echo (fast) signal preprocessing unit 405 configured to receive echo signals 401 (99) from receiving antenna 110 with respect to each pulse transmission 91, the received signals being represented by a vector termed the fast time signal. The transmission-reception cycle may performed repeatedly at any rate and duration, in an exemplary non-limiting manner, for a frame of $T_{frame}=20$ seconds and at a rate of $F_{slow}=16$ Hz. The output of unit 405 may be a matrix of the received echo signals, where each row is a fast time signal of different transmission.

Fast to slow signal rearrangement and preprocessing (see also above) may comprise a range bin based slow signal constructor and a slow signal preprocessing unit. The range bin based slow signal constructor may be configured to rearrange the downrange echo (fast) signals vectors (the matrix rows) to represent the cross-range (slow) signals (the matrix columns)—see also FIG. 4B above. The slow signal vector represents a single downrange distance (bin) with the sampling rate, e.g., $F_{slow}=16$ Hz. These vectors are referred as the "slow time signals" and have a length of $N_{samples}$. The slow signal preprocessing unit may carry out the preprocessing for each range bin separately, comprising e.g., DC removal by subtraction of the estimated average DC signal from the original signal as well as other optional signal adjustments for example gain and phase mismatch correction between all the echo (fast) signals and out-of-band noise reduction filtering.

Then, a motion rejection filter 320 may be applied to estimate the motion interference for each range bin, e.g., by evaluating the signal LPC (linear predictive coding) coefficients for each sub-frame, e.g., one second long sub-frames (see definitions above). Using the LPC coefficients, the motion related components may be removed from each of the slow time signals, to enhance the slow time signal components which characterize non-motion parameters such as respiration parameters.

A time-to-frequency constructor module 322 may be configured to convert the slow time signal of each range bin into the corresponding power spectrum, e.g., by applying an FFT (fast Fourier transform) with a hamming window, followed emphasizing higher respiration frequencies (see FIGS. 5C and 5D below). Additionally, a target localization unit 324 may be configured to select the target range bins, e.g., as the range bins with the highest respiration power spectrum energy within a Region of Interest (ROI), e.g., relating to the chest of the respective humans. The ROI may be set by using the prior frames respiration energy over range bins, and the current frame bins region that have high respiration energy level (that can be related to the human general location), as illustrated e.g., in FIGS. 5E and 5F below. In particular, the respective chest(s) of the human(s) may be identified by detecting cross-correlation in the respiration-related ROI as chest movements are correlated in their motions over the corresponding range bins. For example, at least two coordinates (e.g., a start point and an end point) of the chest may be identified as the chest ROI.

Following the human chest target localization, a rake receiver 330 may be configured to reconstruct the respiration signal, e.g., by implementing a range bins selector 332 to compute the correlation of each range bin with the target range bin by using multiple variations of phase shifts and selecting the N range bins that are most correlated with the target; and rake combiner 334 which shifts and combines the slow time signals of the selected range bins, by the range bins scanner, to reconstruct the respiration signal (see details in FIGS. 5G-5J).

The reconstructed respiration signal may be used to extract (338) respiration features 345 by calculating descriptive features of the respiration signal derivative. The features may focus on the respiration rate, asymmetry and other indicators of tidal volume changes. For example, a respiration rate 340 may be estimated by a frame average power spectrum estimator 336 that calculates the average power spectrum using the power spectrums of each selected range bin, received from range bins combiner 334, PCA (principal component analysis) past projection module 326 that creates a PCA space based on the last, earlier-derived M frames and projects the average power spectrum over the first principle component subspace to determine the respiration rate by the peak frequency of the projected average power spectrum. A respiration rate estimator 340 then extracts the respiration rate from the past projected power spectrum. These and related aspects of system 100 are presented below in detail.

Echo signal rearrangement unit 410, may be configured to map the received preprocessed fast signals (from module 405) in a two-dimensional matrix X which is defined in Equation 29 (similar to Equation 9 above).

$$\begin{bmatrix} x[1][1] & \cdots & x[1][N] \\ \vdots & \ddots & \vdots \\ x[M][1] & \cdots & x[M][N] \end{bmatrix} \qquad \text{Equation 29}$$

Each matrix element represents an echo sample, [m][n]; m=1 ... $M_{Ranges}$; n=1 ... $N_{Samples}$, where n denotes the downrange bin indicator, and m denotes the cross-range (slow) time indicator. The number of total range bins is determined by the scanning window, while each range bin represents $C/F_{fast}$ meters ($F_{fast}$ is the echo signal sampling rate). The matrix is separated into its rows (see FIG. 4B). Each row $x_m$ is the echo signal from the same range from the radar, sampled e.g., in $F_{slow}$=16 Hz. Those vectors are referred as the slow time signals. The slow time signal preprocessing unit 405 may be configured to be generic in the sense that its input is determined by the extracted features and it may be operated on each slow time signal separately.

Figure 5B:
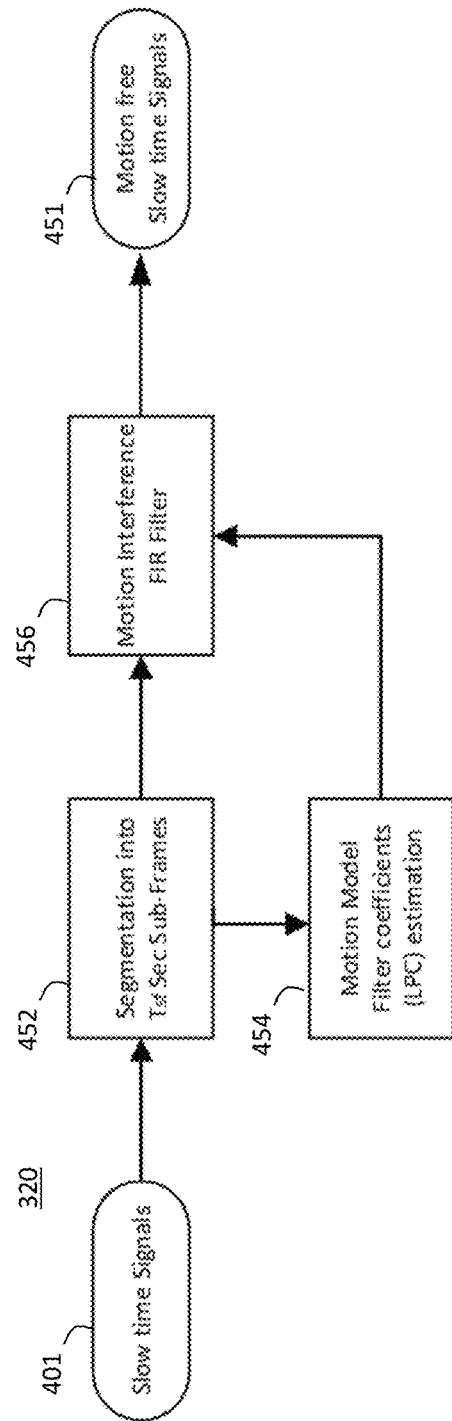
FIG. 5B is a high level schematic illustration of a motion rejection filter within the human respiration features extraction system, according to some embodiments of the invention.

FIG. 5B is a high level schematic illustration of motion rejection filter 320 within human respiration features extraction system 300, according to some embodiments of the invention. Following the pre-processing of slow time signal 401, motion rejection filter 320 is configured to remove motion related interferences, as described in the following. The slow time signal x[n] of each range bin m is segmented (452) into sub frames $v_m[n]$ of $T_{SF}$=1-2 second duration, as expressed in Equation 30.

$$\{v_k^m[n]\} = \{x[D_k+n]\}; \; n=1 \ldots D; \; \forall m=1 \ldots M_{ranges}, \; k=1 \ldots N\_Samples/D_{subframesize} \qquad \text{Equation 30}$$

The motion interference model may then be estimated by an Auto-Regressive (AR) model 454, under the assumption that from a frame with the length of 1-2 second, only the motion spectrum components are predicted, excluding the respiration frequency components. From each sub frame the first K=2-4 Linear Prediction Coefficients (LPC) of each sub frames are calculated. The estimated LPC coefficients of each sub-frame are then used to create a whitening filter and the correspondent filter of each sub frame is used to filter the motion interference 456. The post filtered sub frames of each range bin may be re-combined into a filtered signal 451.

Figure 5C:
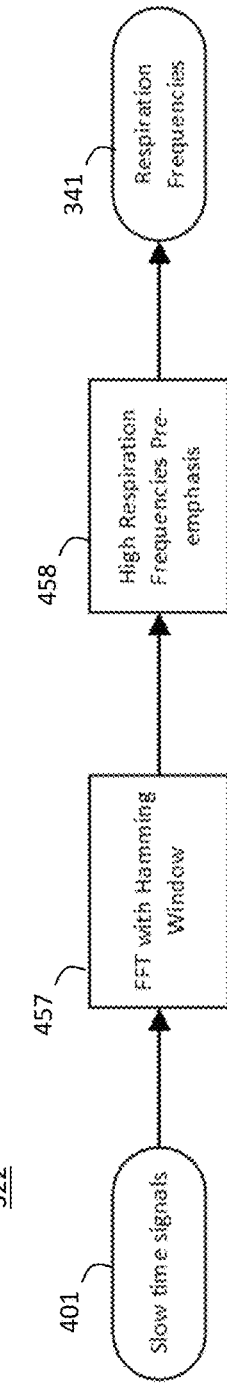
FIG. 5C is a high level schematic illustration of a time to frequency converter within the human respiration features extraction system, according to some embodiments of the invention.

FIG. 5C is a high level schematic illustration of time to frequency converter 322 within human respiration features extraction system 300, according to some embodiments of the invention. Time to frequency converter 322 is configured to enable the frequency analysis of the human breathing (which may range between 0.2 Hz and 0.75 Hz), e.g., by using the slow time signal of each range bin to calculate the respiration power spectrum, as explained in the following. Each Slow time $x_m$ signal 401 may be processed by FFT with hamming window h 457, as expressed in Equation 31.

$$\{X_m\} = \text{FFT}\{x_m \cdot h\}; \; \forall m=1 \ldots M_{Ranges} \qquad \text{Equation 31}$$

The respiration power spectrum for each range bin may be represented by the power spectrum in the frequencies bands of 0.2-1 Hz as expressed in Equation 32.

$$X_m[k], \; k=1 \ldots NF_{MAX} \; \forall m=1 \ldots M_{Ranges} \qquad \text{Equation 32}$$

A high respiration frequencies pre-emphasis 458 may be implemented by applying a corresponding filter 458 to overcome an expected attenuation of the signal amplitude at high respiration rates due to the natural limitation of the human maximal tidal volume when breathing at a high respiration rate (because the amount of air that is inhaled is not sufficient to fill the lungs). The high frequencies pre-emphasis 458 emphasizes the higher frequencies to balance the effect of the lower tidal volume on the power spectrum. An exemplary enhancement filter w is expressed in Equation 33, with the parameter a relating to the rate of maximal tidal volume that results from increasing the respiration rate.

$$w(f) = \begin{cases} 1, & f < F_{MI} \\ 1 + (f - F_{MI}) \cdot \alpha, & f \geq F_{MI} \end{cases} \quad \text{Equation 33}$$

As a non-limiting example $\alpha=3$.

Figure 5D:
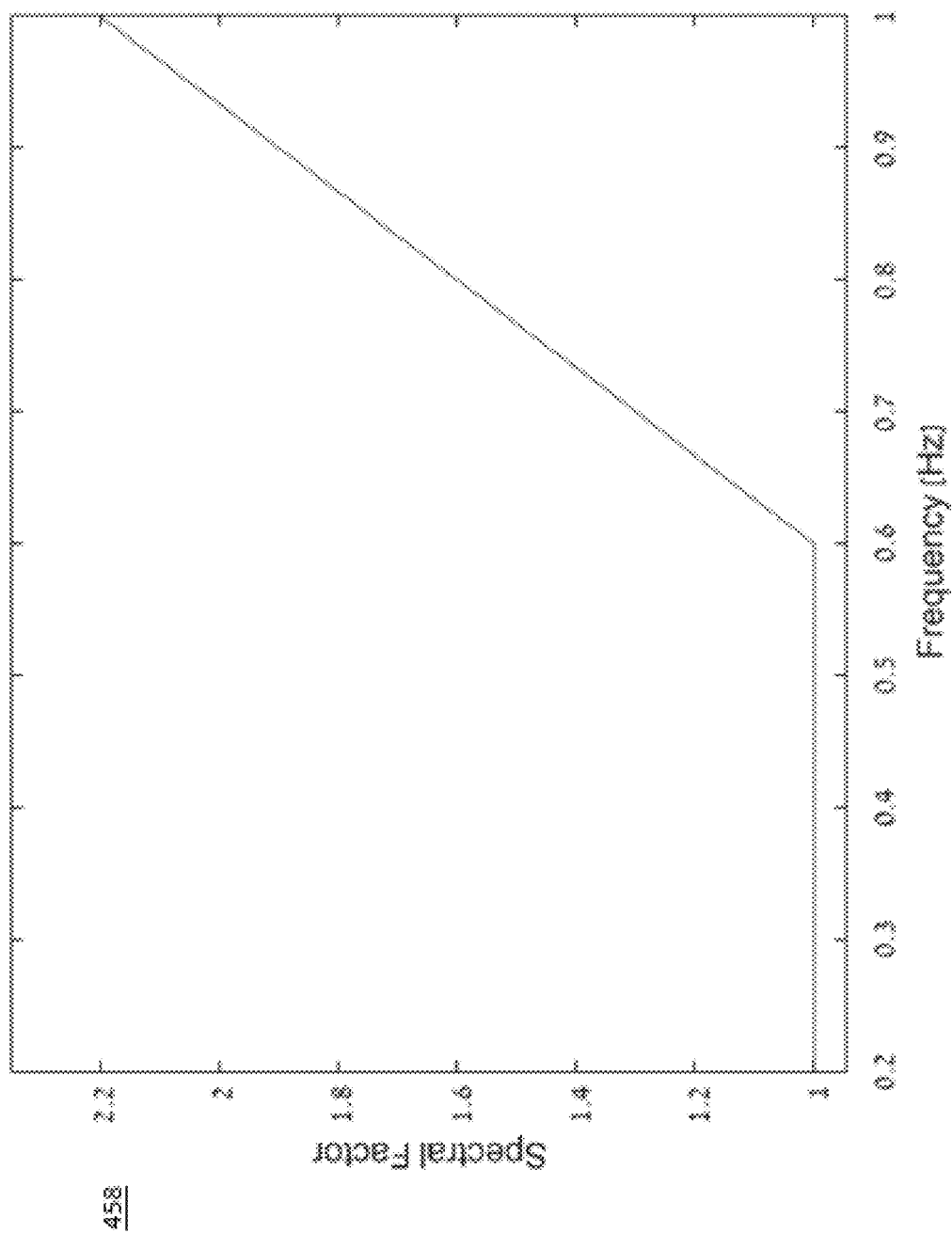
FIG. 5D illustrates in a non-limiting manner the product of a pre-emphasis filter and the respiration spectrum, according to some embodiments of the invention.

FIG. 5D illustrates in a non-limiting manner the frequency response of the pre-emphasis filter 458, according to some embodiments of the invention. The operation of enhancement filter 458 on the respiration signal is expressed in Equation 34, resulting in respiration frequencies 341. $X_E[f]$ denotes the enhanced respiration spectrum that compensates the non-full inhale/exhale situations in hyperventilation cases. $F_{MI}$ denotes the Maximum Respiration Frequency with a full inhale/exhale condition.

$$X_E(f) = X(f) \cdot w^2(f) \text{ for } f=0 \ldots F_{MaxResp} \quad \text{Equation 34}$$

Figure 5E:
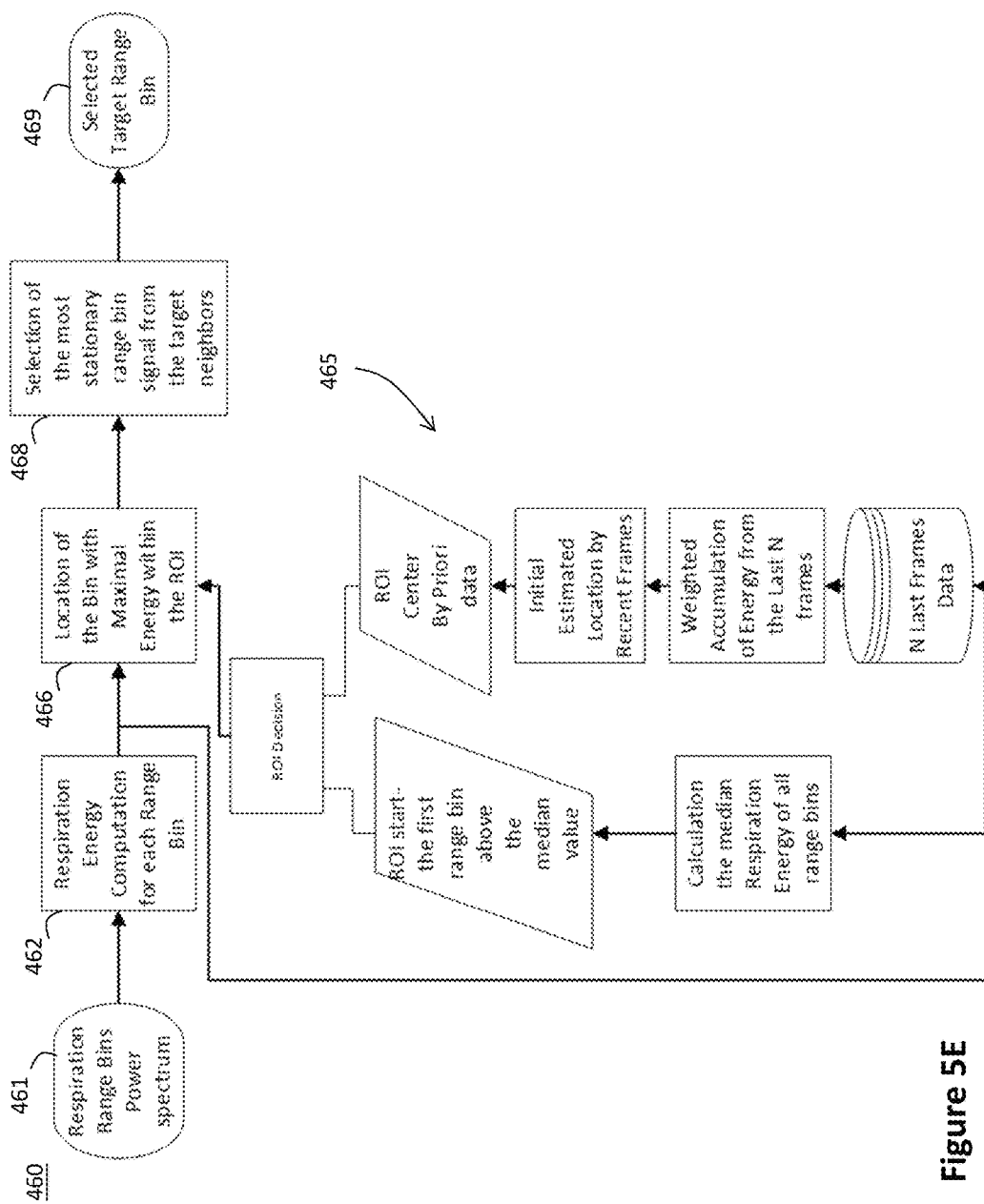
FIG. 5E is a high level schematic illustration of a target localization unit within the human respiration features extraction system, according to some embodiments of the invention.

FIG. 5E is a high level schematic illustration of target localization unit 460 within human respiration features extraction system 300, according to some embodiments of the invention. Target localization unit 460 may be configured to use the current and past distribution of respiration energy over range bins 461, in order to determine the target's location range bins (e.g., of the chest of the human(s) in the scene). Although there may be more than a one range bin that includes the target, target localization unit 460 may be configured to identify or select a specific range bin that can be used as a reference, in order to locate other relevant range bins based on their similarity to the identified or selected range bin.

Figure 5F:
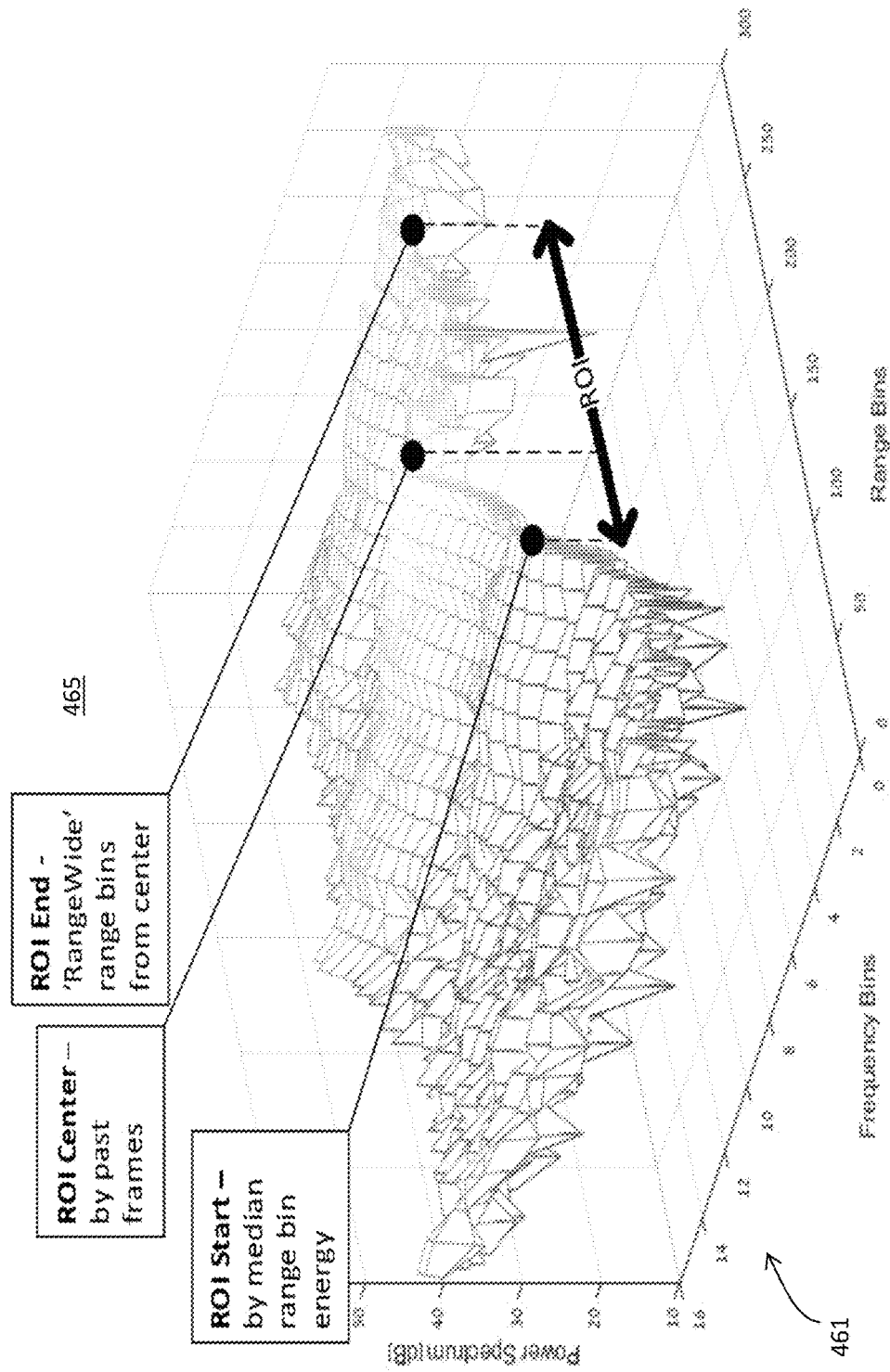
FIG. 5F is a high level schematic exemplary illustration of ROI selection, according to some embodiments of the invention.

First, the search for the respiration target range bin may be limited to a Region of Interest (ROI), which is estimated by using past target regions, in order to reduce the chance of selecting a false range bin having high energy which does not relate to the respiration component. FIG. 5F is a high level schematic exemplary illustration of ROI selection, according to some embodiments of the invention. The area with the highest respiration energy within the ROI may be selected as the center of the ROI for searching the reference target range bin, e.g., as explained below.

The respiration energy of each range bin may be estimated (462) by accumulation of the respiration power spectrums as expressed in Equation 35, which includes all the respiration frequencies bins—$R_{bins}$·$E[m]$ denotes the respiration energy at bin m, $X_m[k]$ denotes the power spectrum of range bin m and frequency bin k, and $F_{bins}$ denotes the number of the frequency bins.

$$E[m] = \rho_{k=1}^{F_{bins}} X_m[k], \forall m=1 \ldots M_{Ranges} \quad \text{Equation 35}$$

Detecting ROI 465 may be carried out as follows (see also FIG. 5F). The median value of all the range bins energies E[m] may be calculated over the different values of m, and the initial ROI range bin may be determined by the first range bin (from the sensor) with respiration energy above the median value. Then, a weighted respiration energy may be calculated by accumulating past range bins energies, according to Equation 36, where $E_j[m]$ are the past average range bins energies (j=1 is the most recent while j=K is the oldest).

$$E_{av}[m] = \frac{\sum_{j=1}^{K} E_j[m](K-j)}{K} \quad \text{Equation 36}$$

The range bin with highest past projected range bin may be selected to be the middle of the ROI. The total ROI area may be determined as explained below and exemplified in FIG. 5F—The ROI Start may be selected as the first range bin with energy above median, the ROI Center may be determined as the estimated location by past frames, and the ROI End may be selected as the range bin that has a correlation with the ROI Center range bin which exceeds a pre-defined threshold. Finally, the target location may be determined as the range bin with the highest respiration power within the ROI 466 (FIG. 5E). A range bins selector 468 may be configured to search for range bins that are highly correlated with the reference respiration target range bin slow signal, with a selection 469 of the range bins being performed as illustrated in FIG. 5G.

Figure 5G:
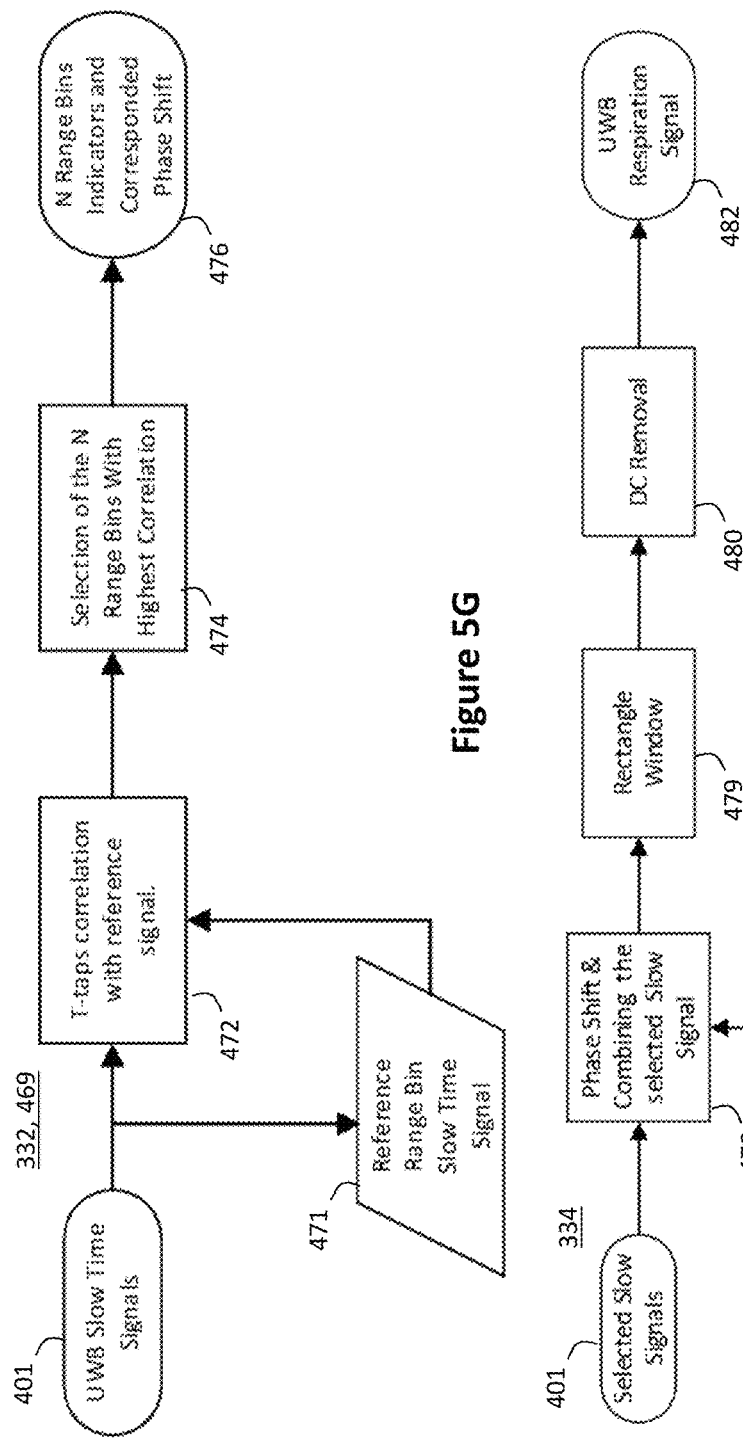
FIG. 5G is a high level schematic illustration of a range bins selector providing a range bin selection, within the human respiration features extraction system, according to some embodiments of the invention.

FIG. 5G is a high level schematic illustration of range bins selector 332 providing a range bin selection 469, within human respiration features extraction system 300, according to some embodiments of the invention. The tested range bins set, $x_m[n]$, may be cross-correlated with the reference range bin $R_{ref}$ slow-time signal $x_R[n]$ 471 after applying a delay tap t (472), e.g., $x_m'[n]=x_m[n-t]$, t=1 . . . $T_{shifts} \forall m=1 \ldots M_{Ranges}$. Using the sliding window, multiple cross-correlations (e.g., $T_{shifts}=32$) may be produced for each range bin slow time signal, from zero phase up to $T_{shifts}$ taps, within e.g., two seconds time frame. Then, the range bins with the highest correlation may be selected 474, with the correspondent phase shift being expressed by Equation 37

$$CC[m, t] = \frac{\sum_{n=1}^{N} x_R[n] * x_m^t[n]}{\sqrt{\sum_{n=1}^{N} x_R[n]^2}} \quad \text{Equation 37}$$

Range bins selector 469 may be configured to select $N_R$ range bins 476 with the maximal cross-correlation C[m] out of all range-bins that are related to the target (e.g., human chest), and the correspondent phase shifts PS[m] that achieve these values. That is, selected range bins 476 may be denoted as m'∈m, m'=1 . . . $N_R$ that are selected according to Equations 38.

$$C[m] = \max_{t=1 \ldots T_{shifts}} \{CC[m, t]\}; \quad \text{Equations 38}$$

$$PS[m] = \operatorname{argmax}_t \{CC[m, t]\}$$

Figure 5H:
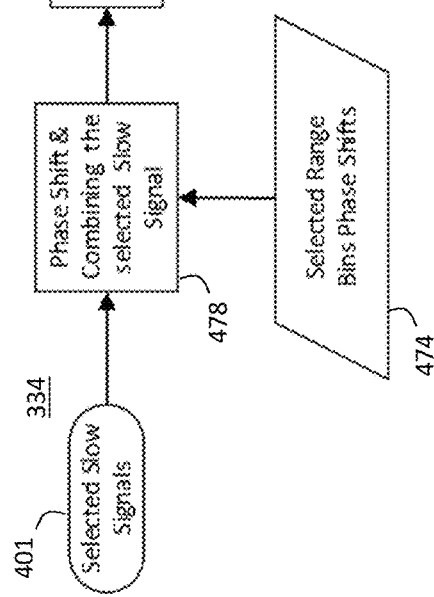
FIG. 5H is a high level schematic illustration of a rake combiner with phase shifting within the human respiration features extraction system, according to some embodiments of the invention.
Figure 51:
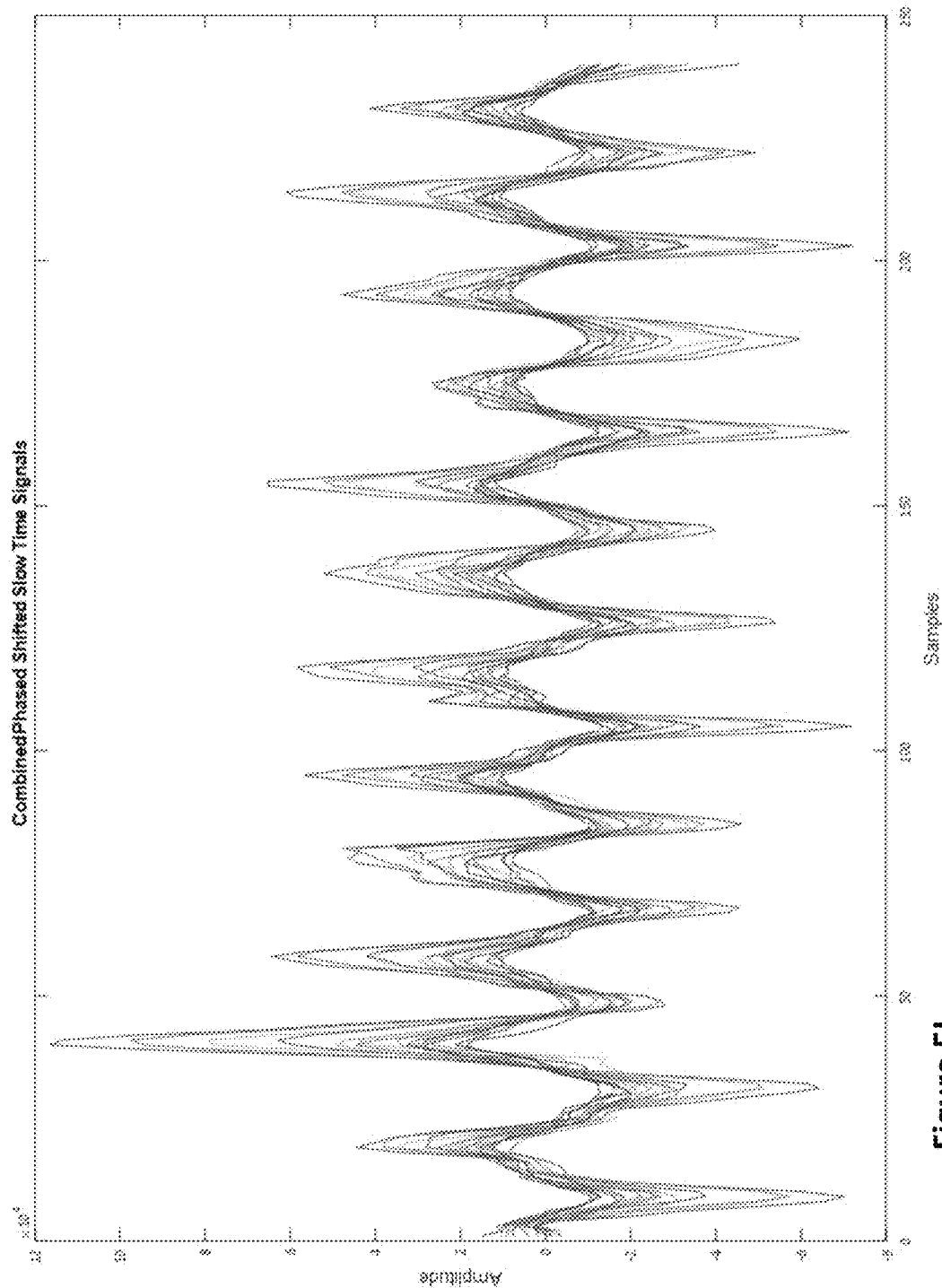

FIG. 5H is a high level schematic illustration of rake combiner 334 with phase shifting, within human respiration features extraction system 300, according to some embodiments of the invention. Each of slow time signals 401 may be zero padded from both sides, shifted by its correspondent phase, and all the shifted signals are accumulated (478) into one signal as expressed in Equations 39.

$$\hat{x}_{m'}^{PS[m']}[n] = ZerosPadding\{x_{m'}^{PS[m']}[n]\} \quad \text{Equations 39}$$

$$\hat{x}[n] = \sum_{m'=1}^{R} \hat{x}_{m'}^{PS[m']}[n]$$

After applying a rectangle window 479 to preserve the Nsamples frame size, the DC component of the combiner output signal may be estimated by an average estimator as the average signal dc[n]. The average signal may then be removed (480) from the combined output signal to produce the respiration signal y[n] 482 by Equation 40.

$$y[n]=\hat{x}[n]-dc[n] \qquad \text{Equation 40}$$

Figure 5J:
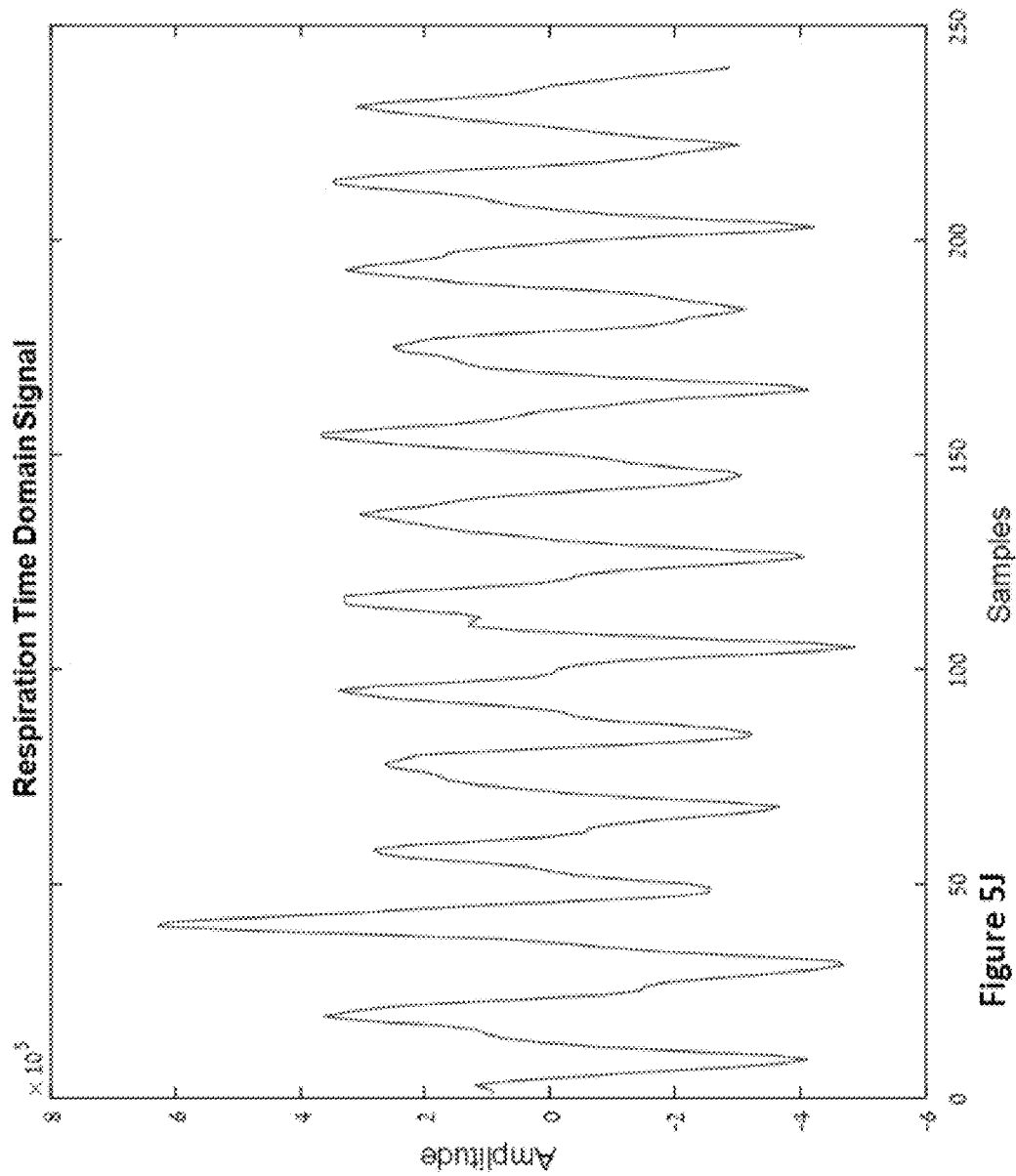

FIGS. 5I and 5J provide an exemplary illustration of pre-accumulation phase shifted time signals (476), and of post-accumulation respiration echo signal 482, respectively, according to some embodiments of the invention.

Figures 5K, 5L:
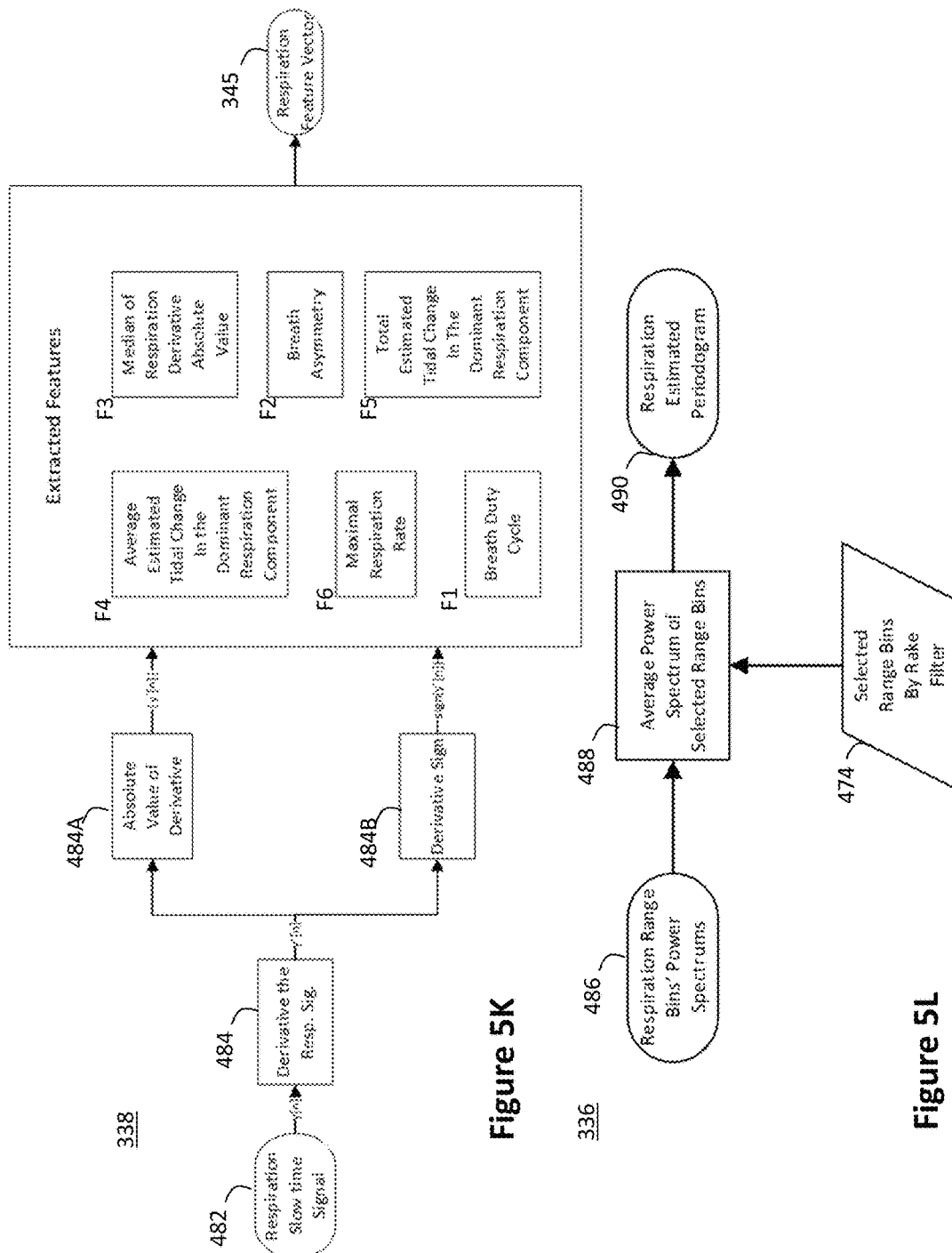
FIG. 5K is a high level schematic illustration of respiration features extraction from the time domain, within the human respiration features extraction system, according to some embodiments of the invention.
FIGS. 5L and 5M are high level schematic illustrations of a frame average power spectrum estimator and of a PCA-based past projection, respectively, which are used for respiration rate estimation, within the human respiration features extraction system, according to some embodiments of the invention.

FIG. 5K is a high level schematic illustration of respiration features extraction from time domain 338, within human respiration features extraction system 300, according to some embodiments of the invention. Respiration features 345 that are extracted from reconstructed respiration signal 482 may be selected to provide information on the physiological properties of the respiration process. These features are extracted from the time domain analysis of the slow time respiration signal as explained in the following. A derivative 484 of respiration signal 482 is calculated, and an absolute value 484A and a sign 484B of respiration signal derivative 484 are separated into two signals by Equations 41.

$$y'[n]=y[n]-y[n-1], \forall n=2\ldots N$$

$$y_1[n]=|y'[n]|$$

$$y_2[n]=\text{sign}(y'[n]) \qquad \text{Equations 41}$$

As a non-limiting example, six respiration features may be derived from the sign and absolute value of the respiration derivative, defined as F1-F6 in Equations 42, and used to construct respiration features vector 345.

$$F1 = \frac{\sum_{n=1}^{N} 1_{y_1[n]>Threshold}}{\sum_{n=1}^{N} 1_{y_1[n]<Threshold}}; \quad F2 = \frac{\sum_{n=1}^{N} 1_{y_2[n]=1 \cap y_1[n]>Threshold}}{\sum_{n=1}^{N} 1_{y_2[n]=-1 \cap y_1[n]>Threshold}}; \qquad \text{Equation 42}$$

$$F3 = \text{med}_n(y')$$

$$F4 = \max\left(\frac{\sum_{n=1}^{N} y_1[n] \cdot 1_{y_2[n]=1 \cap y_1[n]>Threshold}}{\sum_{n=1}^{N} 1_{y_2[n]=1 \cap y_1[n]>Threshold}},\right.$$

$$\left.\frac{\sum_{n=1}^{N} y_1[n] \cdot 1_{y_2[n]=1 \cap y_1[n]<Threshold}}{\sum_{n=1}^{N} 1_{y_2[n]=1 \cap y_1[n]<Threshold}}\right)$$

$$F5 = \max\left(\sum_{n=1}^{N} y_1[n] \cdot 1_{y_2[n]=1 \cap y_1[n]>Threshold},\right.$$

$$\left.\sum_{n=1}^{N} y_1[n] \cdot 1_{y_2[n]=1 \cap y_1[n]<Threshold}\right)$$

$$F6 = \frac{1}{J}\sum_{j=1}^{J} \max_{n \in I_j} y_1[n]$$

In this example, F1 denotes the ratio between samples of the absolute derivative value that pass the pre-defined threshold versus the ones that do not pass that threshold. F1 may be used to provide information on the breath's duty cycle. F2 denotes the ratio between the inhalation and exhalation periods. F2 may be used to provide information on the respiration asymmetry, in terms of inhalation time versus exhalation time. F3 denotes the median value of the entire derivative signal. F3 may be used to provide information on the amount of chest movements which indicate the amount energy related to the respiration action. F3 is expected to increase when the person is under stress. F4 denotes the maximum value of the average inhalation—exhalation and may be calculated by the average values of the derivative absolute value samples that pass the threshold and located at ascending or descending regions respectively. F4 may be used to provide information on the average chest velocity, which can be related to the average amount of air inhaled and exhaled F5 denotes the maximum value of the total inhalation—exhalation, and may be calculated by the total values of the derivative absolute value samples that pass the threshold and are located as ascending or descending regions respectively. F5 may be used to provide information on the total chest activity, which can be related to the total amount of air inhaled and exhaled. F6 denotes the averaged inhalation/exhalation peaks within each frame segment, with J representing the number of segments, e.g., J may be in a range of 3 to 5 segments of 3-5 second each. F6 may be used to provide information about the maximum peak rate of inhalation-exhalation.

Figure 5M:
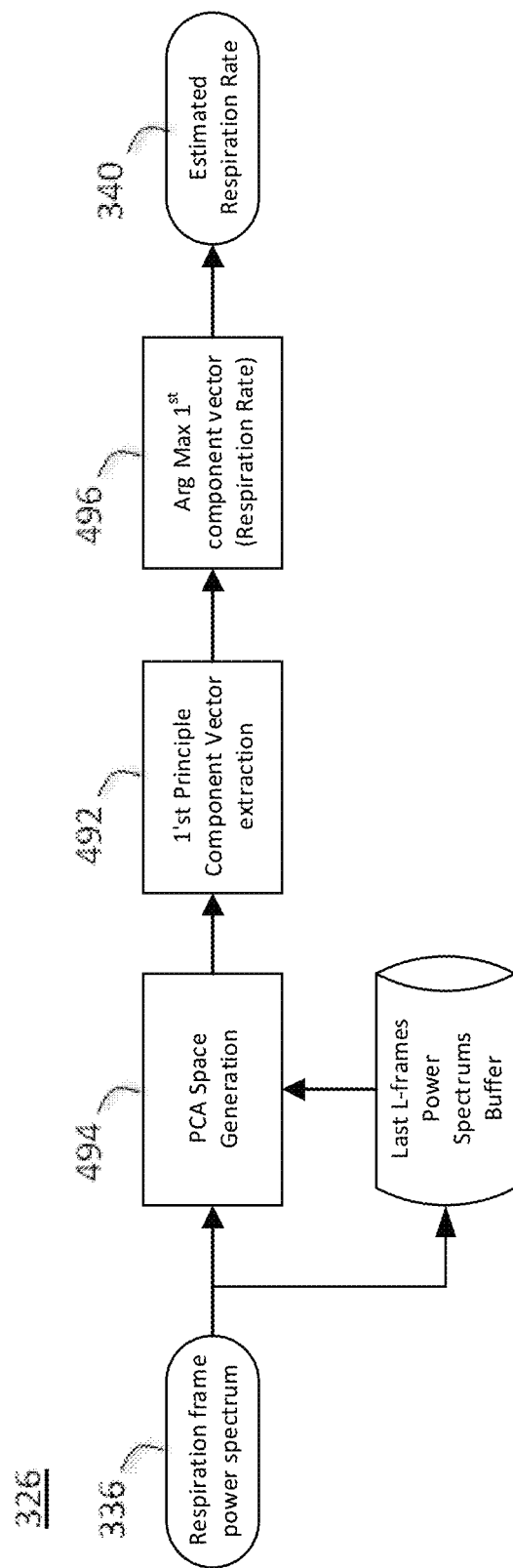

FIGS. 5L and 5M are high level schematic illustrations of frame average power spectrum estimator 336 and of Principle Component Analysis (PCA)-based respiration rate estimator 326, respectively, that are used for respiration rate estimation 340, within human respiration features extraction system 300, according to some embodiments of the invention. The power of the range bins selected (474) by range bins scanner 332 may be combined to yield an average power spectrum 488 of the respiration process and each of the $N_R$ range bins may be accumulated into a joint average spectrum of the respiration 490, as expressed in Equation 43.

$$Pav[k] = \frac{1}{N_R}\sum_{r=1}^{N_R} P_{RB_r}[k], \qquad \text{Equation 43}$$

where:

$P_{RB_r}[k]$ denotes the power spectrum of slow time signal at range-bin $RB_r$, and $N_R$ denotes the number of the selected range bins to be averaged in the power spectrum.

Respiration rate estimation based on PCA (326) may be configured to reduce the effect of unwanted components such as the noise and the low motions interference signature, under the assumption that the respiration power spectrum usually fluctuates over the consecutive frames versus noise and quasi-static motion components. The PCA-based respiration rate estimation 326 may be configured to extract the first principle component 492 out of a current PCA space 494 that is generated from the L last frames' power spectra and the current frame power spectrum. The estimated respiration rate 340 may then be identified as the argument (frequency bin) 496 of the maximum value of the extracted first principle component vector.

The features vector relating, e.g., to posture, motion and respiration features and/or respiration modes, derived as described above, may prepared by quantizing the extracted features with a final number of bits per field and adding the time stamp for the prepared vector. This vector may be used as the entry data for the human state classifier (for both training and classifying stages).

Human State Classifier

The Human state classifier is a VQ (Vector Quantization) based classifier. This classifier consists of two main phases: (i) The training phase is carried out offline (supervised training) and online (unsupervised training), where a stream of features vectors reflecting various states are used as a preliminary database for vector quantization and finding the set of code-vectors (centroids) that sufficiently representing the instantaneous human states. The set of the calculated code-vectors are called codebook. Some embodiments of the training sessions are provided in more details hereinafter. (ii) The classifying phase is executed during the online operation while an unknown features vector is entered into the classifier and the classifier determines what the most probable state that it represents. The classifier output is the determined states and the set of the measured statistical distances (probabilities), i.e., the probability of State-i given the observation-O (the features vector). The aforementioned probability scheme may be formulated by: P (Si|O). The determined instantaneous state is called "Local Decision". The VQ states are defined as the set of instantaneous states at various locations at the monitored home environment. Therefore, any state is a two dimensional results which is mapped on the VQ state matrix. (iii) The State matrix consists of the state (row) and location (Column) followed by a time stamp. Typical elderly home environment consists of the specific locations (Primary zones) and others non-specified locations (Secondary zones). State is defined as the combination of posture/motion at a specific location (e.g., S21 will indicate sleeping at Bedroom).

FIG. 6A is a table 134 illustrating an exemplary states definition in accordance with some embodiments of the present invention. FIG. 6B is a table 135 illustrating an exemplary states matrix in accordance with some embodiments of the present invention.

Cognitive Situation Analysis (CSA)

The CSA's objective is to recognize the abnormal human patterns according to a trained model that contains the possible abnormal cases (e.g., fall). The core of the CSA, in this embodiment, may, in a non-limiting example a Hidden Markov Model (HMM) based pattern recognition. The CSA engine searches for states patterns that are tagged as an emergencies or abnormal patterns. These predefined patterns are stored in a patterns codebook. The output of the CSA is the Global recognized human situation.

FIG. 6C is a table 136 illustrating exemplary abnormal patterns in accordance with some embodiments of the present invention. It can be seen that in the first abnormal case (Critical fall), it appears that the person was sleeping in the leaving room (S25), then was standing (S45) and immediately fell down (S65). He stayed on floor (S15) and start being in stress due to high respiration rate (S75). The CSA may contain additional codebook (irrelevant codebook) to identify irrelevant patterns that might mislead the system decision.

Communication Unit

The communication unit creates the channel between the system and the remote caregiver (family member or operator center). It may be based on either wired (Ethernet) connectivity or wireless (e.g., cellular or WiFi communication or any other communication channel).

The communication unit provides the following functionalities: (i) This unit transmits any required ongoing situation of the monitored person and emergency alerts. (ii) It enables the two way voice/video communication with the monitored person when necessary. Such a communication is activated either automatically whenever the system recognizes an emergency situation or remotely by the caregiver. (iii) It enables the remote system upgrades for both software and updated codebooks (as will be in further detail below). (iv) It enables the communication to the centralized system (cloud) to share common information and for further big data analytics based on multiple deployments of such innovated system.

Figure 7:
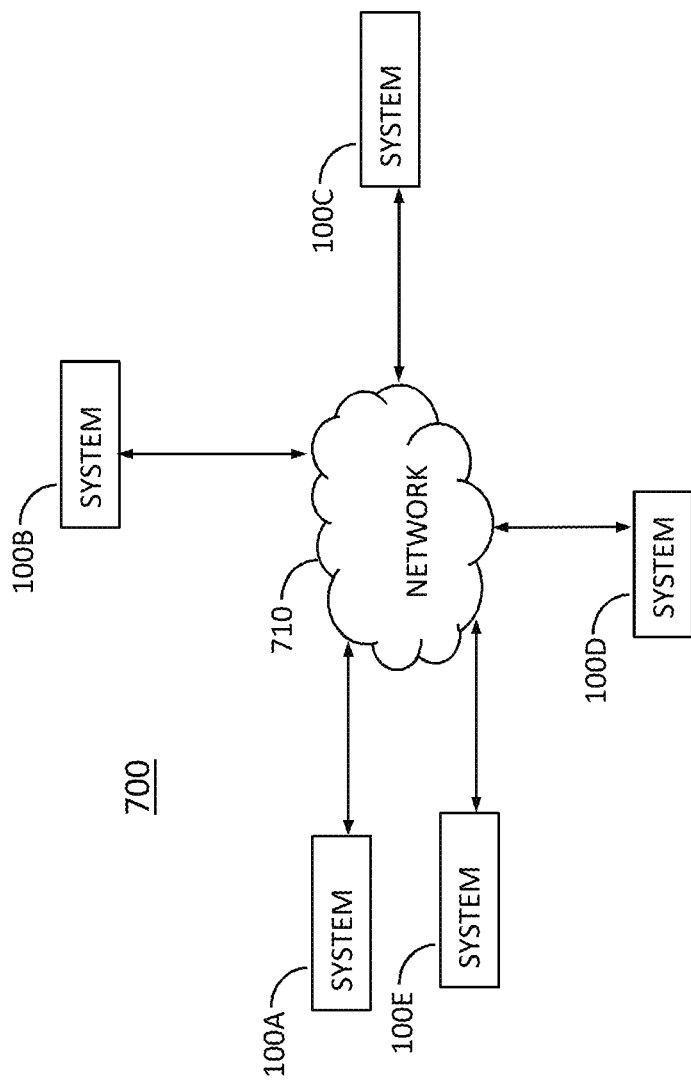
FIG. 7 is a diagram illustrating a cloud-based architecture of the system in accordance with embodiments of the present invention.

FIG. 7 is a diagram illustrating cloud-based architecture 700 of the system in accordance with embodiments of the present invention. Raw data history (e.g., states stream) is passed from each local system 100A-100E to the central unit located on a cloud system 710 and performs various data analysis to find correlation of states patterns among the multiple users' data to identify new abnormal patterns that may be reflected just before the recognized abnormal pattern. New patterns code vectors will be included to the CSA codebook and cloud remotely updates the multiple local systems with the new code-book. The data will be used to analyze daily operation of local system 100A-100E.

Figure 8:
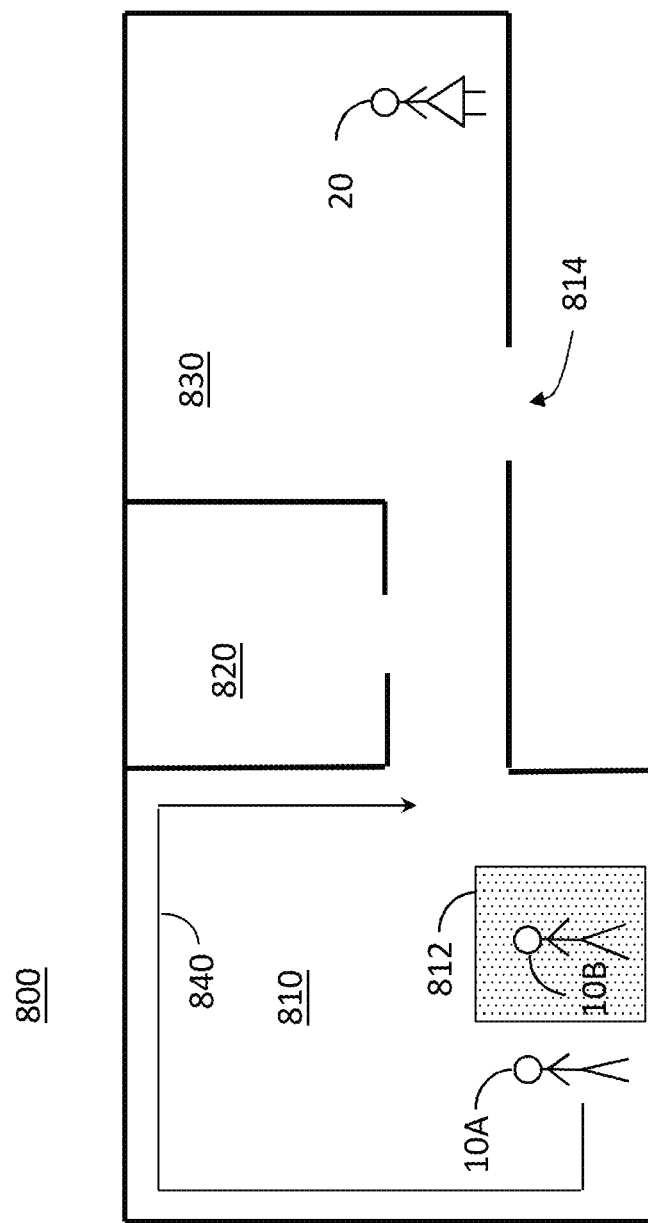
FIG. 8 is a floor plan diagram illustrating initial monitored person training as well as the home environment and primary locations training in accordance with embodiments of the present invention.

FIG. 8 is a diagram illustrating a floor plan 800 of an exemplary residential environment (e.g., an apartment) on which the process for the initial training is described herein. The home environment is mapped into the primary zones (the major home places that the monitored person attends most of the time as bedroom 810, restroom 820, living room 830 and the like) and secondary zones (the rest of the barely used environments). The VQ based human state classifier (described above) is trained to know the various primary places at the home. This is done during the system setup while the installer 10A (being the elderly person or another person) stands or walks at each primary place such as bedroom 810, restroom 820, and living room 830 and let the system learns the "fingerprint" of the echo signals extracted features that mostly represents that place. These finger prints are stored in the VQ positions codebook. In addition, the system learns the home external walls boundaries. This is done during the system setup while the installer stands at various places along the external walls and lets the system tune its power and processing again (integration) towards each direction. For example, in bedroom 810, installer 10A may walk along walls in route 840 so that the borders of bedroom 810 are detected by tracking the changes in the RF signal reflections throughout the process of walking. A similar border identification process can be carried out in restroom 820, and living room 830. Finally, the system learns to identify the monitored person 10B. This is done by capturing the fingerprint of the extracted features on several conditions, such as (1) while the person lays at the default bed 812 (where he or she is supposed to be during nighttime) to learn the overall body volume, (2) while the person is standing to learn the stature, and (3) while the person walks to learn the gait. All the captured cases are stored in the VQ unit and are used to weight the pre-trained codebooks and to generate the specific home/person codebooks. According to some embodiments, one or additional persons such as 20 can also be monitored simultaneously. The additional person can be another elderly person with specific fingerprint or it can be a care giver who needs not be monitored for abnormal postures.

Figure 9:
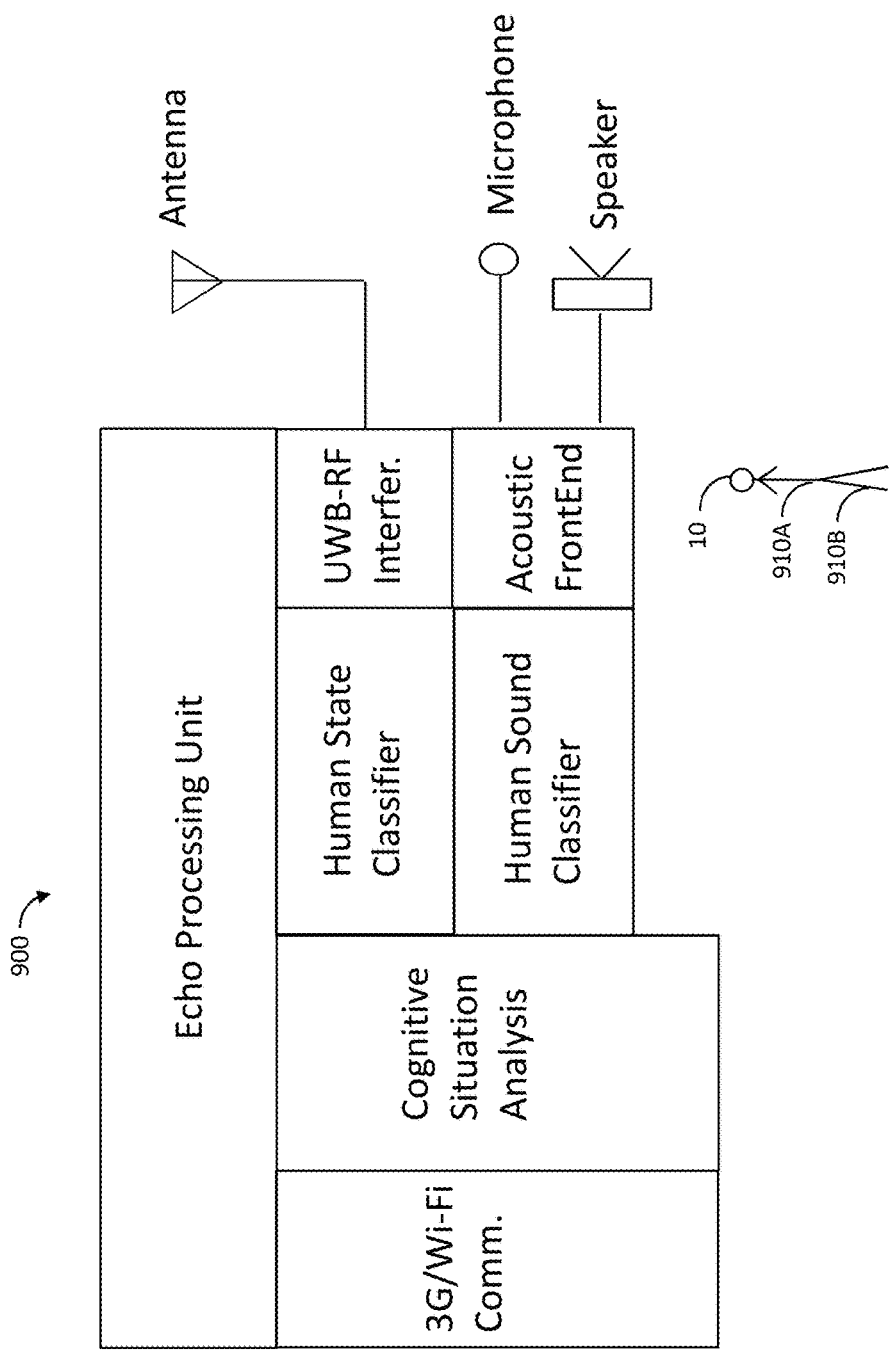
FIG. 9 is a diagram illustrating yet another aspect in accordance with some embodiments of the present invention.

FIG. 9 is a diagram illustrating yet another aspect in accordance with some embodiments of the present invention. System 900 is similar to the system described above but it is further enhanced by the ability to interface with at least one wearable medical sensor 910A or 910B coupled to the body of human 10 configured to sense vital signs of human 10, and a home safety sensor 920 configured to sense ambient conditions at said specified area, and wherein data from said at least one sensor are used by said decision function for improving the decision whether an abnormal physical event has occurred to the at least one human in said specified area. The vital signs sensor may sense ECG, heart rate, blood pressure, respiratory system parameters and the like. Home safety sensors may include temperature sensors, smoke detector, open door detectors and the like. Date from all or some of these additional sensors may be used in order to improve the decision making process described above.

Figure 10:
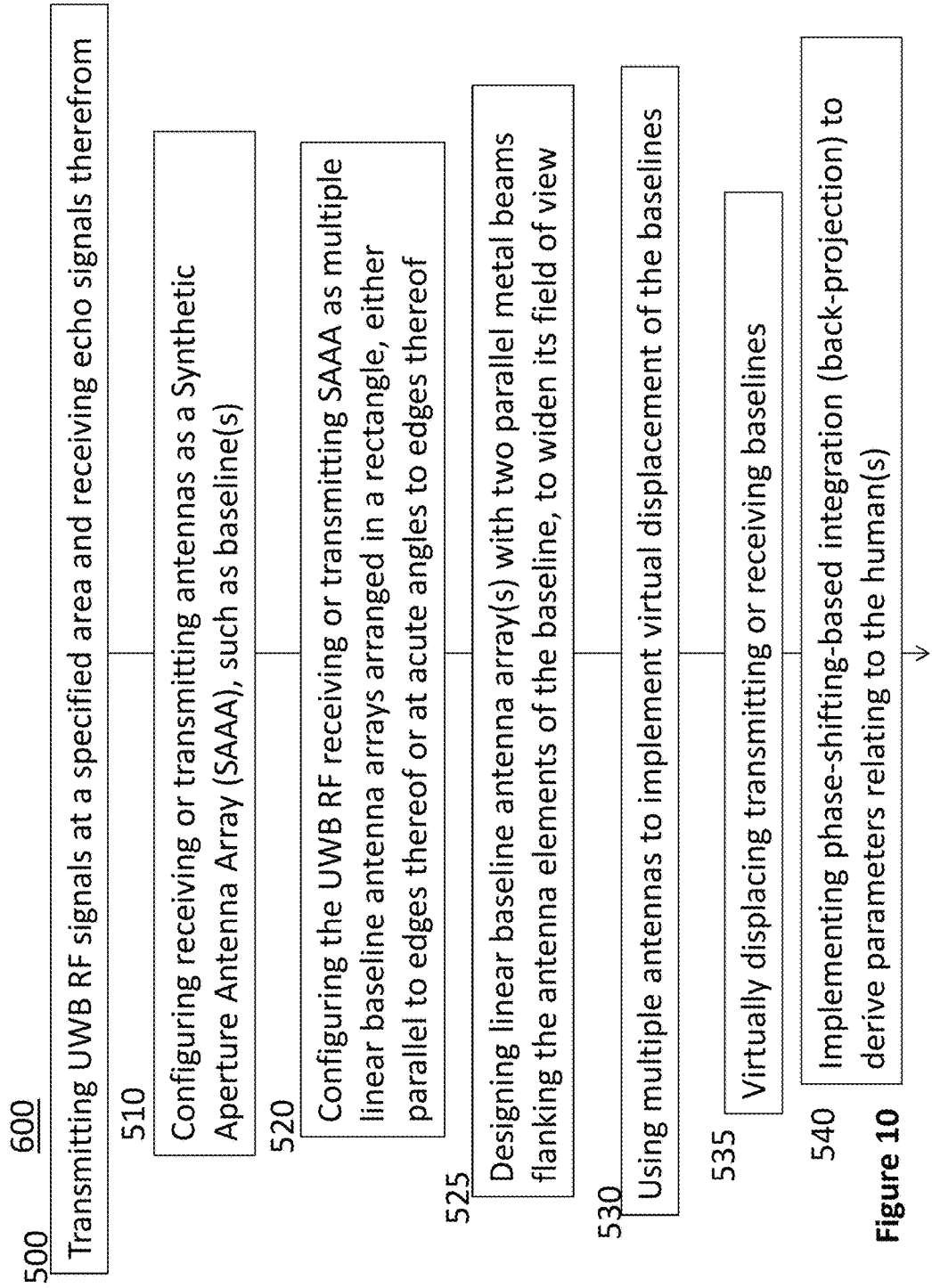
FIG. 10 is a high level schematic flowchart of a method, according to some embodiments of the invention.

FIG. 10 is a high level schematic flowchart of a method 600 according to some embodiments of the invention. Method 600 may be at least partially implemented by at least one computer processor. Certain embodiments comprise computer program products comprising a computer readable storage medium having computer readable program embodied therewith and configured to carry out of the relevant stages of method 600.

Method 600 may comprise transmitting UWB RF signals via transmitting antenna(s) at a specified area (such as an environment including at least one human) and receiving echo signals via receiving antenna(s) (stage 500). At least one of the UWB RF transmitting and receiving antennas comprises a Synthetic Aperture Antenna Array (SAAA) comprising a plurality of linear baseline antenna arrays ("baselines"). Method 600 may comprise configuring receiving antenna(s) and/or transmitting antennas(s) as a Synthetic Aperture Antenna Array (SAAA), such as baseline(s) (stage 510), for example, method 600 may comprise configuring the UWB RF receiving SAAA as a plurality of linear baseline antenna arrays arranged in a rectangle as a non-limiting example, possibly parallel to edges thereof or at acute angles to edges thereof (stage 520), e.g., as illustrated below in a non-limiting manner. Method 600 may comprise designing at least one of the linear baseline antenna arrays to comprise two (or more) parallel metal beams flanking the antenna elements of the baseline, to widen the baseline's field of view (stage 525).

Method 600 may further comprise using multiple antennas to implement virtual displacement of the baselines (stage 530), i.e., virtually displacing transmitting or receiving baselines to enhance performance (stage 535). Method 600 may further comprise implementing phase-shifting-based integration (back-projection) to derive parameters relating to the human(s) (stage 540), such as location, movement and/or posture features.

Method 600 may further comprise canceling environmental clutter (stage 605), e.g., by filtering out static non-human related echo signals (stage 606), extracting from the filtered echo signals, a quantified representation of position postures, movements, motions and breathing of at least one human located within the specified area (stage 610), identifying a most probable fit of human current state that represents an actual human instantaneous status (stage 690) and applying a pattern recognition based decision function to the identified states patterns and determine whether an abnormal physical event has occurred to the at least one human in the specified area (stage 693) (see additional details below).

Method 600 may further comprise finding the best match to a codebook which represents the state being a set of human instantaneous condition/situation which is based on vector quantized extracted features (stage 691).

Method 600 may further comprise ensuring, by the filtering out, that no human body is at the environment, using static clutter estimation and static clutter subtraction (stage 607).

Method 600 may further comprise quantizing the known states features vectors and generating the states code-vectors (stage 692A), measuring the distance between unknown tested features vectors and pre-defined known code-vectors (stage 692B) and finding the best fit between unknown tested features vector and pre-determined code-vectors set, using the most probable state and the relative statistical distance to the tested features vector (stage 692C).

Method 600 may further comprise generating the set of abnormal states patterns as a reference codebook, a set of states transition probabilities, and a states-patterns matching function to find and alert on a match between a tested states pattern and the pre-defined abnormal pattern of the codebook (stage 694). Method 600 may further comprise communicating an alert upon determining of an abnormal physical event (stage 695).

Method 600 may further comprise estimating the reflected clutter from a specific voxel to extract the human position and posture features (stage 612A), extracting the human motions and breathing features using Doppler signatures (stage 612B) and creating a quantized vectors of the extracted features (stage 612C).

Method 600 may comprise, with respect to posture (and position) features extraction 612A, processing the received echo signals to derive a spatial distribution of echo sources in the environment using spatial parameters of the transmitting and/or receiving antennas (stage 620), carried out, e.g., by a back-projection algorithm, and estimating a posture of the at least one human by analyzing the spatial distribution with respect to echo intensity (stage 628). Method 600 may comprise canceling environmental clutter by filtering out static non-human related echo signals (see stages 605, 606).

Processing 620 may be carried out with respect to multiple antenna baselines as the transmitting and/or receiving antennas, as explained above. Method 600 may further comprise enhancing echoes received from a lower level in the environment to enhance detection sensitivity to a laying posture of the at least one human (stage 622).

Method 600 may further comprise detecting a position of the at least one human from the spatial distribution (stage 624) and possibly tracking the detected position over time. Canceling environmental clutter 605 may be carried out by spatially characterizing the static non-human related echo signals during an absence of the at least one human from the environment, as detected by the tracking (stage 626).

Posture estimation 628 may comprise analyzing the spatial distribution using curve characteristics of one or more projections of an intensity of the received echo signals onto at respective one or more axes (stage 630), in particular with respect to one or more horizontal axis and a vertical axis. The spatial distribution may be defined using voxels and the posture may be estimated 628 using high-power voxels as defined by a specified power threshold (stage 632).

Method 600 may further comprise classifying the posture characteristics of the at least one human to indicate a state of the at least one human (stage 634), possibly by preparing at least one codebook during a training phase and using the at least one codebook to classify the detected postures (stage 636), as explained above. As explained below, Classification 634 may be carried out by identifying a most probable fit of one of a plurality of predefined states to the motion characteristics (stage 692C), possibly followed by generating an alert once the indicated state is related to at least one specified emergency (stage 695), the alert generation being possibly based on pattern recognition with respect to previously indicated states (stage 694).

Method 600 may further comprise processing the received echo signals to yield a range-bin-based slow signal that is spatio-temporally characterized over a plurality of spatial range bins and a plurality of temporal sub-frames, respectively (stage 640) and deriving from the slow signal a Doppler signature and a range-time energy signature as motion characteristics of the at least one human (stage 650). Method 600 may comprise deriving the Doppler signature by comparing spectral signatures of sub-frames in the slow signals, which are related to identified human-related range bins and sub-frames (stage 642) and deriving the energy signature by evaluating powers of the slow signal at identified human-related range bins and sub-frames (stage 644). Method 600 may comprise deriving the Doppler signature and/or the energy signature with respect to different body parts of the at least one human (stage 646).

Deriving 650 may further comprise deriving location data as movement characteristics of the at least one human (stage 652). Deriving of the location data 652 may comprise detecting displacements of the at least one human using back-projection (stage 654), using the received echo signals to derive, by back projection, 2D location data and 3D posture data about the at least one human (stage 655), and/or identifying human-related range bins and sub-frames in the slow signals (stage 656). Deriving of the location data 652 may be carried out using a spatio-temporal histogram of the range-time energy signature and by identifying on the histogram range changes of at least body parts (e.g., limbs) of the at least one human (stage 658). The motion characteristics and/or movement characteristics may comprise gait parameters.

Method 600 may further comprise handing over detecting 654 among a plurality of interferometry units according to detected displacements (stage 660), i.e., using different interferometry units for detection 654 according to displacement parameters, such as coverage region, signal intensity etc., as explained below. Method 600 may be carried out by a plurality of UWB RF receiving SAAAs positioned at a plurality of positions, and may further comprise integrating the received echo signals from the UWB RF receiving SAAAs (stage 662).

Method 600 may comprise, after transmitting the UWB RF signals and receiving the echo signals (stage 500) and after processing the received echo signals to yield the range-bin-based slow signal (stage 640), estimating at least one respiration parameter of the at least one human by analyzing the slow signal (stage 665).

Method 600 may further comprise removing motion related components from the slow signal (stage 667) and deriving a range-bin power spectrum therefrom to identify a respiration-related ROI (stage 668), possibly identifying chest(s) of the human(s) by detecting ROI cross-correlation as described above (stage 669), deriving from the respiration-related ROI a respiration signal (stage 670), and extracting at least one respiration feature from the respiration signal (stage 675). Deriving 670 of the respiration signal may be carried out by combining, coherently, a plurality of differently phase-shifted slow signals (stage 672) and/or with respect to a derivative of the respiration signal (stage 674).

The respiration features may comprise any of: a respiration rate, respiration asymmetry, respiration tidal volume changes, breath duty cycle parameters, inhalation and/or exhalation durations, maximal inhalation and/or exhalation values, and chest movements and related energy, velocity and/or activity, as explained above.

Method 600 may further comprise applying a PCA (principal component analysis) on earlier-derived slow signals to estimate a respiration rate (stage 677) and/or applying a FFT (fast Fourier transform) to the slow signal prior to range-bin power spectrum derivation 668, and enhancing high frequencies of the spectrum (stage 680), as demonstrated in detail above.

Method 600 may further comprise deriving a location of the at least one human (and/or the chest of the human) prior to the derivation of the respiration signal and possibly tracking the detected position over time (stage 682). Other signal processing stages described above as well as classification stages described below may be applied with respect to the respiration signal(s) and feature(s). Various types of features (movement, motion, posture and/or respiration) may be correlated and/or used in combination for the classification and alert generation described below.

Method 600 may comprise classifying the position and/or posture and/or motion and/or movement and/or respiration characteristics of the at least one human to indicate a state of the at least one human (stage 688). Classification 688, e.g., by identifying the most probable fit 690, may be carried out by identifying a most probable fit of one of a plurality of predefined states to the motion characteristics. Classification 688 may comprise classifying respiration parameters and feature to indicate respiration modes of the human(s), and may comprise using the respiration modes to indicate the state of the human(s).

Communicating the alert 695 may be carried out by generating the alert once the indicated state is related to at least one specified emergency. The alert generation may be based on pattern recognition with respect to previously indicated states.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
   transmitting, via at least one transmitting antenna, ultra-wide band (UWB) radio frequency (RF) signals at an environment including at least one human, and receiving, via at least one receiving antenna, echo signals from the environment;
   processing the received echo signals to yield a range-bin-based slow signal that is spatially characterized over a plurality of spatial range bins;
   removing motion related components from the slow signal and deriving a range-bin power spectrum therefrom to identify a respiration-related region of interest;
   deriving from the respiration-related region of interest a respiration signal;
   applying a PCA (principal component analysis) on earlier-derived slow signals to estimate a respiration signal;
   extracting the at least one respiration feature from the respiration signal;
   and
   classifying the at least one respiration feature to indicate a respiration mode of the at least one human.

2. The method of claim 1, wherein the deriving of the respiration signal is carried out by coherently combining a plurality of differently phase-shifted slow signals.

3. The method of claim 1, wherein the deriving of the respiration features is carried out with respect to a derivative of the respiration signal.

4. The method of claim 3, wherein the respiration features comprise at least one of: a respiration rate, respiration asymmetry, respiration tidal volume changes, breath duty cycle parameters, inhalation and/or exhalation durations, maximal inhalation and/or exhalation values, and chest movements and related energy, velocity and/or activity.

5. The method of claim 1, further comprising identifying at least one respective chest of the at least one human by detecting cross-correlation in the respiration-related region of interest.

6. The method of claim 5, further comprising tracking a position of the at least one respective chest over time.

7. The method of claim 1, further comprising applying a FFT (fast Fourier transform) to the slow signal prior to range-bin power spectrum derivation and enhancing high frequencies of the spectrum.

8. The method of claim 1, wherein the processing is carried out with respect to a plurality of antenna baselines as the at least one transmitting and/or receiving antennas.

9. The method of claim 1, further comprising classifying the respiration mode of the at least one human to indicate a state of the at least one human.

10. The method of claim 9, wherein the classifying is carried out by preparing at least one codebook during a training phase and using the at least one codebook to classify the detected postures.

11. The method of claim 9, wherein the classifying is carried out by identifying a most probable fit of one of a plurality of predefined states to the respiration features.

12. The method of claim 9, wherein the classifying is carried out with additional respect to motion and/or posture features.

13. The method of claim 9, further comprising generating an alert once the indicated state is related to at least one specified emergency and is based on pattern recognition with respect to previously indicated states.

14. A non-wearable monitoring system comprising:
   an ultra-wide band (UWB) radio frequency (RF) interferometer configured to transmit UWB RF signals at, and to receive echo signals from, an environment including at least one human,
   a processing unit configured to:
   process the received echo signals to yield a range-bin-based slow signal that is spatially characterized over a plurality of spatial range bins;

remove motion related components from the slow signal and derive a range-bin power spectrum therefrom to identify a respiration-related region of interest;

derive from the respiration-related region of interest a respiration signal; and apply a PCA (principal component analysis) on earlier-derived slow signals to estimate a respiration signal;

a feature extractor configured to estimate at least one respiration parameter of the at least one human by analyzing the respiration signal, and a human state classifier configured to classify at least one respiration feature of the at least one human to indicate a respiration mode of the at least one human.

15. The non-wearable monitoring system of claim 1, wherein the processing unit is further configured to apply, prior to the range-bin power spectrum derivation, a FFT (fast Fourier transform) to the slow signal and enhancing high frequencies of the spectrum; and to apply a PCA (principal component analysis) on earlier-derived slow signals to estimate a respiration signal.

16. The non-wearable monitoring system of claim 1, wherein the processing unit is further configured to identify at least one respective chest of the at least one human by detecting cross-correlation in the respiration-related region of interest.

17. The non-wearable monitoring system of claim 14, wherein the human state classifier is further configured to classify the respiration mode of the at least one human to indicate a state of the at least one human, and further comprising an abnormality situation pattern recognition module configured to generate an alert once the indicated state is related to at least one specified emergency, wherein the classifying is carried out by preparing at least one codebook during a training phase and using the at least one codebook to classify the detected postures.

* * * * *